(12) United States Patent
Angeles et al.

(10) Patent No.: US 12,502,668 B2
(45) Date of Patent: Dec. 23, 2025

(54) SYSTEMS FOR OPERATING MICROFLUIDIC DEVICES

(71) Applicant: BRUKER CELLULAR ANALYSIS, INC., Emeryville, CA (US)

(72) Inventors: Angel Navas Angeles, Union City, CA (US); Johannes Paul Sluis, Orinda, CA (US); John A. Tenney, Piedmont, CA (US); Yogesh Khemchandra Dhande, Berkeley, CA (US); Patrick N. Ingram, Emeryville, CA (US); Erin Chia-wei Hsi, Richmond, CA (US); Christopher C. Shing, Castro Valley, CA (US); John Junyeon Kim, Berkeley, CA (US); Keith J. Breinlinger, San Rafael, CA (US); Raziel Solomon Alon, Emeryville, CA (US)

(73) Assignee: Bruker Cellular Analysis, Inc., Emeryville, CA (US)

( * ) Notice: Subject to any disclaimer, the term of this patent is extended or adjusted under 35 U.S.C. 154(b) by 769 days.

(21) Appl. No.: 17/660,448

(22) Filed: Apr. 25, 2022

(65) Prior Publication Data

US 2022/0401954 A1 Dec. 22, 2022

Related U.S. Application Data

(63) Continuation of application No. PCT/US2020/057200, filed on Oct. 23, 2020.
(Continued)

(51) Int. Cl.
*B01L 1/00* (2006.01)
*B01L 3/00* (2006.01)
(Continued)

(52) U.S. Cl.
CPC ........ *B01L 3/502715* (2013.01); *B01L 9/527* (2013.01); *G01N 35/00029* (2013.01);
(Continued)

(58) Field of Classification Search
None
See application file for complete search history.

(56) References Cited

U.S. PATENT DOCUMENTS

2004/0238401 A1* 12/2004 Greenstein .............. B01L 9/527
206/701
2005/0214173 A1* 9/2005 Facer ................ B01L 3/502707
422/400
(Continued)

FOREIGN PATENT DOCUMENTS

CN 1767898 A 5/2006
CN 107849505 A 3/2018
(Continued)

*Primary Examiner* — Jyoti Nagpaul
(74) *Attorney, Agent, or Firm* — McNeill PLLC

(57) ABSTRACT

Systems for operating a microfluidic device are described. The systems comprise a first surface configured to interface and operatively couple with a microfluidic device and a lid configured to retain the microfluidic device on the first surface. The lid comprises a first portion having a first fluid port configured to operatively couple with and flow fluidic medium into and/or out of a first fluid inlet/outlet of the microfluidic device and a second portion having a second fluid port configured to operatively couple with and flow fluidic medium into and/or out of a second fluid inlet/outlet of the microfluidic device. The second portion of the lid is separable from the first portion and movable between a closed position in which the second fluid port of the second portion of the cover is operatively coupled with the second fluid inlet/outlet of the microfluidic device and an open
(Continued)

position in which a portion of the microfluidic device that contains the second fluid inlet/outlet is exposed. Other embodiments are described.

26 Claims, 34 Drawing Sheets

Related U.S. Application Data

(60) Provisional application No. 62/926,079, filed on Oct. 25, 2019.

(51) Int. Cl.
*B01L 9/00* (2006.01)
*G01N 35/00* (2006.01)
*G01N 35/10* (2006.01)
*G02B 21/06* (2006.01)
*C12M 3/06* (2006.01)

(52) U.S. Cl.
CPC ......... *G01N 35/1095* (2013.01); *G02B 21/06* (2013.01); *B01L 2200/027* (2013.01); *B01L 2300/043* (2013.01); *B01L 2300/046* (2013.01); *C12M 23/16* (2013.01); *G01N 2035/00237* (2013.01)

(56) References Cited

U.S. PATENT DOCUMENTS

| | | |
|---|---|---|
| 2006/0246487 A1 | 11/2006 | Oh et al. |
| 2009/0215194 A1 | 8/2009 | Magni et al. |
| 2014/0176939 A1 | 6/2014 | Shah et al. |
| 2016/0319958 A1 | 11/2016 | Ezkerra Fernández et al. |
| 2018/0298318 A1 | 10/2018 | Kurz et al. |
| 2019/0153511 A1 | 5/2019 | Unger et al. |

FOREIGN PATENT DOCUMENTS

| | | |
|---|---|---|
| CN | 108472649 A | 8/2018 |
| JP | 2009524054 A | 6/2009 |
| JP | 2018508743 A | 3/2018 |
| TW | 201642953 A | 12/2016 |
| WO | 2004069412 A1 | 8/2004 |
| WO | 2007084425 A2 | 7/2007 |
| WO | 2016094507 A2 | 6/2016 |
| WO | 2016172454 A1 | 10/2016 |
| WO | 2017075295 A1 | 5/2017 |

\* cited by examiner

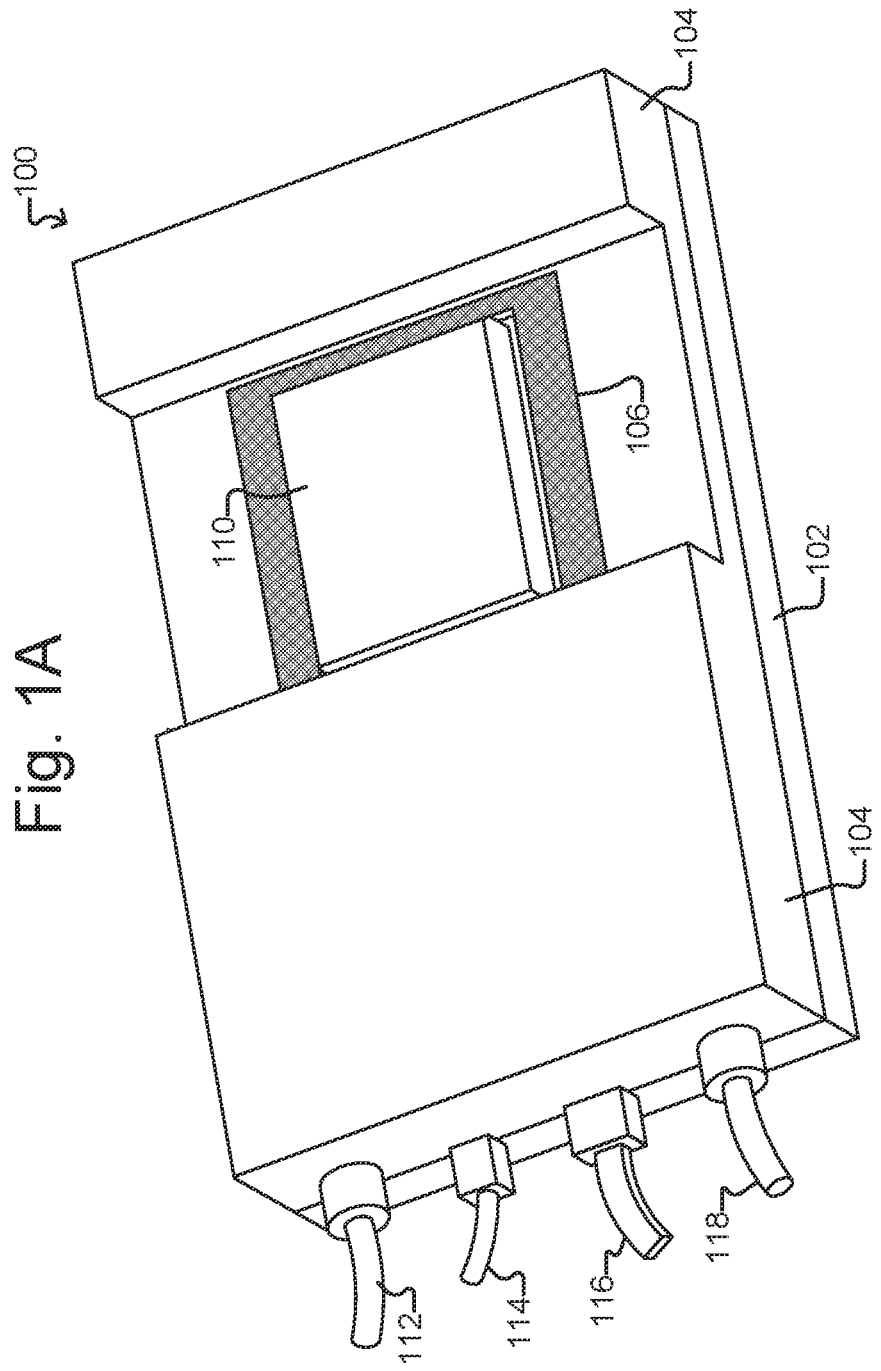

Fig. 5
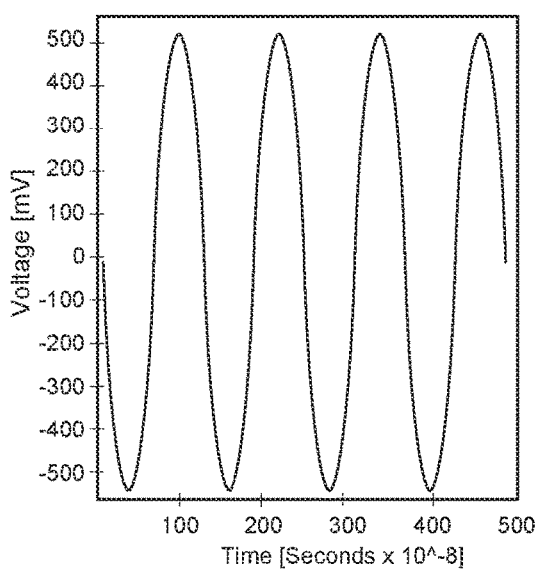
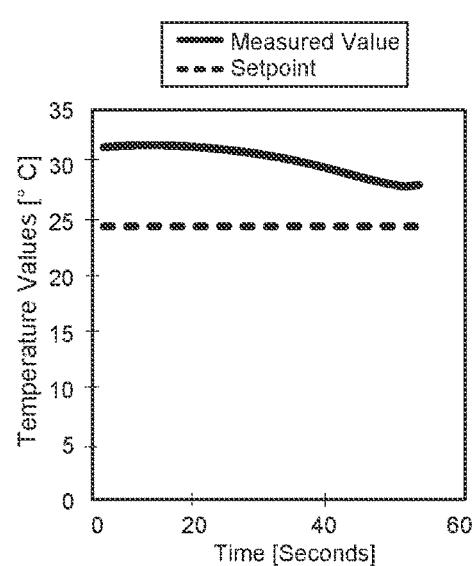

SYSTEMS FOR OPERATING MICROFLUIDIC DEVICES

FIELD

The present application relates generally to systems for use with microfluidic devices. In particular, the present application describes systems for operating microfluidic devices.

BACKGROUND

As the field of microfluidics continues to progress, microfluidic devices have become convenient platforms for processing and manipulating micro-objects such as biological cells. Microfluidic devices offer some desirable capabilities, including the ability to select and manipulate individual micro-objects. Such microfluidic devices require various inputs and outputs (e.g., fluid, pressure, vacuum, heat, cooling, light, etc.) to function. Systems for operating microfluidic devices assist with these inputs and outputs.

SUMMARY

This application describes systems for operating microfluidic devices. In exemplary embodiments, a system for operating a microfluidic device is provided, the system comprising: a first surface configured to interface and operatively couple with a microfluidic device; and a lid configured to retain the microfluidic device on the first surface, the lid comprising: a first lid portion having a first fluid port configured to operatively couple with and flow fluidic medium into and/or out of a first fluid inlet/outlet of the microfluidic device; and a second lid portion having a second fluid port configured to operatively couple with and flow fluidic medium into and/or out of a second fluid inlet/outlet of the microfluidic device, wherein the second lid portion is separable from the first lid portion and movable between a closed position in which the second fluid port of the second lid portion is operatively coupled with the second fluid inlet/outlet of the microfluidic device and an open position in which a portion of the microfluidic device that contains the second fluid inlet/outlet is exposed.

In other exemplary embodiments, a system for operating a microfluidic device is provided, the system comprising: a support configured to hold and operatively couple with the microfluidic device; a first fluid line having a distal end configured to be fluidically coupled to an inlet port of the microfluidic device, and a second fluid line having a proximal end configured to be fluidically coupled to an outlet port of the microfluidic device, respectively, when the microfluidic device is held by, and operatively coupled with, the support; at least one flow controller operatively coupled with one or both of the first and second fluid lines, the at least one flow controller comprising a first thermally-controlled flow controller operatively coupled with a flow segment of one or both of the first fluid line and the second fluid line to selectively allow fluid to flow therethrough; and a light modulating subsystem configured to emit structured light onto the microfluidic device when the microfluidic device is held by, and operatively coupled with, the support.

In still other exemplary embodiments, a method for analyzing a fluid sample is provided, the method comprising: connecting a microfluidic device to a system for operating the microfluidic device, wherein the system comprises: a first surface configured to interface and operatively couple with a microfluidic device; and a lid configured to retain the microfluidic device on the first surface, the lid comprising: a first lid portion having a first fluid port configured to operatively couple with and flow fluidic medium into and/or out of a first fluid inlet/outlet of the microfluidic device; and a second lid portion having a second fluid port configured to operatively couple with and flow fluidic medium into and/or out of a second fluid inlet/outlet of the microfluidic device, wherein the second lid portion is separable from the first lid portion and movable between a closed position in which the second fluid port of the second portion of the cover is operatively coupled with the second fluid inlet/outlet of the microfluidic device and an open position in which a portion of the microfluidic device that contains the second fluid inlet/outlet is exposed; moving the second lid portion from the closed position to the open position, thereby exposing the second fluid inlet/outlet of the microfluidic device; providing a fluid sample in fluidic communication with the second fluid inlet/outlet of the microfluidic device; applying suction to the first fluid line, thereby pulling at least a portion of the fluid sample into the microfluidic device; and processing the at least a portion of the fluid sample that is pulled into the microfluidic device.

A partial listing of embodiments is as follows:

Embodiments 1. A system for operating a microfluidic device, the system comprising: a first surface configured to interface and operatively couple with a microfluidic device; and a lid configured to retain the microfluidic device on the first surface, the lid comprising: a first lid portion having a first fluid port configured to operatively couple with and flow fluidic medium into and/or out of a first fluid inlet/outlet of the microfluidic device; and a second lid portion having a second fluid port configured to operatively couple with and flow fluidic medium into and/or out of a second fluid inlet/outlet of the microfluidic device, wherein the second lid portion is separable from the first lid portion and movable between a closed position in which the second fluid port of the second lid portion is operatively coupled with the second fluid inlet/outlet of the microfluidic device and an open position in which a portion of the microfluidic device that contains the second fluid inlet/outlet is exposed.

Embodiment 2. The system of embodiments 1, wherein the first lid portion retains the microfluidic device on the first surface when the second lid portion is in the open position.

Embodiment 3. The system of embodiments 1 or 2, wherein the first fluid port of the first lid portion remains operatively coupled with the first fluid inlet/outlet of the microfluidic device when the second lid portion is in the open position.

Embodiment 4. The system of any one of embodiments 1 to 3, wherein the first fluid port of the first lid portion is connected to a pump configured to remove fluid from the microfluidic device.

Embodiment 5. The system of any one of embodiments 1 to 4, wherein the first lid portion further comprises a first fluid line connected to the first fluid port.

Embodiment 6. The system of any one of embodiments 1 to 5, wherein the second lid portion further comprises a second fluid line connected to the second fluid port.

Embodiment 7. The system of any one of embodiments 1 to 6, wherein the lid further comprises a hinge configured to move the second portion of the cover between the open position and the closed position.

Embodiment 8. The system of any one of embodiments 1 to 7, wherein the lid further comprises a latch configured to releasably hold the second lid portion in the closed position.

Embodiment 9. The system of any one of embodiments 1 to 8, further comprising an insert configured to operatively couple with and flow fluidic medium into the second fluid inlet/outlet of the microfluidic device when the second lid portion is in the open position.

Embodiment 10. The system of embodiment 9, wherein the insert is configured to interface with the first lid portion.

Embodiment 11. The system of embodiments 9 or 10, wherein the insert contains a fluid well configured to fluidically communicate with the second fluid inlet/outlet of the microfluidic device.

Embodiment 12. The system of embodiment 11, wherein the fluid well is configured to hold a fluid sample of about 50 microliters or less, about 45 microliters or less, about 40 microliters or less, about 35 microliters or less, about 30 microliters or less, about 25 microliters or less, about 20 microliters or less, about 15 microliters or less, about 10 microliters or less, about 5 microliters or less, or any range formed by two of these endpoints.

Embodiment 13. The system of embodiment 11, wherein the fluid well is configured to hold a fluid sample ranging from about 5 microliters to about 25 microliters, from about 5 microliters to about 20 microliters, from about 5 microliters to about 15 microliters, or from about 5 microliters to about 10 microliters.

Embodiment 14. The system of any one of embodiments 1 to 13, wherein the first surface is comprised by a support (or "nest").

Embodiment 15. The system of embodiment 14, wherein the support comprises a socket configured to receive and interface with the microfluidic device.

Embodiment 16. The system of any one of embodiments 1 to 15, further comprising an electrical signal generation subsystem configured to apply a biasing voltage across a pair of electrodes in the microfluidic device when the microfluidic device is operatively coupled with the first surface or the support.

Embodiment 17. The system of embodiment 16, wherein the electrical signal generation subsystem comprises a waveform generator configured to generate a biasing voltage waveform to be applied across the electrode pair when the microfluidic device is operatively coupled with the first surface or the support.

Embodiment 18. The system of embodiment 17, wherein the electrical signal generation subsystem further comprises a waveform amplification circuit configured to amplify the biasing voltage waveform generated by the waveform generator.

Embodiment 19. The system of embodiments 17 or 18, wherein the electrical signal generation subsystem further comprises an oscilloscope configured to measure the biasing voltage waveform, and, optionally, wherein data from the measurement is provided as feedback to the waveform generator.

Embodiment 20. The system of any of embodiments 1 to 19, further comprising a thermal control subsystem configured to regulate a temperature of the microfluidic device when the microfluidic device is operatively coupled with the first surface or the support.

Embodiment 21. The system of embodiment 20, wherein the thermal control subsystem comprises a thermoelectric power module, a Peltier thermoelectric device, and a cooling unit, wherein the thermoelectric power module is configured to regulate a temperature of the Peltier thermoelectric device, and optionally, wherein the Peltier thermoelectric device is interposed between the first surface and a surface of the cooling unit.

Embodiment 22. The system of embodiment 21, wherein said cooling unit comprises a liquid cooling device, a cooling block, and a liquid path configured to circulate cooled liquid between the liquid cooling device and the cooling block, and wherein the cooling block comprises the surface of the cooling unit.

Embodiment 23. The system of embodiment 21 or 22, wherein the Peltier thermoelectric device and the thermoelectric power module are mounted on and/or integrated with the support.

Embodiment 24. The system of any of embodiments 14 to 23, wherein the support further comprises a microprocessor that controls one or both of the electrical signal generation subsystem and the thermoelectric power module.

Embodiment 25. The system of embodiments 24, wherein the support comprises a printed circuit board (PCB), and wherein at least one of the electrical signal generation subsystem, the thermoelectric power module, and the microprocessor are mounted on and/or integrated with the PCB.

Embodiment 26. The system of embodiments 24 or 25, further comprising an external computational device operatively coupled with the microprocessor, optionally wherein the external computational device comprises a graphical user interface configured to receive operator input and for processing and transmitting the operator input to the microprocessor for controlling one or both of the electrical signal generation subsystem and the thermal control subsystem.

Embodiment 27. The system of embodiment 26, wherein the microprocessor is configured to transmit to the external computational device data and/or information sensed or received, or otherwise calculated based upon data or information sensed or received, from one or both of the electrical signal generation subsystem and the thermal control subsystem.

Embodiment 28. The system of embodiment 16 or 27, wherein the microprocessor and/or the external computational device are configured to measure and/or monitor an impedance of an electrical circuit across the electrodes of the microfluidic device when the microfluidic device is operatively coupled with the support.

Embodiment 29. The system of embodiment 28, wherein the microprocessor and/or the external computational device are configured to determine a flow volume of a fluid path based upon a detected change in the measured and/or monitored impedance of the electrical circuit, the fluid path comprising at least part of a microfluidic circuit within the microfluidic device.

Embodiment 30. The system of embodiment 28, wherein the microprocessor and/or the external computational device are configured to determine a height of an interior chamber of the microfluidic device based upon a detected change in the measured and/or monitored impedance of the electrical circuit.

Embodiment 31. The system of embodiment 28, wherein the microprocessor and/or the external computational device are configured to determine one or more characteristics of chemical and/or biological material contained within the microfluidic circuit of the microfluidic device based upon a detected change in the measured and/or monitored impedance of the electrical circuit.

Embodiment 32. The system of any one of embodiments 1 to 31 further comprising a light modulating subsystem configured to emit structured light onto the microfluidic device when the microfluidic device is operatively coupled with the first surface (or support).

Embodiment 33. The system of any one of embodiments 1 to 32, wherein the first surface, the support, and/or the light modulating subsystem is/are configured to be mounted on a light microscope.

Embodiment 34. The system of any of embodiments 1 to 32, wherein the first surface, the support, and/or said light modulating subsystem are integral components of a light microscope.

Embodiment 35. The system of any one of embodiments 6 to 34 further comprising at least one (e.g., two or more, one of which can be a pump) flow controller operatively coupled with one or both of the first and second fluid lines.

Embodiment 36. The system of embodiment 35, wherein the at least one flow controller comprises a first thermally-controlled flow controller operatively coupled with the first fluid line and/or the second fluid line, to selectively allow fluid to flow therethrough.

Embodiment 37. The system of embodiment 36, wherein the first thermally-controlled flow controller comprises a Peltier thermoelectric device configured to controllably lower or raise a temperature of fluid contained in a flow segment of the first fluid line, wherein the temperature is lowered or raised sufficiently to freeze or thaw, respectively, the fluid contained in the flow segment of the first fluid line, and thereby selectively prevent or allow fluid to flow through the first fluid line and into or out of the first fluid inlet/outlet of the microfluidic device.

Embodiment 38. The system of embodiment 37, wherein said first thermally-controlled flow controller further comprises: a first housing having a first passageway through which the flow segment of the first fluid line extends, the housing further containing the Peltier thermoelectric device; and/or insulating material at least partially surrounding the flow segment of the first fluid line; and, optionally a first thermally conductive interface coupled with the flow segment of the first fluid line.

Embodiment 39. The system of any one of embodiments 36 to 38, wherein the at least one flow controller comprises a second thermally-controlled flow controller operatively coupled with the other one of the first fluid line and the second fluid line to selectively allow fluid to flow therethrough.

Embodiment 40. The system of embodiment 39, wherein the second thermally-controlled flow controller comprises a Peltier thermoelectric device configured to controllably lower or raise a temperature of fluid contained in a flow segment of the second fluid line, wherein the temperature is lowered or raised sufficiently to freeze or thaw, respectively, the fluid contained in the flow segment of the second fluid line, and thereby selectively prevent or allow fluid to flow out of or into the second fluid inlet/outlet of the microfluidic device.

Embodiment 41. The system of embodiment 40, wherein said second thermally-controlled flow controller further comprises: a second housing having a second passageway through which the flow segment of the second fluid line extends, the housing further containing the Peltier thermoelectric device; and/or insulating material at least partially surrounding the flow segment of the second fluid line; and, optionally a first thermally conductive interface coupled with the flow segment of the first fluid line.

Embodiment 42. The system of embodiment 35, wherein the at least one flow controller comprises a thermally-controlled flow controller operatively coupled with the first and second fluid lines, the thermally-controlled flow controller comprising: at least one flow-control Peltier thermoelectric device configured to controllably lower or raise a temperature of flow segments of the first and second fluid lines, wherein the temperature is lowered or raised sufficiently to freeze or thaw, respectively, the fluid contained in the flow segments of the first and second fluid lines, and thereby selectively prevent or allow fluid to flow through the first fluid line into the first fluid inlet/outlet of the microfluidic device and out from the second fluid inlet/outlet of the microfluidic device and through the second fluid line, or vice versa.

Embodiment 43. The system of embodiment 42, wherein the at least one flow-control Peltier thermoelectric device comprises at least a first flow-control Peltier thermoelectric device thermally coupled to the flow segment of the first fluid line, and a second flow-control Peltier thermoelectric device thermally coupled to the flow segment of the second fluid line.

Embodiment 44. The system of embodiment 42 or 43, wherein the thermally-controlled flow controller further comprises a housing having a first passageway through which the flow segment of the first fluid line extends, and a second passageway through which the flow segment of the outflow fluid line extends, wherein the at least one flow-control Peltier thermoelectric device is mounted in the housing.

Embodiment 45. The system of embodiment 44, wherein the housing defines a thermally insulating chamber.

Embodiment 46. The system of any of embodiments 32 to 45, wherein said light modulating subsystem comprises a digital mirror device (DMD) or a microshutter array system (MSA).

Embodiment 47. The system of any of embodiments 32 to 45, wherein said light modulating subsystem comprises a liquid crystal display (LCD), a liquid crystal on silicon device (LCOS), a ferroelectric liquid crystal on silicon device (FLCOS), or a scanning laser device.

Embodiment 48. The system of any of embodiments 32 to 47, wherein said light modulating subsystem includes a multi-input light pipe, said light pipe comprising:

a housing having a plurality of input apertures, each input aperture configured to receive light emitted from a respective light source, the housing further having an output aperture configured to emit light received through the input apertures; a first light propagation pathway extending within the housing from a first input aperture to the output aperture; a first dichroic filter positioned within the housing at an oblique angle across the first light propagation pathway, the first dichroic filter configured and positioned so that light received through the first light aperture passes through the first dichroic filter as it propagates along the first light propagation pathway to the output aperture; and a second light propagation pathway extending within the housing from a second input aperture to the first dichroic filter, the second propagation pathway and first dichroic filter configured and dimensioned so that light received through the second input aperture propagates along the second light propagation pathway and is reflected onto the first light propagation pathway to the output aperture by the first dichroic filter, wherein the respective input apertures, first and second light propagation pathways, first dichroic filter, and output aperture are sized, dimensioned and configured such that light emitted by at least one light source and received through at least one of the first and second input apertures is emitted at substantially uniform intensity out the output aperture.

Embodiment 49. The system of embodiment 48, the light pipe further comprising: a second dichroic filter positioned within the housing at an oblique angle across the first light propagation pathway between the first dichroic filter and the output aperture, the second dichroic filter configured and positioned so that light received through the first and second light apertures passes through the second dichroic filter as said received light propagates along the first light propagation pathway to the output aperture, and a third light propagation pathway extending within the housing from a third input aperture to the second dichroic filter, the third propagation pathway and second dichroic filter configured and dimensioned so that light received through the third input aperture propagates along the third light propagation pathway and is reflected onto the first light propagation pathway to the output aperture by the second dichroic filter.

Embodiment 50. The system of embodiment 48, said light modulating subsystem further including a first light source having an output optically coupled with the first input aperture of the light pipe.

Embodiment 51. The system of embodiment 50, wherein the first light source comprises a plurality of first light source emitting elements.

Embodiment 52. The system of embodiment 51, wherein one or more of the plurality of first light source emitting elements emits light at a first narrowband wavelength.

Embodiment 53. The system of any one of embodiments 50 to 52, the light modulating subsystem further including a second light source having an output optically coupled with the second input aperture of the light pipe.

Embodiment 54. The system of embodiment 53, wherein the second light source comprising a plurality of second light source emitting elements.

Embodiment 55. The system of embodiment 54, wherein one or more of the plurality of second light source emitting elements emits light at the first narrowband wavelength or a second narrowband wavelength different from the first narrowband wavelength.

Embodiment 56. The system of embodiment 54, the plurality of first light source emitting elements and the plurality of second light source emitting elements collectively including a first subset of one or more light emitting elements that emit light at the first narrowband wavelength, and a second subset of one or more light emitting elements that emit light at a second narrowband wavelength different from the first narrowband wavelength, such that light comprising one or both of the first narrowband wavelength and second narrowband wavelength may be controllably emitted out the light pipe output aperture by selectively activating one or both of the plurality of first light emitting elements and the plurality of second light source emitting elements.

Embodiment 57. The system of embodiment 56, wherein light emitted by the first subset of light emitting elements and received through the first and/or second input apertures is emitted out the output aperture of the light pipe at a first substantially uniform intensity, and light emitted by the second subset of light emitting elements and received through the first and/or second input apertures is emitted out the output aperture at a second substantially uniform intensity.

Embodiment 58. The system of embodiment 57, wherein the first substantially uniform intensity is different from the second substantially uniform intensity.

Embodiment 59. The system of any of embodiments 56 to 58, wherein the first narrowband wave length and the second narrowband wavelength are each selected from the group consisting of: approximately 380 nm; approximately 480 nm; and approximately 560 nm.

Embodiment 60. The system of any of embodiments 43 to 46, the plurality of light emitting elements of the first light source comprising or consisting of all of the first subset of light emitting elements, and the plurality of light emitting elements of the second light source comprising or consisting of all of the second subset of light emitting elements.

Embodiment 61. The system of any of embodiments 40 to 47, said light modulating subsystem further including: a third light source having an output optically coupled with the third input aperture of the light pipe.

Embodiment 62. The system of embodiment 61, the third light source comprising a plurality of third light source emitting elements.

Embodiment 63. The system of embodiment 62, wherein one or more of the plurality of third light source emitting elements emits light at the first narrowband wavelength, the second narrowband wavelength, or a third narrowband wavelength different from each of the first and second narrowband wavelengths.

Embodiment 64. The system of embodiment 62, wherein the plurality of first light source emitting elements, the plurality of second light source emitting elements, and the plurality of third light source emitting elements collectively including a first subset of one or more light emitting elements that emit light at the first narrowband wavelength, a second subset of one or more light emitting elements that emit light at the second narrowband wavelength different from the first narrowband wavelength, and a third subset of one or more light emitting elements that emit light at a third narrowband wavelength different from each of the first and second narrowband wavelengths, such that light comprising one or more of the first narrowband wavelength, second narrowband wavelength, and third narrowband wavelength may be controllably emitted out the light pipe output aperture by selectively activating one or more of the first, second and third subsets of light emitting elements.

Embodiment 65. The system of embodiment 64, wherein light emitted by the first subset of light emitting elements and received through any of the first, second and third input apertures is emitted out the output aperture at a first substantially uniform intensity, light emitted by the second subset of light emitting elements and received through any of the first, second and third input apertures is emitted out the output aperture at a second substantially uniform intensity, and light emitted by the third subset of light emitting elements and received through any of the first, second and third input apertures is emitted out the output aperture at a third substantially uniform intensity.

Embodiment 66. The system of embodiment 65, wherein the first substantially uniform intensity is different from one or both of the second substantially uniform intensity and third substantially uniform intensity.

Embodiment 67. The system of any of embodiments 64 to 66, wherein the first narrowband wave length is approximately 380 nm, the second narrowband wavelength is approximately 480 nm, and the third narrowband wavelength is approximately 560 nm.

Embodiment 68. The system of any of embodiments 64 to 67, the plurality of light emitting elements of the first light source comprising or consisting of all of the first subset of light emitting elements, the plurality of light emitting elements of the second light source comprising or consisting of all of the second subset of light emitting elements, and the plurality of light emitting elements of the third light source comprising or consisting of all of the third subset of light emitting elements.

Embodiments 69. A microscope configured for operating a microfluidic device, said microscope comprising: a support configured to hold and operatively couple with a microfluidic device (e.g., a support according to any one of embodiments 14 to 31 or 35 to 45); a light modulating subsystem configured to emit structured light; and an optical train, wherein when the microfluidic device is held by, and operatively coupled with, the support, the optical train is configured to: (1) focus structured light emitted by the light modulating subsystem onto at least a first region of the microfluidic device, (2) focus unstructured light emitted by an unstructured light source onto at least a second region of the microfluidic device, and (3) capture reflected and/or emitted light from the microfluidic device and direct the captured light to a detector.

Embodiment 70. The microscope of embodiments 69, further comprising the detector.

Embodiment 71. The microscope of embodiments 69 or 70, wherein the detector comprises an eye piece and/or an imaging device.

Embodiment 72. The microscope of any of embodiments 69 to 71, wherein the light modulating subsystem comprises a digital mirror device (DMD) or a microshutter array system (MSA).

Embodiment 73. The microscope of any of embodiments 69 to 71, wherein the light modulating subsystem comprises a liquid crystal display (LCD), a liquid crystal on silicon device (LCOS), a ferroelectric liquid crystal on silicon device (FLCOS), or a scanning laser device.

Embodiment 74. The microscope of any of embodiments 69 to 73, further comprising a controller for controlling said light modulating subsystem.

Embodiment 75. The microscope of any of embodiments 69 to 74, wherein said optical train comprises an objective which is configured to focus said structured light on said first region of said microfluidic device and/or said unstructured light on said second region of said microfluidic device, and wherein said objective is selected from the group comprising: a 10× objective; a 5× objective; a 4× objective; and a 2× objective.

Embodiment 76. The microscope of any of embodiments 69 to 75, wherein said optical train comprises a dichroic filter configured to substantially prevent structured light emitted by said light modulating subsystem (and reflected by said microfluidic device) from reaching the detector.

Embodiment 77. The microscope of any of embodiments 69 to 75, wherein said optical train comprises a dichroic filter configured to balance an amount of visible structured light emitted by the light modulating subsystem (and reflected by said microfluidic device) and an amount of visible unstructured light emitted by the unstructured light source (and reflected by said microfluidic device) that reaches the detector.

Embodiment 78. The microscope of any of embodiments 69 to 75, wherein said light modulating subsystem emits structured white light.

Embodiment 79. The microscope of any of embodiments 69 to 75, wherein said light modulating subsystem comprises a Mercury or Xenon arc lamp.

Embodiment 80. The microscope of any of embodiments 69 to 75, wherein said light modulating subsystem comprises one or more LEDs.

Embodiment 81. The microscope of any of embodiments 69 to 75, wherein said unstructured light source comprises one or more LEDs.

Embodiment 82. The microscope of embodiment 81, wherein said unstructured light source emits light having a wavelength of approximately 495 nm or shorter.

Embodiment 83. The microscope of embodiment 81, wherein said unstructured light source emits blue light.

Embodiment 84. The microscope of embodiment 82 or 83, wherein said optical train comprises a dichroic filter configured to at least partially filter out visible light having a wavelength longer than 495 nm.

Embodiment 85. The microscope of embodiment 81, wherein said unstructured light source emits light having a wavelength of approximately 650 nm or longer.

Embodiment 86. The microscope of embodiment 81, wherein said unstructured light source emits red light.

Embodiment 87. The microscope of embodiment 85 or 86, wherein said optical train comprises a dichroic filter configured to at least partially filter out visible light having a wavelength shorter than 650 nm.

Embodiment 88. The microscope of any of embodiments 69 to 87, wherein said support comprises an integrated electrical signal generation subsystem configured to apply a biasing voltage across a pair of electrodes in said microfluidic device when said device is held by, and operatively coupled with, said support.

Embodiment 89. The microscope of any of embodiments 69 to 88, wherein said support comprises a thermal control subsystem configured to regulate a temperature of said microfluidic device when said device is held by, and operatively coupled with, said support, said support.

Embodiments 90. A method for analyzing a fluid sample, the method comprising: connecting a microfluidic device to a system for operating the microfluidic device, wherein the system comprises: a first surface configured to interface and operatively couple with a microfluidic device; and a lid configured to retain the microfluidic device on the first surface, the lid comprising: a first lid portion having a first fluid port configured to operatively couple with and flow fluidic medium into and/or out of a first fluid inlet/outlet of the microfluidic device; and a second lid portion having a second fluid port configured to operatively couple with and flow fluidic medium into and/or out of a second fluid inlet/outlet of the microfluidic device, wherein the second lid portion is separable from the first lid portion and movable between a closed position in which the second fluid port of the second portion of the cover is operatively coupled with the second fluid inlet/outlet of the microfluidic device and an open position in which a portion of the microfluidic device that contains the second fluid inlet/outlet is exposed; moving the second lid portion from the closed position to the open position, thereby exposing the second fluid inlet/outlet of the microfluidic device; providing a fluid sample in fluidic communication with the second fluid inlet/outlet of the microfluidic device; applying suction to the first fluid line, thereby pulling at least a portion of the fluid sample into the microfluidic device; and processing the at least a portion of the fluid sample that is pulled into the microfluidic device.

Embodiment 91. The method of embodiments 90 further comprising: placing an insert in the location previously occupied by the second lid portion in the closed position, the insert containing a fluid well configured to fluidically communicate with the second fluid inlet/outlet of the microfluidic device; wherein providing the fluid sample comprises introducing the fluid sample into the fluid well of the insert.

Embodiment 92. The method of embodiment 90 or 91, wherein the system is the system of any one of embodiments 1 to 68.

Embodiment 93. The method of embodiment 90 or 91, wherein the system is the microscope of any one of embodiments 69 to 89.

Embodiment 94. The method of any one of embodiments 90 to 93, wherein suction is applied sufficient to pull a preselected volume (e.g., about 2 microliters to about 10 microliters, or about 3 microliters to about 7 microliters) of fluid sample into the microfluidic chip, at which point the suction is stopped.

Embodiment 95. The method of any one of embodiments 90 to 94, wherein the fluid sample comprises micro-objects, optionally biological micro-objects (e.g., cells).

Embodiment 96. The method of any one of embodiments 90 to 95, wherein the microfluidic device comprises (i) a flow region having a plurality of microfluidic channels, and (ii) a plurality of chambers, such as sequestration pens (e.g., as described in PCT Publications WO 2014/070873 and WO 2015/061497, the entire contents of each of which are incorporated herein by reference), wherein each chamber of the plurality is fluidically connected to one of the plurality of microfluidic channels.

Embodiment 97. The method of any one of embodiments 90 to 96, wherein processing the at least a portion of the fluid sample comprises imaging the sample while it is contained within the microfluidic chip.

Embodiment 98. The method of embodiment 97, wherein the imaging comprises imaging micro-objects contained within the at least a portion of the fluid sample.

Embodiment 99. The method of embodiment 96, wherein processing the at least a portion of the fluid sample comprising performing an assay on micro-objects contained within the at least a portion of the fluid sample.

Embodiment 100. The method of embodiment 99, wherein the assay provides for detection of cell secretions and/or nucleic acids released by cells (e.g., any of the assays described in PCT Publications WO 2014/070783, WO 2015/061497, WO 2015/061506, WO 2015/095623, WO 2017/181135, WO 2018/064640, WO 2018/076024, WO 2019/075476, and WO 2019/133874, or PCT Application Numbers PCT/US2019/041692 and PCT/US2019/024623, the entire contents of each of which are incorporated herein by reference).

Embodiments 101. A system for operating a microfluidic device, said system comprising: a support configured to hold and operatively couple with the microfluidic device; a first fluid line having a distal end configured to be fluidically coupled to an inlet port of the microfluidic device, and a second fluid line having a proximal end configured to be fluidically coupled to an outlet port of the microfluidic device, respectively, when the microfluidic device is held by, and operatively coupled with, said support; at least one (e.g., two or more, one of which can be a pump) flow controller operatively coupled with one or both of the first and second fluid lines, the at least one flow controller comprising a first thermally-controlled flow controller operatively coupled with a flow segment of one or both of said first fluid line and said second fluid line to selectively allow fluid to flow therethrough; and a light modulating subsystem configured to emit structured light onto the microfluidic device when the microfluidic device is held by, and operatively coupled with, the support.

Embodiment 102. The system of embodiments 101, further comprising an electrical signal generation subsystem configured to apply a biasing voltage across a pair of electrodes in the microfluidic device when microfluidic device is held by, and operatively coupled with, the support.

Embodiment 103. The system of embodiment 101 or 102, wherein the system comprises any of the elements (e.g., alone or in combination) of the system of any one of embodiments 1 to 68 and 116 to 122 or the microscope of any one of embodiments 69 to 89.

Embodiment 104. The system of embodiment 37 or 101 to 103, wherein said first thermally-controlled flow controller further comprises: a thermally conductive interface coupled with the flow segment of the first and second fluid lines; and a Peltier thermoelectric device configured to contact the thermally conductive interface and controllably lower or raise a temperature of fluid contained in the flow segment of the first and/or second fluid lines.

Embodiment 105. The system of embodiment 104, wherein the temperature is lowered or raised sufficiently to freeze or thaw, respectively, the fluid contained in the flow segment of the first and/or second fluid line, and thereby selectively prevent or allow fluid to flow out of or into the first and/or second fluid inlet/outlet of the microfluidic device.

Embodiment 106. The system of embodiment 104 or 105, wherein the thermally conductive interface comprises a thermistor.

Embodiment 107. The system of embodiment 106, wherein the thermistor is positioned in a region located between the flow segments of the first and second fluid lines.

Embodiment 108. The system of any one of embodiments 104 to 107, wherein the thermally conductive interface is located between at least two Peltier thermoelectric devices.

Embodiment 109. The system of embodiment 108, wherein the first thermally-controlled flow controller further comprises a conduit to conduct heat away from one of the at least two Peltier thermoelectric devices.

Embodiment 110. The system of any one of embodiments 104 to 109, wherein the first thermally-controlled flow controller further comprises a heat sink.

Embodiment 111. The system of any one of embodiments 104 to 110, wherein the thermally conductive interface is configured to directly contact (e.g., rest on) an upper surface of the Peltier thermoelectric device.

Embodiment 112. The system of any one of embodiments 104 to 111, wherein the first thermally-controlled flow controller comprises a cover containing guides for the flow segments of the first and second fluid lines to be inserted into the thermally conductive interface.

Embodiment 113. The system of any one of embodiments 104 to 112, further comprising a barrier material located internal to the thermally-controlled flow controller, wherein the barrier material (e.g., an insulating polymer or spray foam) is sufficient to prevent ice formation.

Embodiment 114. The system of embodiment 113, wherein the barrier material substantially fills any empty space which would otherwise be present within the cover of the first thermally-controlled flow controller.

Embodiment 115. The system of any one of embodiments 104 to 114, wherein the first thermally-controlled flow controller is configured to control fluid flow both into and out of a microfluidic device (e.g., a single microfluidic device).

Embodiment 116. The system of any one of embodiments 1 to 68, wherein the support contains a sensor configured to determine when the second lid portion is in the closed position.

Embodiment 117. The system of embodiment 116, wherein the sensor is further configured to determine when the insert interfaces with the microfluidic device.

Embodiment 118. The system of any one of embodiments 116 to 117, wherein the sensor comprises a first optical switch configured to be interrupted and indicate when the second lid portion is in the closed position.

Embodiment 119. The system of any one of embodiments 116 to 118, wherein the sensor comprises a second optical switch configured to be interrupted and indicate when the insert interfaces with the microfluidic device.

Embodiment 120. The system of any one of embodiments 116 to 119, wherein the sensor contains a first extender configured to be extended into and thereby interrupt the first optical switch by a first actuator contained in the second lid portion.

Embodiment 121. The system of any one of embodiments 116 to 120, wherein the sensor contains a second extender configured to be extended into and thereby interrupt the second optical switch by a second actuator contained in the insert.

Embodiment 122. The system of any one of embodiments 116 to 121, wherein the sensor detects when the second lid portion is in the open position and the insert does not interface with the microfluidic device when the optical path of the first and second optical switches are not interrupted.

Embodiment 123. The method of embodiment 90 or 91, wherein the microfluidic device comprises (i) a flow region having a plurality of microfluidic channels, and (ii) a plurality of chambers, wherein each chamber of the plurality is fluidically connected to one of the plurality of microfluidic channels.

Embodiment 124. The method of embodiment 123, wherein the method results in an imported cell density of at least 4×10^6.

Other aspects and advantages of the disclosed systems, microscopes, and methods will be evident in the detailed description that follows, as well as the claims appended hereto.

BRIEF DESCRIPTION OF THE DRAWINGS

The drawings illustrate the design and utility of embodiments of the disclosed systems, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments of the disclosed systems and are not therefore to be considered limiting of its scope.

FIG. 1A is a perspective view of a support, configured to hold a microfluidic device, according to some embodiments.

FIG. 5 is an exemplary screen shot depicting a graphical user interface (GUI) used to control both an electrical signal generation subsystem and a thermal control subsystem, according to some embodiments of the systems.

FIG. 8A illustrates how the light intensity measured at the sample plane can vary across a field of view. FIG. 8B illustrates an inverted function that can be used to control the light intensity output from a light modulating subsystem. FIG. 8C illustrates the light intensity measured at the sample plane when the inverted function, such as shown in FIG. 8B, is used to control the light intensity output from a light source that would otherwise produce the pattern of light intensity shown in FIG. 8A.

DETAILED DESCRIPTION OF EXEMPLARY EMBODIMENTS

Figure 1B:
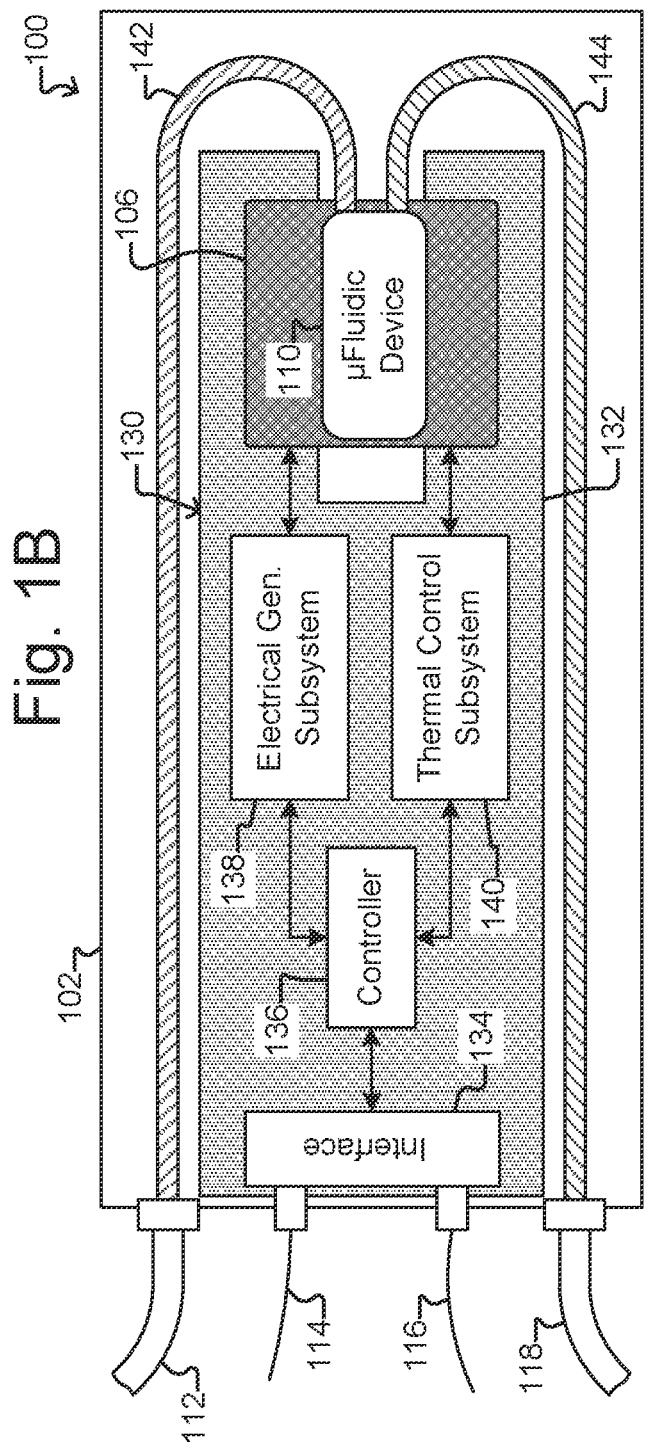
FIG. 1B is a schematic view of the support shown in FIG. 1A, with the cover removed for clarity.

This specification describes exemplary embodiments and applications of the disclosure. The disclosure, however, is not limited to these exemplary embodiments and applications or to the manner in which the exemplary embodiments and applications operate or are described herein. Moreover, the figures may show simplified or partial views, and the dimensions of elements in the figures may be exaggerated or otherwise not in proportion. In addition, as the terms "on," "attached to," "connected to," "coupled to," or similar words are used herein, one element (e.g., a material, a layer, a substrate, etc.) can be "on," "attached to," "connected to," or "coupled to" another element regardless of whether the one element is directly on, attached to, connected to, or coupled to the other element or there are one or more intervening elements between the one element and the other element. Also, unless the context dictates otherwise, directions (e.g., above, below, top, bottom, side, up, down, under, over, upper, lower, horizontal, vertical, "x," "y," "z," etc.), if provided, are relative and provided solely by way of example and for ease of illustration and discussion and not by way of limitation. In addition, where reference is made to a list of elements (e.g., elements a, b, c), such reference is intended to include any one of the listed elements by itself, any combination of less than all of the listed elements, and/or a combination of all of the listed elements. Section divisions in the specification are for ease of review only and do not limit any combination of elements discussed.

As used herein, "substantially" means sufficient to work for the intended purpose. The term "substantially" thus allows for minor, insignificant variations from an absolute or perfect state, dimension, measurement, result, or the like such as would be expected by a person of ordinary skill in the field but that do not appreciably affect overall performance. When used with respect to numerical values or parameters or characteristics that can be expressed as numerical values, "substantially" means within ten percent.

The term "ones" means more than one. As used herein, the term "plurality" can be 2, 3, 4, 5, 6, 7, 8, 9, 10, or more.

As used herein: μm means micrometer, $μm^3$ means cubic micrometer, pL means picoliter, nL means nanoliter, and μL (or uL) means microliter.

As used herein, a "microfluidic device" or "microfluidic apparatus" is a device that includes one or more discrete microfluidic circuits configured to hold a fluid, each microfluidic circuit comprised of fluidically interconnected circuit elements, including but not limited to region(s), flow path(s), channel(s), chamber(s), and/or pen(s), and at least one port configured to allow the fluid (and, optionally, micro-objects suspended in the fluid) to flow into and/or out of the microfluidic device. Typically, a microfluidic circuit of a microfluidic device will include a flow region, which may include a microfluidic channel, and at least one chamber, and will hold a volume of fluid of less than about 1 mL, e.g., less than about 750, 500, 250, 200, 150, 100, 75, 50, 25, 20, 15, 10, 9, 8, 7, 6, 5, 4, 3, or 2 μL. In certain embodiments, the microfluidic circuit holds about 1-2, 1-3, 1-4, 1-5, 2-5, 2-8, 2-10, 2-12, 2-15, 2-20, 5-20, 5-30, 5-40, 5-50, 10-50, 10-75, 10-100, 20-100, 20-150, 20-200, 50-200, 50-250, or 50-300 μL. The microfluidic circuit may be configured to have a first end fluidically connected with a first port (e.g., an inlet) in the microfluidic device and a second end fluidically connected with a second port (e.g., an outlet) in the microfluidic device. In some embodiments a microfluidic device may have more than two ports, e.g. 3, 4, 5, 6 or more ports; a typical example may have two inlets and two outlets, e.g. for fluidically connecting to two microfluidic circuits on the same microfluidic device.

A microfluidic device may be referred to herein as a "microfluidic chip" or a "chip".

A "microfluidic channel" or "flow channel" as used herein refers to flow region of a microfluidic device having a length that is significantly longer than both the horizontal and vertical dimensions. The length of the channel is generally defined by the flow path of the channel. In the case of a straight channel, the length would be the "longitudinal axis" of the channel. The "horizontal dimension" or "width" of the channel is the horizontal dimension as observed in a transverse section oriented perpendicular to the longitudinal axis of the channel (or, if the channel is curved, perpendicular to an axis tangential to the flow path of the channel at the plane of the transverse section). The "vertical dimension" or "height" of the channel is the vertical dimension as observed in a transverse section oriented perpendicular to the longitudinal axis of the channel (or, if the channel is curved, perpendicular to an axis tangential to the flow path of the channel at the plane of the transverse section).

The flow channel can be, for example, at least 5 times the length of either the horizontal or vertical dimension, e.g., at least 10 times the length, at least 25 times the length, at least 100 times the length, at least 200 times the length, at least 500 times the length, at least 1,000 times the length, at least 5,000 times the length, or longer. In some embodiments, the length of a flow channel is about 100,000 microns to about 500,000 microns, including any value therebetween. In some embodiments, the horizontal dimension is about 100 microns to about 1000 microns (e.g., about 150 to about 500 microns) and the vertical dimension is about 25 microns to about 200 microns, (e.g., from about 40 to about 150 microns). It is noted that a flow channel may have a variety of different spatial configurations in a microfluidic device, and thus is not restricted to a perfectly linear element. For example, a flow channel may be, or include one or more sections having, the following configurations: curve, bend, spiral, incline, decline, fork (e.g., multiple different flow paths), and any combination thereof. In addition, a flow channel may have different cross-sectional areas along its path, widening and constricting to provide a desired fluid flow therein. The flow channel may include valves, and the valves may be of any type known in the art of microfluidics. Examples of microfluidic channels that include valves are disclosed in U.S. Pat. Nos. 6,408,878 and 9,227,200, each of which is herein incorporated by reference in its entirety.

The direction of fluid flow through the flow region (e.g., channel), or other circuit element (e.g., a chamber), dictates an "upstream" and a "downstream" orientation of the flow region or circuit element. Accordingly, an inlet will be located at an upstream position, and an outlet will be generally located at a downstream position. It will be appreciated by a person of skill in the art, that the designation of an "inlet" or an "outlet" may be changed by reversing the flow within the device or by opening one or more alternative aperture(s).

As used herein, "brightfield" illumination and/or image refers to white light illumination of the microfluidic field of view from a broad-spectrum light source, where contrast is formed by absorbance of light by objects in the field of view.

As used herein, "structured light" is projected light that is modulated to provide one or more illumination effects. A first illumination effect may be projected light illuminating a portion of a surface of a device without illuminating (or at least minimizing illumination of) an adjacent portion of the surface, e.g., a projected light pattern, as described more fully below, used to activate DEP forces within a DEP substrate. When using structured light patterns to activate DEP forces, the intensity, e.g., variation in duty cycle of a structured light modulator such as a DMD, may be used to change the optical power applied to the light activated DEP actuators, and thus change DEP force without changing the nominal voltage or frequency. Another illumination effect that may be produced by structured light includes projected light that may be corrected for surface irregularities and for irregularities associated with the light projection itself, e.g., fall-off at the edge of an illuminated field. Structured light is typically generated by a structured light modulator, such as a digital mirror device (DMD), a microshutter array system (MSA), a liquid crystal display (LCD), or the like. Illumination of a small area of the surface, e.g., a selected area of interest, with structured light improves the signal-to-noise-ratio (SNR), as illumination of only the selected area of interest reduces stray/scattered light, thereby lowering the dark level of the image. An important aspect of structured light is that it may be changed quickly over time. A light pattern from the structured light modulator, e.g., DMD, may be used to autofocus on difficult targets such as clean mirrors or surfaces that are far out of focus. Using a clean mirror, a number of self-test features may be replicated such as measurement of modulation transfer function and field curvature/tilt, without requiring a more expensive Shack-Hartmann sensor. In another use of structured light patterns, spatial power distribution may be measured at the sample surface with a simple power meter, in place of a camera. Structured light patterns may also be used as a reference feature for optical module/system component alignment as well used as a manual readout for manual focus. Another illumination effect made possible by use of structured light patterns is selective curing, e.g., solidification of hydrogels within the microfluidic device.

As used herein, the term "micro-object" refers generally to any microscopic object that may be isolated and/or manipulated in accordance with the present disclosure. Non-limiting examples of micro-objects include: inanimate micro-objects such as microparticles; microbeads (e.g., polystyrene beads, glass beads, amorphous solid substrates, Luminex™ beads, or the like); magnetic beads; microrods; microwires; quantum dots, and the like; biological micro-objects such as cells; biological organelles; vesicles, or complexes; synthetic vesicles; liposomes (e.g., synthetic or derived from membrane preparations); lipid nanorafts, and the like; or a combination of inanimate micro-objects and biological micro-objects (e.g., microbeads attached to cells, liposome-coated micro-beads, liposome-coated magnetic beads, or the like). Beads may include moieties/molecules covalently or non-covalently attached, such as fluorescent labels, proteins (including receptor molecules), carbohydrates, antigens, small molecule signaling moieties, or other chemical/biological species capable of use in an assay. In some variations, beads/solid substrates including moieties/molecules may be capture beads, e.g., configured to bind molecules including small molecules, peptides, proteins or nucleic acids present in proximity either selectively or non-selectively. In one non-limiting example, a capture bead may include a nucleic acid sequence configured to bind nucleic acids having a specific nucleic acid sequence or the nucleic acid sequence of the capture bead may be configured to bind a set of nucleic acids having related nucleic acid sequences. Either type of binding may be understood to be selective. Capture beads containing moieties/molecules may bind non-selectively when binding of structurally different but physico-chemically similar molecules is performed, for example, size exclusion beads or zeolites configured to capture molecules of selected size or charge. Lipid nanorafts have been described, for example, in Ritchie et al. (2009) "Reconstitution of Membrane Proteins in Phospholipid Bilayer Nanodiscs," Methods Enzymol., 464:211-231.

As used herein, the term "cell" is used interchangeably with the term "biological cell." Non-limiting examples of biological cells include eukaryotic cells, plant cells, animal cells, such as mammalian cells, reptilian cells, avian cells, fish cells, or the like, prokaryotic cells, bacterial cells, fungal cells, protozoan cells, or the like, cells dissociated from a tissue, such as muscle, cartilage, fat, skin, liver, lung, neural tissue, and the like, immunological cells, such as T cells, B cells, natural killer cells, macrophages, and the like, embryos (e.g., zygotes), oocytes, ova, sperm cells, hybridomas, cultured cells, cells from a cell line, cancer cells, infected cells, transfected and/or transformed cells, reporter cells, and the like. A mammalian cell can be, for example, from a human, a mouse, a rat, a horse, a goat, a sheep, a cow, a primate, or the like.

A colony of biological cells is "clonal" if all of the living cells in the colony that are capable of reproducing are daughter cells derived from a single parent cell. In certain embodiments, all the daughter cells in a clonal colony are derived from the single parent cell by no more than 10 divisions. In other embodiments, all the daughter cells in a clonal colony are derived from the single parent cell by no more than 14 divisions. In other embodiments, all the daughter cells in a clonal colony are derived from the single parent cell by no more than 17 divisions. In other embodiments, all the daughter cells in a clonal colony are derived from the single parent cell by no more than 20 divisions. The term "clonal cells" refers to cells of the same clonal colony.

As used herein in reference to a fluidic medium, "diffuse" and "diffusion" refer to thermodynamic movement of a component of the fluidic medium down a concentration gradient.

The phrase "flow of a medium" means bulk movement of a fluidic medium primarily due to any mechanism other than diffusion, and may encompass perfusion. For example, flow of a medium can involve movement of the fluidic medium from one point to another point due to a pressure differential between the points. Such flow can include a continuous, pulsed, periodic, random, intermittent, or reciprocating flow of the liquid, or any combination thereof. When one fluidic medium flows into another fluidic medium, turbulence and mixing of the media can result. Flowing can comprise pulling solution through and out of the microfluidic channel (e.g., aspirating) or pushing fluid into and through a microfluidic channel (e.g. perfusing).

The phrase "substantially no flow" refers to a rate of flow of a fluidic medium that, when averaged over time, is less than the rate of diffusion of components of a material (e.g., an analyte of interest) into or within the fluidic medium. The rate of diffusion of components of such a material can depend on, for example, temperature, the size of the components, and the strength of interactions between the components and the fluidic medium.

As used herein in reference to different regions within a microfluidic device, the phrase "fluidically connected" means that, when the different regions are substantially filled with fluid, such as fluidic media, the fluid in each of the regions is connected so as to form a single body of fluid. This does not mean that the fluids (or fluidic media) in the different regions are necessarily identical in composition. Rather, the fluids in different fluidically connected regions of a microfluidic device can have different compositions (e.g., different concentrations of solutes, such as proteins, carbohydrates, ions, or other molecules) which are in flux as solutes move down their respective concentration gradients and/or fluids flow through the device.

As used herein, a "flow path" refers to one or more fluidically connected circuit elements (e.g. channel(s), region(s), chamber(s) and the like) that define, and are subject to, the trajectory of a flow of medium. A flow path is thus an example of a swept region of a microfluidic device. Other circuit elements (e.g., unswept regions) may be fluidically connected with the circuit elements that comprise the flow path without being subject to the flow of medium in the flow path.

As used herein, "isolating a micro-object" confines a micro-object to a defined area within the microfluidic device. The defined area can be, for example, a chamber. As used herein, a "chamber" is a region within a microfluidic device (e.g., a circuit element) that allows one or more micro-object(s) to be isolated from other micro-objects located within the microfluidic device. Examples of chambers include microwells, which may be regions etched out of a substrate (e.g., a planar substrate), as described in U.S. Patent Application Publication Nos. 2013/0130232 (Weibel et al.) and 2013/0204076 (Han et al.), or a region formed in a multi-layer device, such as the microfluidic devices described in WO 2010/040851 (Dimov et al.) or U.S. Patent Application No. 2012/0009671 (Hansen et al.). Other examples of chambers include valved chambers, such as described in WO 2004/089810 (McBride et al.) and U.S. Patent Application Publication No. 2012/0015347 (Singhal et al.). Still other examples of chambers include the chambers described in: Somaweera et al. (2013), "Generation of a Chemical Gradient Across an Array of 256 Cell Cultures in a Single Chip", Analyst., Vol. 138(19), pp 5566-5571; U.S. Patent Application Publication No. 2011/0053151 (Hansen et al.); and U.S. Patent Application Publication No. 2006/0154361 (Wikswo et al.). Still other examples of chambers include the sequestration pens described herein. In certain embodiments, the chamber can be configured to hold a volume of fluid of about 100 pL to 1 nL, 100 pL to 2 nL, 100 pL to 5 nL, 250 pL to 2 nL, 250 pL to 5 nL, 250 pL to 10 nL, 500 pL to 5 nL, 500 pL to 10 nL, 500 pL to 15 nL, 750 pL to 10 nL, 750 pL to 15 nL, 750 pL to 20 nL, 1 to 10 nL, 1 to 15 nL, 1 to 20 nL, 1 to 25 nL, or 1 to 50 nL. In other embodiments, the chamber can be configured to hold a volume of fluid of about 20 nL to 200 nL, 100 to 200 nL, 100 to 300 nL, 100 to 400 nL, 100 to 500 nL, 200 to 300 nL, 200 to 400 nL, 200 to 500 nL, 200 to 600 nL, 200 to 700 nL, 250 to 400 nL, 250 to 500 nL, 250 to 600 nL, or 250 to 750 nL.

As used herein, "pen" or "penning" specifically refers to disposing micro-objects within a a sequestration pen within the microfluidic device. Forces used to pen a micro-object may be any suitable force as described herein such as dielectrophoresis (DEP), e.g., an optically actuated dielectrophoretic force (OEP); gravity; magnetic forces; locally actuated fluid flow; or tilting. In some embodiments, penning a plurality of micro-objects may reposition substantially all the micro-objects. In some other embodiments, a selected number of the plurality of micro-objects may be penned, and the remainder of the plurality may not be penned. In some embodiments, when selected micro-objects are penned, a DEP force, e.g., an optically actuated DEP force or a magnetic force may be used to reposition the selected micro-objects. Typically, micro-objects may be introduced to a flow region, e.g., a microfluidic channel, of the microfluidic device and thereafter introduced into a chamber by penning.

As used herein, "unpen" or "unpenning" refers to repositioning micro-objects from within a sequestration pen to a new location within a flow region, e.g., a microfluidic channel, of the microfluidic device. Forces used to unpen a micro-object may be any suitable force as described herein such as dielectrophoresis, e.g., an optically actuated dielectrophoretic force; gravity; magnetic forces; locally actuated fluid flow; or tilting. In some embodiments, unpenning a plurality of micro-objects may reposition substantially all the micro-objects. In some other embodiments, a selected number of the plurality of micro-objects may be unpenned, and the remainder of the plurality may not be unpenned. In some embodiments, when selected micro-objects are unpenned, a DEP force, e.g., an optically actuated DEP force or a magnetic force may be used to reposition the selected micro-objects.

As used herein, "export" or "exporting" can include, consist of, or consist essentially of repositioning micro-objects from a location within a microfluidic device, e.g., a flow region, a microfluidic channel, a chamber, etc., to a location outside of the microfluidic device, such as a well plate, a tube, or other receiving vessel. In some embodiments, exporting a micro-object comprises withdrawing (e.g., micro-pipetting) a volume of medium containing the micro-object from within the microfluidic device and depositing the volume of medium in or upon the location outside of the microfluidic device. In some related embodiments, withdrawing the volume of medium is preceded by disassembling the microfluidic device (e.g., removing an upper layer, such as a cover or lid, of the microfluidic device from a lower layer, such as a base or substrate, of the microfluidic device) to facilitate access (e.g., of a micro-pipetted) to the internal regions of the microfluidic device. In other embodiments, exporting a micro-object comprises flowing a volume of fluid containing the micro-object through the flow region (including, e.g., a microfluidic channel) of the microfluidic device, out through an outlet of the microfluidic device, and depositing the volume of medium in or upon the location outside of the microfluidic device. In such embodiments, micro-object(s) within the microfluidic channel may be exported without requiring disassembly (e.g., removal of the cover of the device) or insertion of a tool into an interior region of the microfluidic device to remove micro-objects for further processing. "Export" or "exporting" may further comprise repositioning micro-objects from within a chamber, which may include a sequestration pen, to a new location within a flow region, such as a microfluidic channel, as described above with regard to "unpenning". A planar orientation of the chamber(s) with respect to the microfluidic channel, such that the chamber(s) opens laterally from the microfluidic channel, as described herein with regard to sequestration pens, permits easy export of micro-objects that have been positioned or repositioned (e.g., unpenned from a chamber) to be disposed within the microfluidic channel.

A microfluidic device can comprise "swept" regions and "unswept" regions. As used herein, a "swept" region is comprised of one or more fluidically interconnected circuit elements of a microfluidic circuit, each of which experiences a flow of medium when fluid is flowing through the microfluidic circuit. The circuit elements of a swept region can include, for example, regions, channels, and all or parts of chambers. As used herein, an "unswept" region is comprised of one or more fluidically interconnected circuit element of a microfluidic circuit, each of which experiences substantially no flux of fluid when fluid is flowing through the microfluidic circuit. An unswept region can be fluidically connected to a swept region, provided the fluidic connections are structured to enable diffusion but substantially no flow of media between the swept region and the unswept region. The microfluidic device can thus be structured to substantially isolate an unswept region from a flow of medium in a swept region, while enabling substantially only diffusive fluidic communication between the swept region and the unswept region. For example, a flow channel of a micro-fluidic device is an example of a swept region while an isolation region (described in further detail below) of a microfluidic device is an example of an unswept region.

As used herein, a "non-sweeping" rate of fluidic medium flow means a rate of flow sufficient to permit components of a second fluidic medium in an isolation region of the sequestration pen to diffuse into the first fluidic medium in the flow region and/or components of the first fluidic medium to diffuse into the second fluidic medium in the isolation region; and further wherein the first medium does not substantially flow into the isolation region.

In some embodiments, the systems can include a support (also known as a "nest") configured to hold a microfluidic device. The support can include, for example, a socket configured to interface with and/or hold an optically actuated microfluidic device, a printed circuit board assembly (PCBA), an electrical signal generation subsystem, a thermal control subsystem, or any combination thereof.

In certain embodiments, the support includes a socket capable of interfacing with a microfluidic device, such as an optically actuated microfluidic device. An exemplary socket 106 is included in the support 100 of FIGS. 1A and 1B. However, the shape and functionality of the socket 106 need not be exactly as shown in FIGS. 1A and 1B. For example, the socket can include a lid). Moreover, the socket 106 can be adjusted as needed to match the size and type of microfluidic device 110 with which the socket 106 is intended to interface. A variety of microfluidic devices 110 are known in the art, including devices 110 having optically actuated configurations, such as an optoelectronic tweezer (OET) configuration and/or an opto-electrowetting (OEW) configuration. Examples of suitable OET configurations are illustrated in the following U.S. patent documents, each of which is incorporated herein by reference in its entirety, as though set forth in full: U.S. Pat. No. RE44,711 (Wu et al.) (originally issued as U.S. Pat. No. 7,612,355); and U.S. Pat. No. 7,956,339 (Ohta et al.). Examples of OEW configurations are illustrated in U.S. Pat. No. 6,958,132 (Chiou et al.) and US Patent Application Publication No. 2012/0024708 (Chiou et al.), both of which are incorporated by reference herein in their entirety, as though set forth in full. Yet another example of optically actuated microfluidic device includes a combined OET/OEW configuration, examples of which are shown in U.S. Patent Publication Nos. 20150306598 (Khandros et al.) and 20150306599 (Khandros et al.) and their corresponding PCT Publications WO2015/164846 and WO2015/164847, all of which are incorporated herein by reference in their entirety, as though set forth in full.

The support 100 depicted in FIGS. 1A and 1B also includes a base 102 and a cover 104 (omitted in FIG. 1B). The support 100 also includes a plurality of connectors: a first fluidic input/output 112; a communications connection 114; a power connection 116; and a second fluidic input/output 118. The first and second fluidic input/outputs 112, 118 are configured to deliver a cooling fluid to and from a cooling block (shown in FIG. 3) used to cool the microfluidic device 110. Whether the first and second fluidic input/outputs 112, 118 are input or outputs depends on the direction of fluid flow through the support 100. The first and second fluidic input/outputs 112, 118 are fluidly coupled to the cooling block by first and second fluidic connectors 142, 144 disposed in the support 100. The communications connection 114 is configured to connect the support 110 with other components of the system for operating microfluidic devices, as described below. The power connection 116 is configured to provide power (e.g., electricity) to the support 110.

In certain embodiments, the support 100 can include an integrated electrical generation subsystem 138. The electrical generation subsystem 138 can be configured to apply a biasing voltage across a pair of electrodes in a microfluidic device 110 that is being held by the support 100. The ability to apply such a biasing voltage does not mean that a biasing voltage will be applied at all times when the microfluidic device 110 is held by the support 100. Rather, in most cases, the biasing voltage will be applied intermittently, e.g., only as needed to facilitate the generation of microfluidic forces, such as dielectrophoresis or electro-wetting, or the measurement of complex impedance in the microfluidic device 110.

Figure 2:
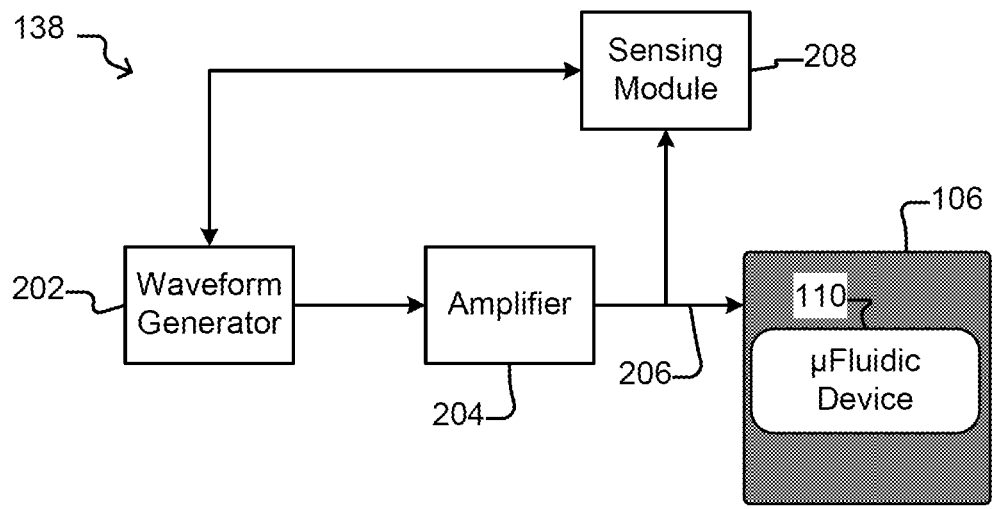
FIG. 2 is a schematic view of elements of an electrical signal generation subsystem, according to some embodiments of the systems.

Typically, the electrical signal generation subsystem 138 will include a waveform generator 202, as shown in FIG. 2. The electrical generation subsystem 138 can further include a sensing module 208 (e.g., an oscilloscope) and/or a waveform amplification circuit 204 configured to amplify a waveform received from the waveform generator 202. The sensing module 208, if present, can be configured to measure the waveform supplied to the microfluidic device 110 held by the support 100. In certain embodiments, the sensing module 208 measures the waveform at a location proximal to the microfluidic device 110 (and distal to the waveform generator 202), thus ensuring greater accuracy in measuring the waveform actually applied to the microfluidic device 110. Data obtained from the sensing module 208 measurement can be, for example, provided as feedback to the waveform generator 202, and the waveform generator 202 can be configured to adjust its output based on such feedback. An example of a suitable combined waveform generator 202 and sensing module 208 is the RED PITAYA™.

Figure 3:
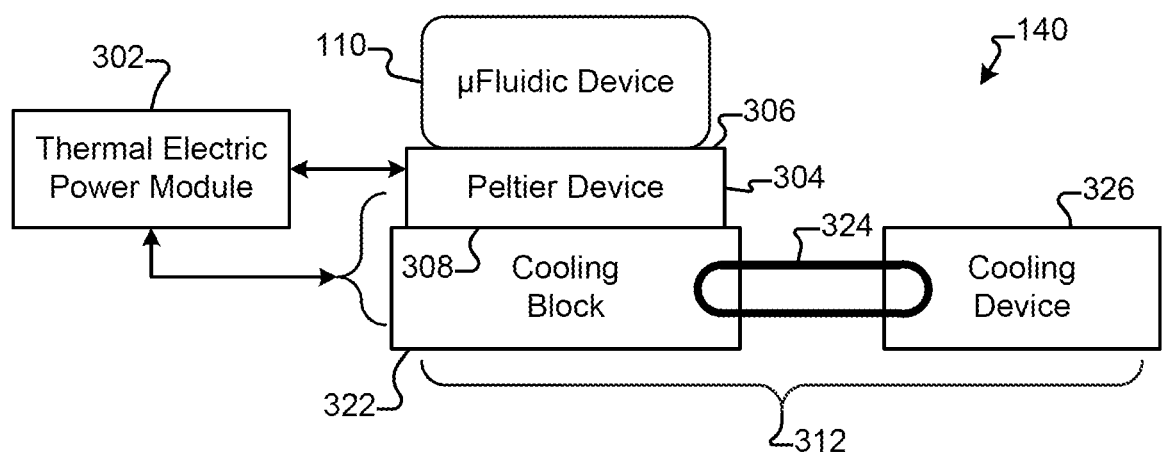
FIG. 3 is a schematic view of a thermal control subsystem, according to some embodiments of the systems.

In certain embodiments, the support 100 can include a thermal control subsystem 140. The thermal control subsystem 140 can be configured to regulate the temperature of a microfluidic device 110 held by the support 100. As shown in FIG. 3, the thermal control subsystem 140 can include a Peltier thermoelectric device 304 and a proximal component of a cooling unit 312. The Peltier thermoelectric device 304 can have a first surface 306 configured to interface with at least one surface of the microfluidic device 110. The cooling unit can include, for example, a cooling block 322. A second surface 308 of the Peltier thermoelectric device 304 (e.g., a surface 308 opposite the first surface 306) can be configured to interface with a surface of such a cooling block 322. All or part of the cooling block 322 (e.g., a part that interfaces with the Peltier thermoelectric device 304) can be made from a material having a high thermal conductivity. For example, the material can be a metal, such as aluminum. The cooling block 322 can be connected to a fluidic path 324 configured to circulate cooled fluid between a fluidic cooling device 326 and the cooling block 322. The fluidic path 324 can include the fluidic input/outputs 112, 118 and the fluidic connectors 142, 144 described in connection with FIG. 1. The Peltier thermoelectric device 304 and the cooling block 322 can be mounted on the support 100.

Figure 4:
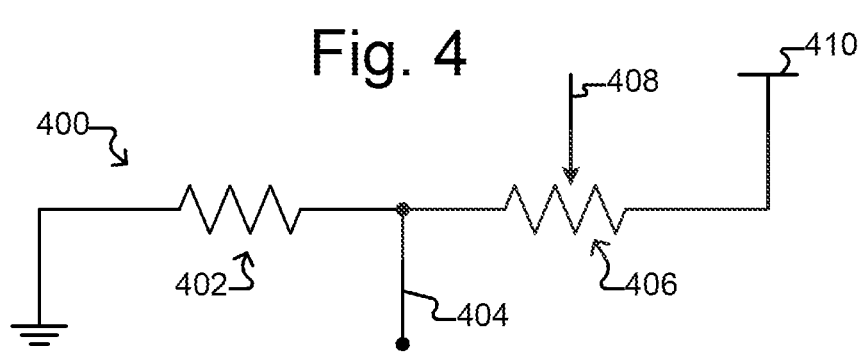
FIG. 4 is a circuit diagram depicting an analog circuit used for thermal control feedback in a thermal control subsystem, according to some embodiments of the systems.

The thermal control subsystem 140 can further include a thermoelectric power module 302, as shown in FIG. 3. The thermoelectric power module 302 can regulate the temperature of the Peltier thermoelectric device 304 so as to achieve a target temperature for the microfluidic device 110. Feedback for the thermoelectric power module 302 can include a temperature value provided by an analog circuit 400, such as shown in FIG. 4. Alternatively, the feedback can be provided by a digital circuit (not shown). The Peltier thermoelectric device 304, the cooling block 322, and the thermoelectric power module 302 all can be mounted on the support 100.

In certain embodiments, the support 100 can also include or interface with an environmental temperature monitor/regulator in addition to the thermal control subsystem 140.

The analog circuit 400 depicted in FIG. 4 includes a resistor 402, a thermistor 406, and an analog input 404. The analog input is operatively coupled to the electrical signal generation subsystem 138 (e.g., the sensing module 208 thereof) and provides a signal thereto that can be used to calculate the temperature of the microfluidic device 110. The thermistor 406 is configured such that its resistance may decrease in a known manner when the temperature of the thermistor 406 decreases and increase in a known manner when the temperature of the thermistor 406 increases. The analog circuit 400 is connected to a power source (not shown) which is configured to deliver a biasing voltage to electrode 408. In one particular embodiment, the resistor 402 can have a resistance of about 10,000 ohms, the thermistor 406 can have a resistance of about 10,000 ohms at 25° C., and the power source (e.g., a DC power source) can supply a biasing voltage of about 5 V. The analog circuit 400 is exemplary, and other systems can be used to provide a temperature value for feedback for the thermoelectric power module 302.

In certain embodiments, the support 100 further comprises a controller 136 (e.g., a microprocessor). The controller 136 can be used to sense and/or control the electrical signal generation subsystem 138. In addition, to the extent that the support 100 includes a thermal control subsystem 140, the controller 136 can be used to sense and/or control the thermal control subsystem 140. Examples of suitable controllers 136 include the ARDUINO™ microprocessors, such as the ARDUINO NANO™. The controller 136 can be configured to interface with an external controller (not shown), such as a computer or other computational device, via a plug/connector 134. In certain embodiments, the external controller can include a graphical user interface (GUI) configured to sense and/or control the electrical signal generation subsystem 138, the thermal control subsystem 140, or both. An exemplary GUI 500, which is configured to control both the electrical signal generation subsystem 138 and the thermal control subsystem 140, is depicted in FIG. 5.

In certain embodiments, the support 100 can include a printed circuit board (PCB) 132. The electrical signal generation subsystem 138 can be mounted on and electrically integrated into the PCB 132. Similarly, to the extent that the support 100 includes a controller 136 or a thermal control subsystem 140, the controller 136 and/or the thermoelectric power module 302 can be mounted on and electrically integrated into the PCB 132.

Thus, as shown in FIGS. 1A and 1B, an exemplary support 100 can include a socket 106, an interface 134, a controller 136, an electrical generation subsystem 138, and a thermal control subsystem 140, all of which are mounted on and electrically integrated into PCB 132, thereby forming a printed circuit board assembly (PCBA) 130. As discussed above, the socket 106 can be designed to hold a microfluidic device 110 (or "consumable"), including an optically actuated microfluidic device.

In certain specific embodiments, the electrical generation subsystem 138 can include a RED PITAYA™ waveform generator 202/sensing module 208 and a waveform amplification circuit 204 that amplifies the waveform generated by the RED PITAYA™ waveform generator 202 and passes the amplified waveform (voltage) 206 to the microfluidic device 110. Both the RED PITAYA™ unit 202, 208 and the waveform amplification circuit 204 can be electrically integrated into the PCB 132 as an electrical generation subsystem 138, as shown in FIG. 1B.

Moreover, the RED PITAYA™ unit 202, 208 can be configured to measure the amplified voltage at the microfluidic device 110 and then adjust its own output voltage as needed such that the measured voltage at the microfluidic device 110 is the desired value. The amplification circuit 204 can have, for example, a +6.5V to −6.5V power supply generated by a pair of DC-DC converters mounted on the PCB 132, resulting in a signal of up to 13 Vpp at the microfluidic device 110.

In certain specific embodiments, the support 100 includes a thermal control subsystem 140 (shown in FIG. 3) having a Peltier thermoelectric device 304, located between a liquid-cooled aluminum block 322 and the back side of the microfluidic device 110, a POLOLU™ thermoelectric power supply (not shown), and an ARDUINO NANO™ controller 136. Feedback for the thermal control subsystem 140 can be an analog voltage divider circuit 400 (shown in FIG. 4) which includes a resistor 402 (e.g. resistance 10 kOhm+/−0.1%, temperature coefficient +/−0.02 ppm/C° and a negative temperature coefficient thermistor 406 (nominal resistance 10 kOhm+/−0.01%). The controller 136 can measure the voltage from the feedback circuit 400 and then use the calculated temperature value as input (e.g., to an onboard PID control loop algorithm) to drive both a directional and a pulse-width-modulated signal pin on the thermoelectric power module 302, and thereby actuate the thermoelectric subsystem 140. A liquid cooling unit 326 can be configured to pump fluid through the cooling path 324 located, in part, in the support 100 (e.g., fluidic input/outputs 112, 118 and the fluidic connectors 142, 144) and, in part, at the periphery of the support 100.

In certain specific embodiments, the support 100 includes a serial port 114 and a Plink tool that together allow the RED PITAYA™ unit to communicate with an external computer. The serial port 114 can also allow the controller 136 to communicate with the external computer. Alternatively, a separate serial port (not shown) can be used to allow the controller 136 to communicate with the external computer. In other embodiments, the support 100 can include a wireless communication device configured to facilitate wireless communication between components of the support 100 (e.g., the controller 136 and/or the electrical generation subsystem 138) and the external computer, which can include a portable computing device such as a cell phone, a PDA, or other handheld device. A GUI (e.g., such as shown in FIG. 5) on the external computer can be configured for various functions, including, but not limited to, plotting temperature and waveform data, performing scaling calculations for output voltage adjustment, and updating the controller 136 and RED PITAYA™ device 202, 208.

In certain embodiments, the support 100 can also include or interface with an inductance/capacitance/resistance (LCR) meter configured to measure characteristics of the contents (e.g., fluidic contents) of the microfluidic device 110.

For example, the LCR meter can be configured to measure the complex impedance of a system, particularly the complex impedance of a fluid as it enters, is located within, and/or as it exits an microfluidic device 110. In some embodiments, the LCR meter can be connected to and/or integrated into a fluid line that carries fluid into or out of the microfluidic device 110. In other embodiments, the LCR meter can be connected to or an integral part of the electrical generation subsystem 138. Thus, in certain specific embodiments, the RED PITAYA™ waveform generator 202 and sensing module 208 in the support 100 can be configured to function as an LCR meter. In certain embodiments, electrodes of the microfluidic device 110 which are configured for use with the electrical generation subsystem 138 can also be configured for use with the LCR meter. Measuring the impedance of a system can determine various system characteristics and changes therein, such as the height of the fluidic circuit within the microfluidic device 110, changes in the salt content of fluid in the microfluidic device 110 (which may correlate with the status of biological micro-objects therein), and the movement of specific volumes of fluids (having different impedances) through the microfluidic device 110.

Figure 9:
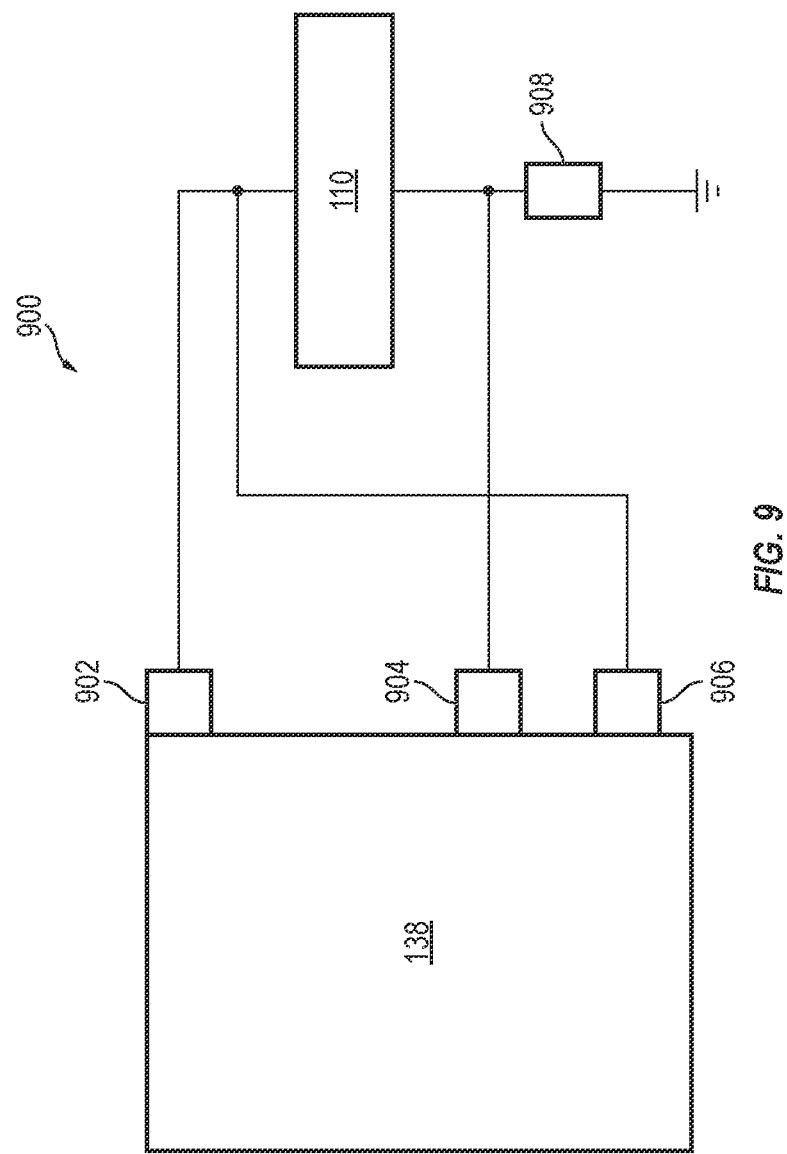
FIG. 9 is a schematic view of an impedance measurement circuit, according to some embodiments of the systems.

In certain embodiments, measuring the impedance of a system can be used to accurately (i.e., close to the true value) and precisely (i.e., repeatably) detect a change from a first fluid in a system (i.e., the microfluidic device 110) to a second fluid in the system. For example, the first fluid could be deionized water (DI) and the second fluid could be a saline solution (e.g., phosphate-buffered saline or "PBS"), or vice versa. Alternatively, the first fluid could be a saline solution (e.g., PBS) and the second fluid could be a cell culture medium having an impedance that is detectably different than the saline solution, or vice versa. In still other alternatives, the first fluid could be a first cell culture medium and the second fluid could be a second cell culture medium having an impedance that is detectably different than the first cell culture medium. FIG. 9 is a diagram depicting an impedance measurement circuit 900 for detecting the impedance of a system. The circuit 900 includes an output 902 from the waveform generator 202 of the electrical generation subsystem 138, and two inputs 904, 906 to the sensing module 208 of the electrical generation subsystem 138. The circuit 900 also includes the microfluidic device 110 (connected via the socket 106 of the support 100) and a shunt resistor 908. The shunt resistor 908 can be selected so as to render the LCR sufficiently accurate to measure impedances in the 0 to about 5,000 ohm range (e.g., 0 to about 4,000, 0 to about 3,000, 0 to about 2,500, 0 to about 2,000, 0 to about 1,500, or 0 to about 1,000 ohm range). The microfluidic device 110 functions in the circuit 900 as a measurement cell, with the base (e.g., a semi-conductor device) and cover (e.g., having an indium tin oxide (ITO) layer) of the microfluidic device 110 functioning as electrodes. In certain specific embodiments, the output 902 of circuit 900 can come from the waveform generator 202 of a RED PITAYA™ device and the inputs 904, 906 can originate from the microfluidic device 110 and be received by the sensing module 208 of the RED PITAYA™ device. In certain specific embodiments, the shunt resistor 908 can be a 50 ohm resistor. In these embodiments, the electrical generation subsystem 138 may be switched between an "optical actuation mode" and an "LCR mode." Moreover, when in LCR mode, the electrical generation subsystem 138 can be connected to a computer running a MATLAB script.

The system of the systems thus provides methods for determining the flow volume ($V_{flow}$) of a microfluidic device 110. For example, the microfluidic device 110 is initially filled with a first fluid associated with a first impedance (e.g., DI, which is associated with an impedance of about 450 ohms). Then, a second fluid associated with a second impedance that is detectably different than the first impedance (e.g., PBS, which is associated with an impedance of about 160 ohms) is flowed into and through the microfluidic device 110. The second fluid can be flowed into the microfluidic device 110, for example, through a port capable of functioning as either a fluid inlet port or a fluid outlet port. The system continuously measures the complex impedance of the microfluidic device 110 as the second fluid is flowing into and through the microfluidic device 110. As discussed above, to measure the complex impedance of the microfluidic device 110 at a particular time point, the system applies a voltage potential to the microfluidic device 110 and, concomitantly, receives signals from the microfluidic device 110 that are used to calculate the complex impedance. The voltage potential applied to the microfluidic device can have a frequency of about 10 kHz to about 1 MHz (e.g., about 50 kHz to about 800 kHz, about 100 kHz to about 700 kHz, about 200 kHz to about 600 kHz, about 300 kHz to about 500 kHz, about 350 kHz to about 400 kHz, or about 380 kHz). The specific frequency can be selected based on properties of the microfluidic device 110 and the first and second fluids so as to optimize accuracy of the impedance measurement, minimize measurement time, and reduce inductive effects. The second fluid is flowed into and through the microfluidic device 110 until the measured complex impedance changes from the first impedance associated with the first fluid to the second impedance associated with the second fluid. The minimum amount of second fluid required to completely switch the complex impedance of the microfluidic device 110 from the first impedance to the second impedance is a measure of the flow volume ($V_{flow}$) of the microfluidic device. Starting from the point when the system begins to pump the second fluid to the microfluidic device 110, the volume of the second fluid required to switch the complex impedance of the microfluidic device 110 from the first impedance to the second impedance can include (1) the flow volume ($V_{flow}$) of the microfluidic device 110, (2) the volume of the fluid outlet port of the microfluidic device, and (3) the flow volume of the tubing carrying the second fluid from a pump to the microfluidic device 110. Because the flow of the second fluid through the tubing and fluid outlet port does not change the complex impedance of the microfluidic device 110, the flow volume of the tubing and inlet port can be readily distinguished from the flow volume of the microfluidic device 110.

Using the calculated flow volume of a microfluidic device 110, the system further provides methods for reliably exporting one or more micro-objects from the microfluidic device 110 in a discrete volume of fluid. Having determined the flow volume ($V_{flow}$) of the microfluidic device 110, the minimal export volume ($V_{ex}$) needed to export a micro-object (e.g., a biological cell) positioned within the flow path can be approximated by calculating the portion of the flow path that separates the micro-object from the fluid outlet port of the microfluidic device 110. For example, a total length ($L_{tot}$) of the flow path can be determined by tracing the flow path of the microfluidic device 110 from the fluid inlet port to the fluid outlet port. The export length ($L_{ex}$) of the flow path can be determined by tracing the flow path of the microfluidic device 110 from the location of the micro-object in the flow path to the fluid output port. The minimal amount of fluid ($V_{ex}$) needed to export the micro-object from the microfluidic device 110 can thus be calculated as: $V_{ex}=(L_{ex}/L_{tot})*V_{flow}$. Alternatively, the total volume of the flow path ($V_{flow-tot}$) can be estimated from the predicted geometry of the flow path (e.g., using CAD drawings); and the total volume of the export flow path ($V_{ex-tot}$) can likewise be calculated from the predicted geometry of the flow path. In such an embodiment, minimal amount of fluid ($V_{ex}$) need to export the micro-object from the microfluidic device 110 can be calculated as: $V_{ex}=(V_{ex-tot}/V_{flow-tot})*V_{flow}$. Regardless of the approach to calculating $V_{ex}$, the micro-object can be exported from the microfluidic device 110 by flowing a volume of fluid through the fluid outlet port of the microfluidic device 110 that is at least as large as $V_{ex}$. To ensure reliable export, the micro-object can be exported from the microfluidic device 110 by flowing a volume of fluid ($V_{ex-rel}$) that is equal to C*Vex, wherein C is a scaling factor that is equal to about 1.1 or greater (e.g., about 1.2, 1.3, 1.4, 1.5, 1.6, 1.7, 1.8, 1.9, 2.0, or greater). In some methods, a leading portion of $V_{ex}$ (or $V_{ex-rel}$) is discarded before a residual volume ($V_{res}$, equal to $V_{ex}$ (or $V_{ex-rel}$) minus the leading portion) that contains the micro-object(s) is exported from the microfluidic device 110. For example, $V_{ex}$ (or $V_{ex-rel}$) could equal 1.0 µL and a leading volume of 0.5 µL could be discarded, resulting in the micro-object(s) being exported in a final volume $V_{res}$ of 0.5 µL. In this manner, the micro-object(s) can be exported in a small but discrete volume of fluid. Depending on how the method is performed, $V_{ex}$, $V_{ex-rel}$, or $V_{res}$ can be about 2.0 µL, 1.5 µL, 1.2 µL, 1.0 µL, 0.9 µL, 0.8 µL, 0.7 µL, 0.6 µL, 0.5 µL, 0.4 µL, 0.3 µL, 0.25 µL, or less. Typically, the volume of fluid containing the micro-object(s) (i.e., $V_{ex}$, $V_{ex-rel}$, or $V_{res}$) is exported through export tubing having a finite internal volume before reaching a collection receptacle. Accordingly, the calculations used in the methods can be adjusted to account for the known or estimated volume of the export tubing. For example, the export tubing could have an internal volume of 5.0 µL. In such a case, a $V_{ex}$ (or $V_{ex-rel}$) of 1.0 µL would be adjusted to 6.0 µL, and a discarded leading volume of 0.5 µL would be adjusted to 5.5 µL, thus resulting in a $V_{res}$ of 0.5 µL remaining the same.

Figure 10:
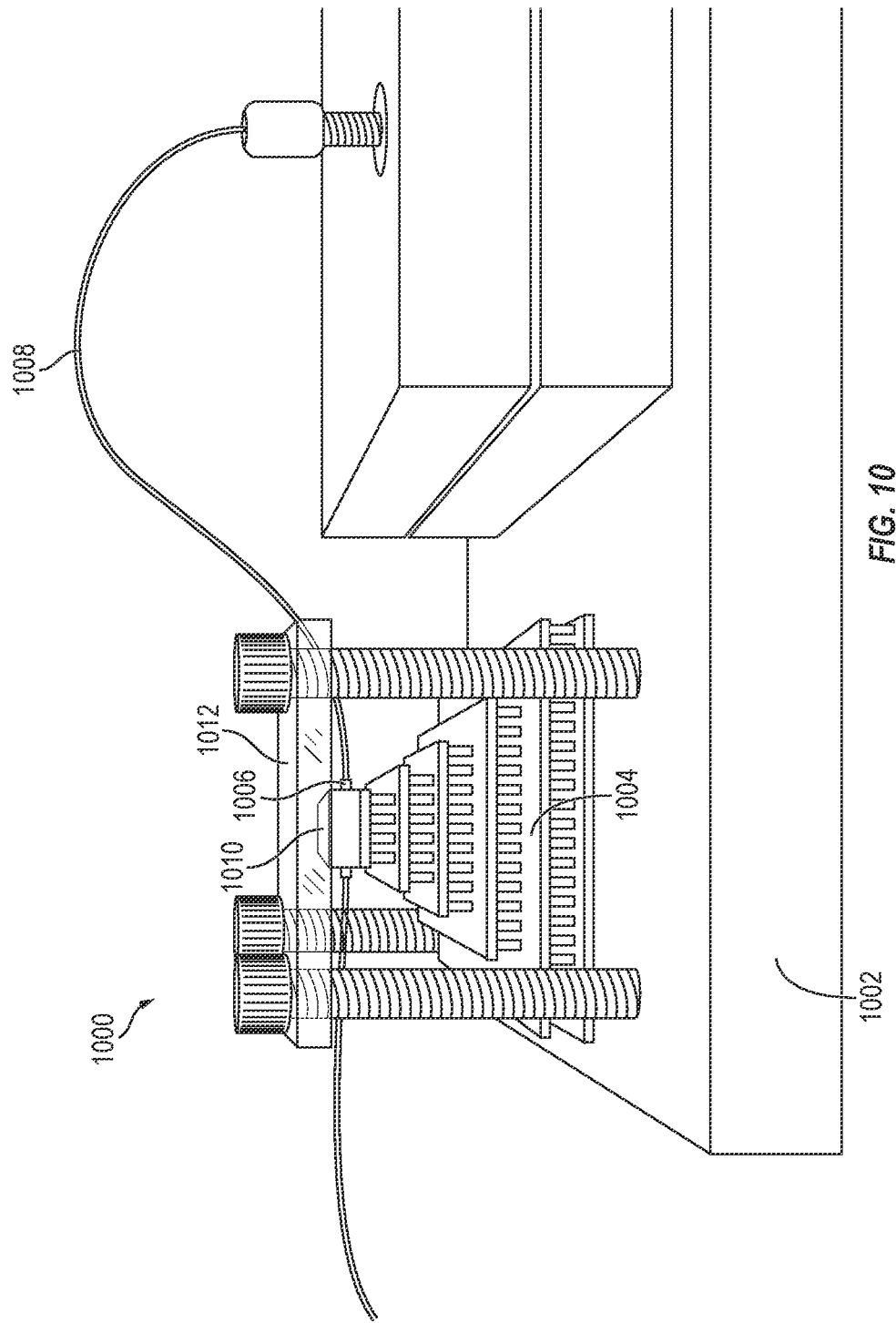
FIGS. 10 and 11 are side and perspective views of a freeze valve, according to some embodiments of the systems.
Figure 11:
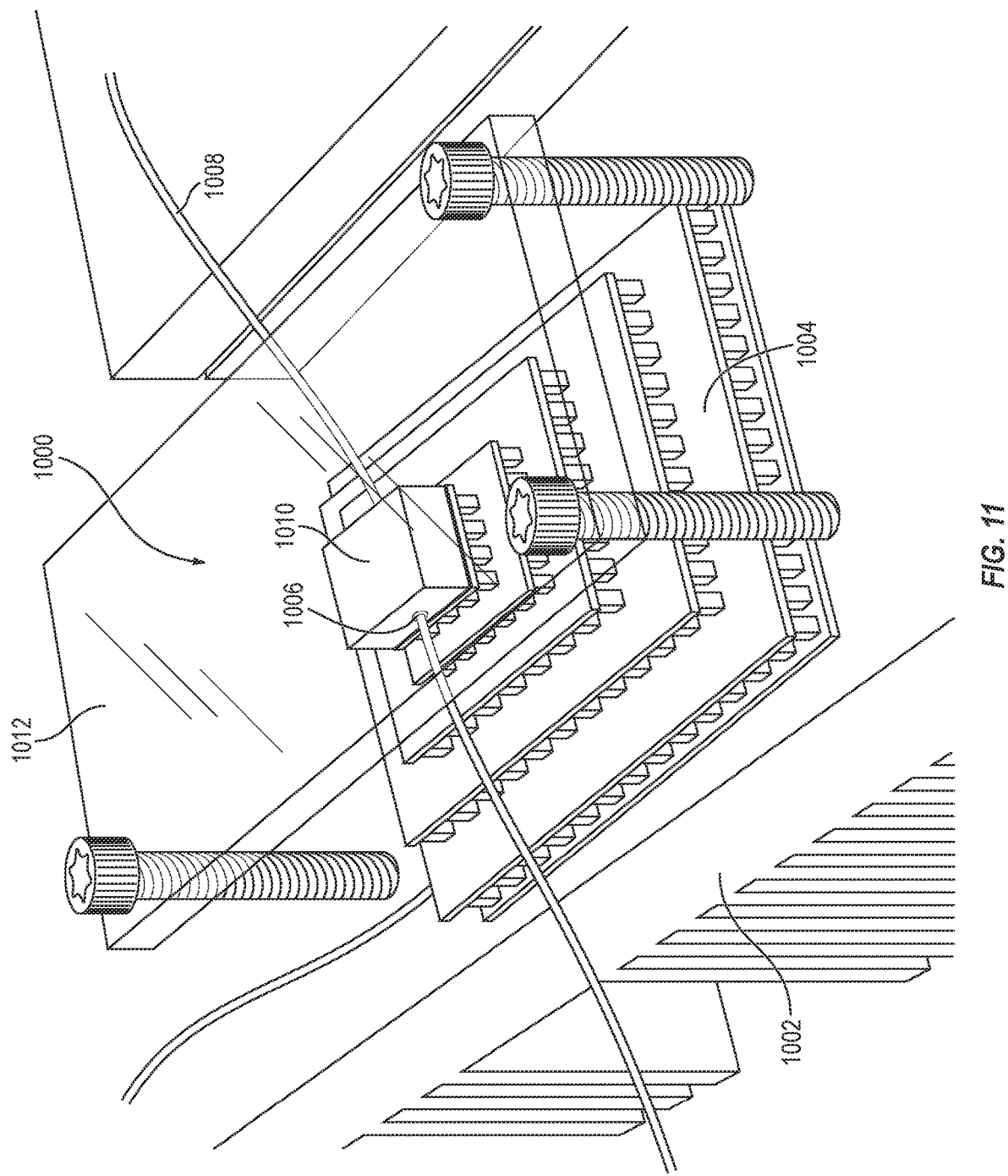

In certain embodiments, the support 100 includes one or more valves coupled to the support 100, the one or more valves being configured to limit (e.g., stop) movement of fluid within a microfluidic device 110 coupled to the support 100. Although fluid flow into and out of the microfluidic device 110 can be controlled, for example, via a pump, the movement of fluid lines connecting the pump to the microfluidic device 110 can create undesirable movement (e.g., drift and/or oscillation) of fluid within the microfluidic device 110 even when the pump is off. This movement, in turn, can disrupt processes taking place within the microfluidic device 110, such as detection and/or selection of micro-objects (e.g., for counting, characterization, and/or movement between channels and chambers) or assays being performed within the microfluidic device 110. One or more valves located in the support 100 can diminish or prevent such undesirable movement of fluid within the microfluidic device 110. Suitable valves can substantially lack internal dead space (i.e., space within the valve that is accessible to fluid but experiences very little fluid flux when fluid is flowing through the valve). In certain embodiments, at least one of the one or more valves is a thermally controlled flow controller, such as a freeze valve. FIGS. 10 and 11 depict a thermally controlled flow controller 1000 for use with a support 100 according to one embodiment of the systems. The flow controller 1000 includes a temperature regulation device 1004, a thermally conductive interface 1006, and a flow segment (hidden) of a fluid line 1008. The temperature regulation device 1004 can include one or more Peltier thermoelectric devices (e.g., a stack of two, three, four, five, or more Peltier devices). The thermally conductive interface 1006 may be made from a material having high thermal conductivity that is resistant to thermal damage, such as a metal (e.g., copper). The thermally conductive interface 1006 can wrap around the flow segment of the fluid line 1008. The thermally conductive interface 1006 can be, for example, a sleeve or other object that completely surrounds the flow segment of the fluid line 1008, or it can have a grooved surface that accommodates the flow segment of the fluid line 1008 within its groove. The fluid in the fluid line 1008 may be a liquid that freezes solid at a temperature achievable by the flow controller 1000. The thermally conductive interface 1006 is disposed adjacent the temperature regulation device 1004, preferably in contact with a thermally conductive surface thereof to increase the efficiency of the flow controller 1000.

In certain embodiments, the thermally controlled flow controller 1000 can include a heat sink 1002, which may be made of one or more materials having a high thermal conductivity (and low thermal capacitance), such as aluminum. Alternatively, the flow controller 1000 can be configured to rest on and/or be secured to a heat sink 1002. In addition, the flow controller 1000 can include insulating material 1010, which may be configured to prevent moisture from interfering with the function of the flow controller 1000, which can happen when moisture condenses on the thermally conductive interface 1006 and/or temperature regulation device 1004. The flow controller 1000 can also include a cover 1012. The cover 1012, or another device (e.g., a clamp), can be configured to hold the thermally conductive interface 1006 against the temperature regulation device 1004 and, e.g., thereby increase the efficiency of the flow controller 1000.

Figure 12:
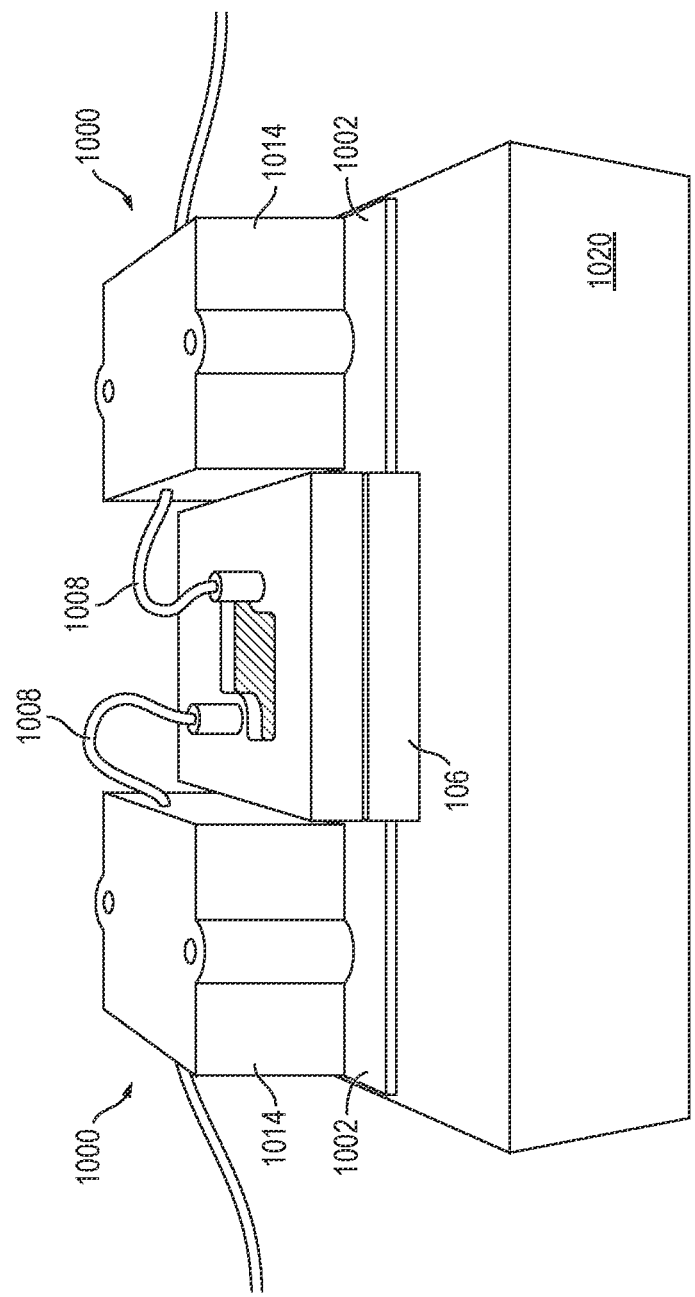
FIG. 12 is a perspective view of a pair of freeze valves, according to some embodiments of the systems. As shown, the freeze valves are flanking a socket that is holding a microfluidic device.

FIG. 12 depicts a socket 106 and a pair of valves, each a thermally controlled flow controller 1000, according to another embodiment. The flow controllers 1000 are disposed directly upstream and downstream of the socket 106. As shown in FIG. 12, each flow controller 1000 includes a heat sink 1002, and an enclosure 1014. Each enclosure 1014 contains a temperature regulation device 1004, a thermally conductive interface 1006, and a flow segment of a fluid line 1008. The fluid lines 1008 can be seen exiting from the flow controllers 1000 and entering the socket 106. The enclosures 1014 may be made from a material having a low thermal conductivity and/or a low gas permeability. The material can be, for example, a polymer, such as PVC or the like. The enclosures 1014 may each have a volume of at least twice (e.g., 2 to 10 times, 2 to 7 times, 2 to 5 times, 2 to 4 times, or 2 to 3 times) the volume of the respective temperature regulation devices 1004 contained therein. The enclosures can be configured to prevent moisture from interfering with the function of the flow controllers 1000, which can happen when moisture condenses on the respective temperature regulation devices 1004 and/or thermally conductive interfaces 1006. FIG. 12 also depicts a secondary heat sink 1020 upon which the flow controllers 1000 may be mounted. The secondary heat sink 1020 is configured to absorb heat from the heat sinks 1002 of the flow controllers 1000.

Figure 13:
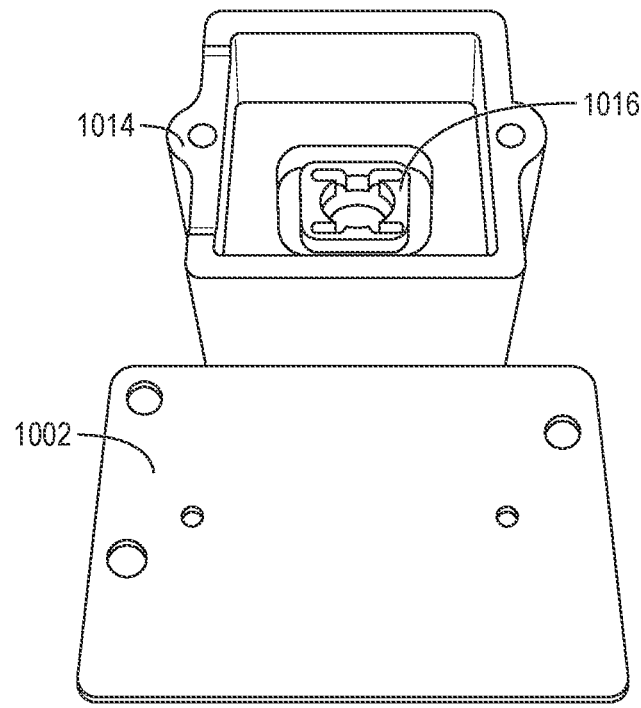
FIG. 13 is a perspective view of various components of the freeze valve depicted in FIG. 12.

FIG. 13 depicts the heat sink 1002 and enclosure 1014 of a thermally controlled flow controller 1000 like the ones depicted in FIG. 12. The underside of the enclosure 1014 is visible in FIG. 13, showing grooves 1016 configured to accommodate the fluid line 1008 (not shown) and/or at least part of the thermally conductive interface 1006. The grooves 1016 can be further configured to hold the thermally conductive interface 1006 (not shown) against the temperature regulation device 1004 (e.g., one or more (e.g., a stack of) Peltier thermoelectric devices; not shown).

Figure 14:
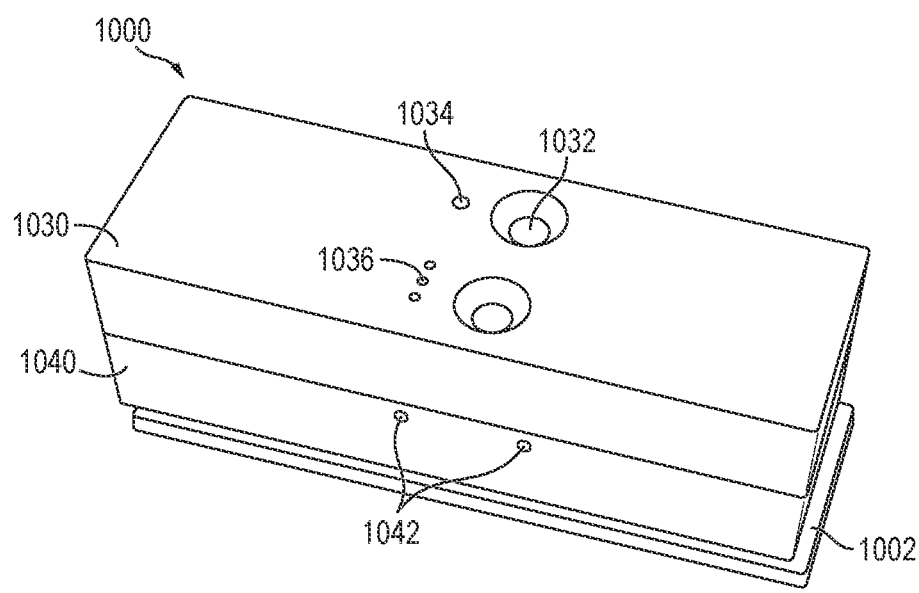
FIG. 14 is a perspective view of a freeze valve, according to some embodiments of the systems.

FIG. 14 depicts the exterior of a thermally controlled flow controller 1000 according to still another embodiment. As shown, the flow controller 1000 includes a cover 1030, a bottom portion 1040, and a heat sink 1002. The cover 1030 defines respective pluralities of indicator openings 1034, 1036 configured to allow indicators (e.g., LEDs) to be observed from a position external to the cover 1030. The indicators can be configured to indicate whether the flow controller 1000 is on or off and/or whether the flow segment of the fluid line 1008 is in an open (i.e., not frozen) or closed (i.e., frozen) configuration. In addition, the cover 1030 can define fastener openings 1032 configured to admit fasteners (e.g., screws) for assembly of the flow controller 1000. The bottom portion 1040 defines a plurality of fluid line openings 1042 configured to admit fluid lines (not shown) into the interior of the bottom portion 1040.

Figure 15:
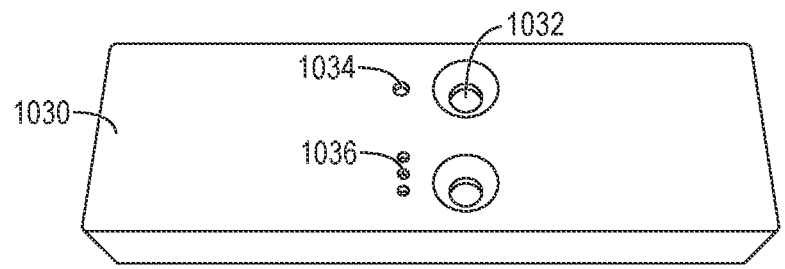
FIGS. 15 and 16 are top and bottom perspective views of a cover of the freeze valve depicted in FIG. 14.
Figure 16:
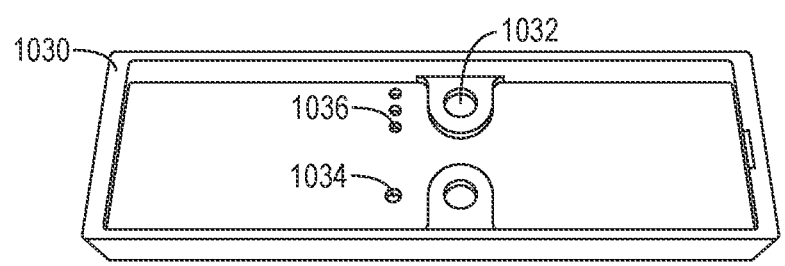

FIGS. 15 and 16 depict the top and the bottom, respectively, of the cover 1030 depicted in FIG. 14, shown without the bottom portion 1040. The indicator openings 1034, 1036 and the fastener openings 1032 are also depicted in FIGS. 15 and 16. FIG. 16 also depicts a cavity 1038 formed in the underside of the cover 1030, which is configured to hold a PCB (not shown) of the thermally controlled flow controller 1000. The PCB can include circuitry configured to control one or more temperature regulation devices 1004 (not shown) and/or one or more indicators (not shown). The cover 1030 can be made from a low thermal conductivity material, such as a polymer (e.g., PVC).

Figure 17:
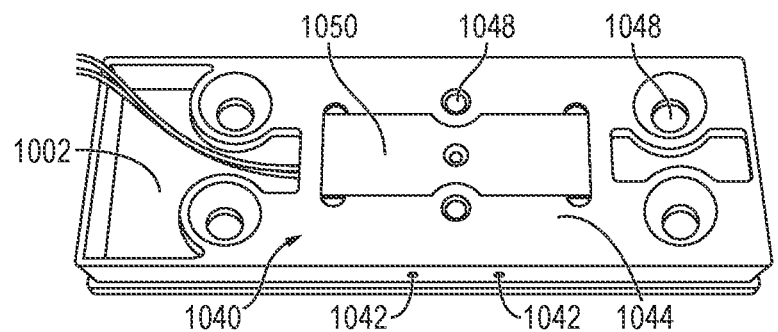
FIG. 17 is a perspective view of a bottom portion of the freeze valve depicted in FIG. 14.
Figure 18:
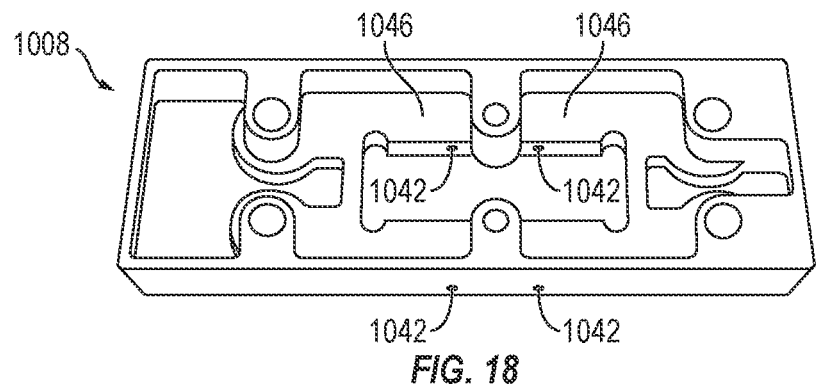
FIG. 18 is a perspective view of an enclosure of the bottom portion of the freeze valve depicted in FIG. 17.
Figure 21:
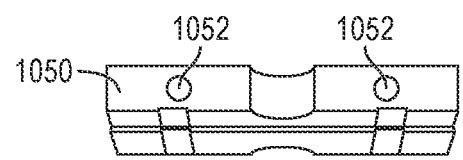

FIG. 17 depicts the bottom portion 1040 and the heat sink 1002 of the thermally controlled flow controller 1000 depicted in FIG. 14, shown without the cover 1030. The bottom portion 1040 includes a sleeve 1050 and an enclosure 1044 configured to hold the sleeve 1050. The bottom portion 1040 also defines fastener openings 1048 configured to admit fasteners (e.g., screws) for mounting the cover 1030 and the bottom portion 1040 on the heat sink 1002. In addition to holding the sleeve 1050, the enclosure 1044 also defines a plurality of fluid line openings 1042 (shown in FIG. 18), which correspond to a plurality of fluid line openings 1052 in the sleeve 1050 (as shown in FIG. 21). The fluid line openings 1042 pass completely through the enclosure 1044 in the horizontal plane of the enclosure 1044. FIG. 18 is a perspective view of the enclosure 1044 from below. The angle of the perspective view shows two corresponding sets of fluid line openings 1042 and two cavities 1046 formed in the underside of the enclosure 1044. The cavities 1046 in the enclosure 1044 are each configured to hold temperature regulation devices 1004 (e.g., each having one or more (e.g., a stack of two or more) Peltier thermoelectric devices; not shown) and wiring associated therewith (not shown).

Figure 19:
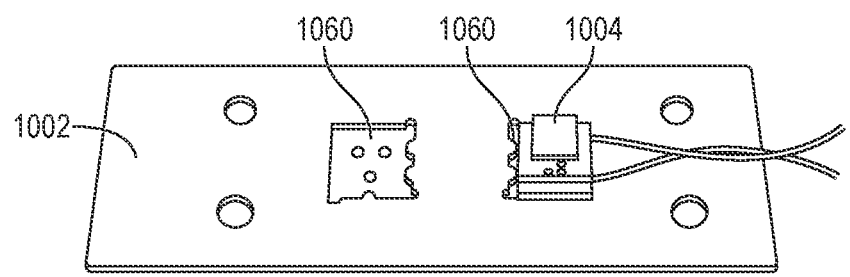
FIG. 19 is a perspective view of a heat sink of the freeze valve depicted in FIG. 14.

FIG. 19 depicts the heat sink 1002, which optionally defines two cavities 1060, each configured to hold a temperature regulation device 1004 (e.g., having one or more (e.g., a stack of two or more) Peltier thermoelectric devices). The heat sink 1002 is optionally configured to be coupled to a secondary heat sink 1020 or a support 100, which may function as a secondary heat sink.

Figure 20:
FIGS. 20 and 21 are top and side views of a sleeve of the freeze valve depicted in FIG. 14.

FIGS. 20 and 21 depict a sleeve 1050 configured to hold two fluid lines 1008 (e.g., an inlet and an outlet; not shown). The sleeve 1050 may be configured to completely enclose the flow segments of the fluid lines 1008. Alternatively, the sleeve 1050 can have grooves configured to accommodate the flow segments of the fluid lines 1008. Thus, the sleeve 1050 is an embodiment of a thermally conductive interface 1006. Accordingly, the sleeve 1050 facilitates maintaining the flow segments of the fluid lines 1008 in proximity to the temperature regulation device 1004 (not shown). The sleeve 1050 may be made of a high thermal conductivity (and low thermal capacitance) material, such as a metal (e.g., copper). The side view in FIG. 21 shows the fluid line 1008 openings 1052 defined by the sleeve 1050. As shown, the fluid line openings 1052 pass completely through the sleeve 1050 in the horizontal plane of the sleeve 1050. The fluid line openings 1052 are substantially aligned with corresponding fluid line openings 1042 in the enclosure 1044 (as shown in FIG. 18), such that, when the sleeve 1050 is disposed in the enclosure 1044 (as shown in FIG. 17), the fluid lines 1008 can pass through both the enclosure 1044 and the sleeve 1050. Further, when the sleeve 1050 is disposed in the enclosure 1044 (as shown in FIG. 17), the sleeve 1044 is placed into contact with the tops of both temperature regulation devices 1004 (e.g., each which can include one or more (e.g., a stack of two or more) Peltier thermoelectric devices; not shown).

In certain embodiments, the thermally controlled flow controller 1000 also includes a thermistor (not shown). The thermistor is configured to monitor the temperature of the sleeve and/or the temperature regulation device 1004 (or a surface thereof). The monitored temperature can provide feedback to indicate the open or closed condition of the flow controller 1000.

In certain embodiments, the thermally controlled flow controller 1000 also includes or is operatively coupled to a printed circuit board (PCB; not shown), as discussed above. The PCB can be configured to interface with the thermistor. The PCB may also be configured to regulate the current (e.g., DC) delivered to the temperature regulation devices 1004. Further, the PCB may be configured to step down the current delivered to the temperature regulation devices 1004.

The thermally controlled flow controllers 1000 described above are robust and have substantially eliminated dead spaces (compare to other fluid valves) in which bacteria or other debris can accumulate and/or grow. Further, the flow controllers 1000 reduce microbial contamination associated with other types of valves. Moreover, the flow controllers 1000 limit movement of fluid within a microfluidic device (e.g., a microfluidic device 110) connected thereto, which would otherwise result from flexing of fluid lines connected to the inlets and outlets of the microfluidic device. To optimize the system for minimizing fluid movement within microfluidic devices, the flow controller(s) 1000 should be disposed as close to the inlet and outlets of the microfluidic devices as practical.

The thermally controlled flow controllers 1000 unfortunately have several limitations. In some configurations, they can take a long time to cool to the desired temperature and freeze the fluid lines, thereby preventing precise control of fluid flow into and out of the microfluidic devices. In some instances, it can take up to about 45 to about 90 seconds to cool to the desired temperature. As well, over long periods of time, they can accumulate moisture and ice can form, thereby increasing the time needed to thaw the fluid in the fluid line and reopen the valve. In some instances, it can be difficult to precisely control the temperature since the thermistor is not located right near the fluid lines. And they contain numerous parts that are needed to connect the fluid lines to the Peltier devices.

Figure 32:
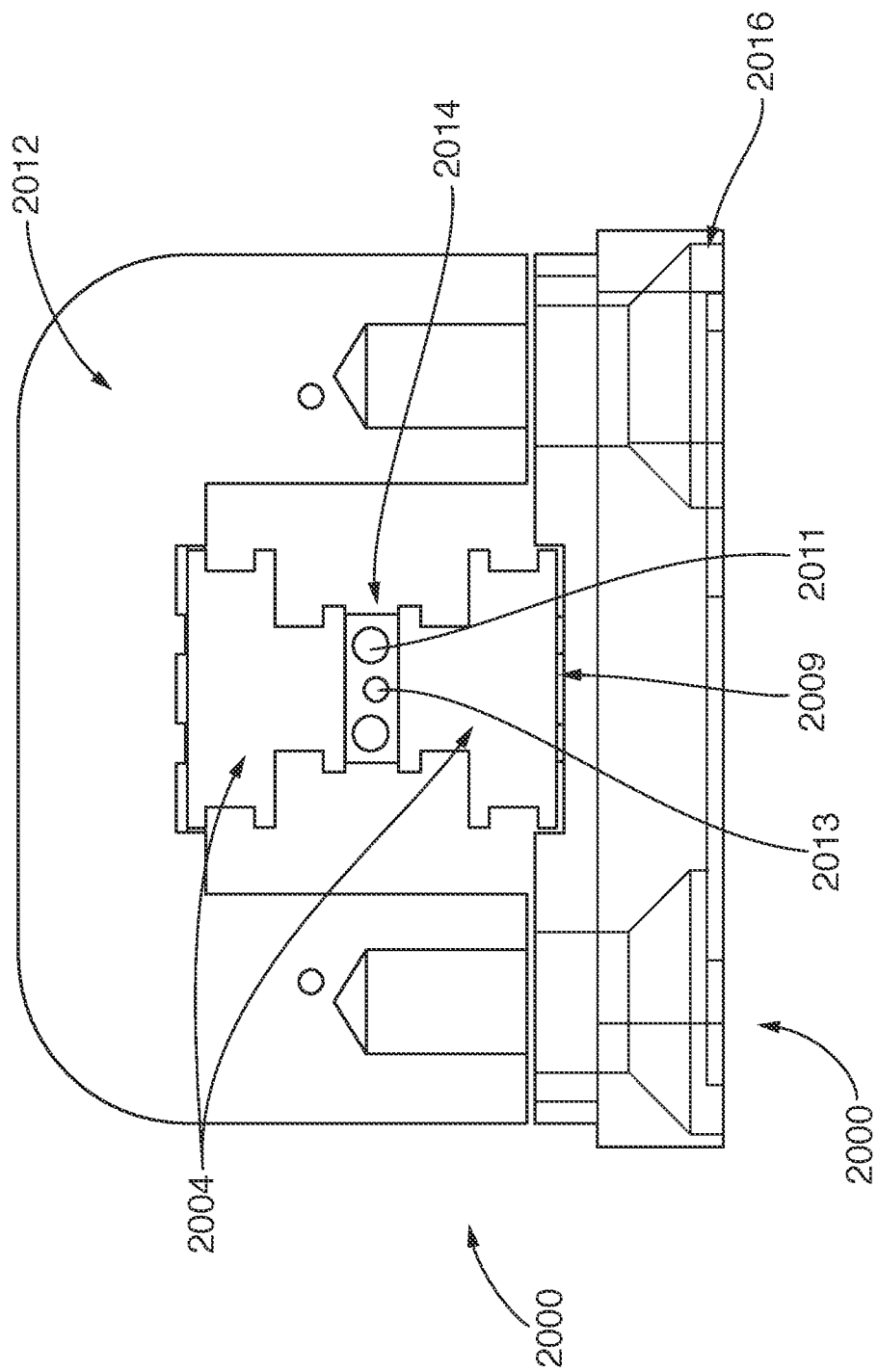
FIGS. 32 and 33 depict front and perspective views of a freeze valve in other embodiments of the systems.
Figure 33:
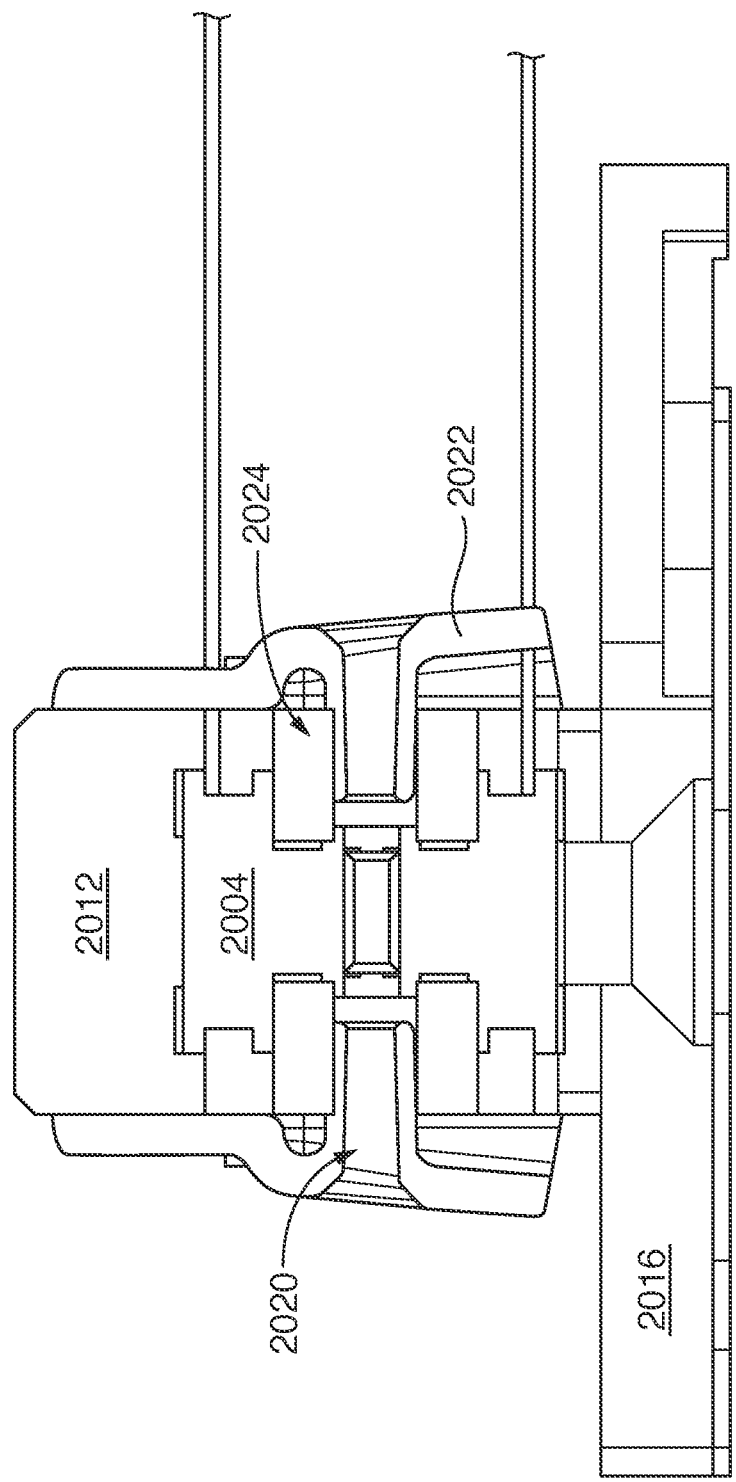

In other embodiments, the thermally controlled flow controller can comprise one or more freeze valves that do not experience these limitations. Examples of these thermally controlled flow controllers are depicted in FIGS. 32-33. As shown in FIG. 32 (a vertical cross section), the thermally controlled flow controller 2000 includes a base 2016 (or substrate) which can be mounted to a heat sink (not shown), which can be a secondary heat sink 1020 or the support 100. In some configurations, the base 2016 can be configured as a heat sink itself, negating the need to be mounted to a separate heat sink.

The base 2016 can be connected to a conduit 2012. The conduit 2012 surrounds some of the other components and captures heat and conducts it to the base 2016, which can dissipate the heat when it is configured as a heat sink, or conduct the heat to the separate heat sink (e.g., secondary heat sink 1020 or support 100). The base 2016 can be connected to the conduit 2012 using any connector, including the screws 2010 shown in FIG. 32. Other connectors can be used, such as pins, clamps, or the like.

The top of the base 2016 and the bottom of the conduit 2012 are each configured to abut or to be adjacent to a Peltier device 2004. The Peltier devices 2004 can include a 2-layer Peltier stack, as shown; alternatively, the Peltier devices 2004 can include a 3-, 4-, or more layer stack. While there are two Peltier devices shown in FIG. 32, additional Peltier devices could be used. The hot side of each Peltier device 2004 is located to abut or be near the conduct 2012 and the base 2016, respectively, so that the heat may be conducted away from the Peltier devices 2004. In some configurations, the base 2016 and the conduit 2012 can be configured with one or more indentations 2009 that help stabilize the Peltier devices 2004 after the thermally controlled flow controller 2000 is assembled.

The Peltier devices 2004 can be configured to be located adjacent to and/or abut a thermally conductive interface 2014. In some configurations, the thermally conductive interface 2014 is referred to as a cold head since it interfaces with one or more fluid lines (e.g., inlet and/or outlet fluid lines) and thereby defines the flow segment(s) of the fluid line(s) 1008 that will be cooled/frozen. The thermally conductive interface 2014 can be configured to maximize contact with the adjacent Peltier devices 2004. The thermally conductive interface 2014 can contain one or more (e.g., 2, 3, 4, 5, 6, 7, 8, or more) openings 2011 that can be used to enclose fluid lines (not shown) that are used to input and remove fluid from one or more microfluidic devices, as described herein. Thermally controlled flow controllers 2000 having a thermally conductive interface 2014 with two or more (e.g., 3, 4, 6, 8, or more) openings 2011 can be used to control flow to one or more (e.g., 2, 3, 4, or more microfluidic devices 110). For example, a thermally controlled flow controller 2000 having a thermally conductive interface 2014 with two openings 2011 can controllably freeze/thaw the flow segment of a pair of inlet and outlet fluid lines going to a single microfluidic device 110 or each of two inlet (or outlet) fluid lines going to two separate microfluidic devices 110. Similarly, a thermally controlled flow controller 2000 having a thermally conductive interface 2014 with four openings 2011 can controllably freeze/thaw the flow segment of two pairs of inlet and outlet fluid lines going to each of two microfluidic devices 110, or it can controllably freeze/thaw each of four inlet (or outlet) fluid lines going to four separate microfluidic devices 110.

In certain embodiments, the thermally conductive interface 2014 also contains a central portion which can be coupled with a thermal sensor (e.g., a thermistor). The central portion can include a hole, such as center hole 2013, and the thermal sensor can be located within the hole. The thermal sensor is used to measure the temperature of the fluid lines that are located in the opening(s) 2011.

The various components of the thermally controlled flow controller 2000 can be enclosed within a cover 2022, as shown in FIG. 33 (another vertical cross section, with the controller 2000 rotated 90° around the z axis relative to FIG. 32). The cover 2022 can be made of any material that has a low thermal conductivity, such as a plastic. The thermally controlled flow controller 2000 can also contain a barrier material located in any desired cavity (e.g., within the cover 2022) of the controller 2000. In the configurations shown in FIG. 33, the barrier material 2024 can be inserted to surround the thermally conductive interface 2014 and any gap between the base 2016 and the conduit 2012, as well as any other gap(s) between components in the controller 2000 and/or between components and the cover 2022. The barrier material 2024 prevents or reduces the ability of moisture to collect in any internal part of the controller 2000 and form ice. In some embodiments, the barrier material 2024 can comprise polymer, such as polyurethane or the like. In some embodiments, the barrier material can comprise a spray foam or foam slices made from an expanding foam (e.g., polyurethane foam).

As shown in FIG. 33, the thermally controlled flow controller 2000 can also contain a guide 2020. The guide can be located on both sides of the thermally conductive interface 2014 and can a user in feeding the fluid lines (not shown) through the thermally conductive interface 2014. The guide 2020 can be made of any material having a low thermal conductivity, such as a plastic. The guide 2020 can be part of a cover 2022 comprised by the thermally controlled flow controller 2000.

The conduit 2012 of the thermally controlled flow controller 2000 contains a design that is similar to a bridge. It is able to conduct heat from the hot side of the two sandwiched Peltier devices into the same heat sink. Thus, its ability to transfer heat away from the Peltier devices is improved relative to the thermally controlled flow controller 1000.

Figure 34:
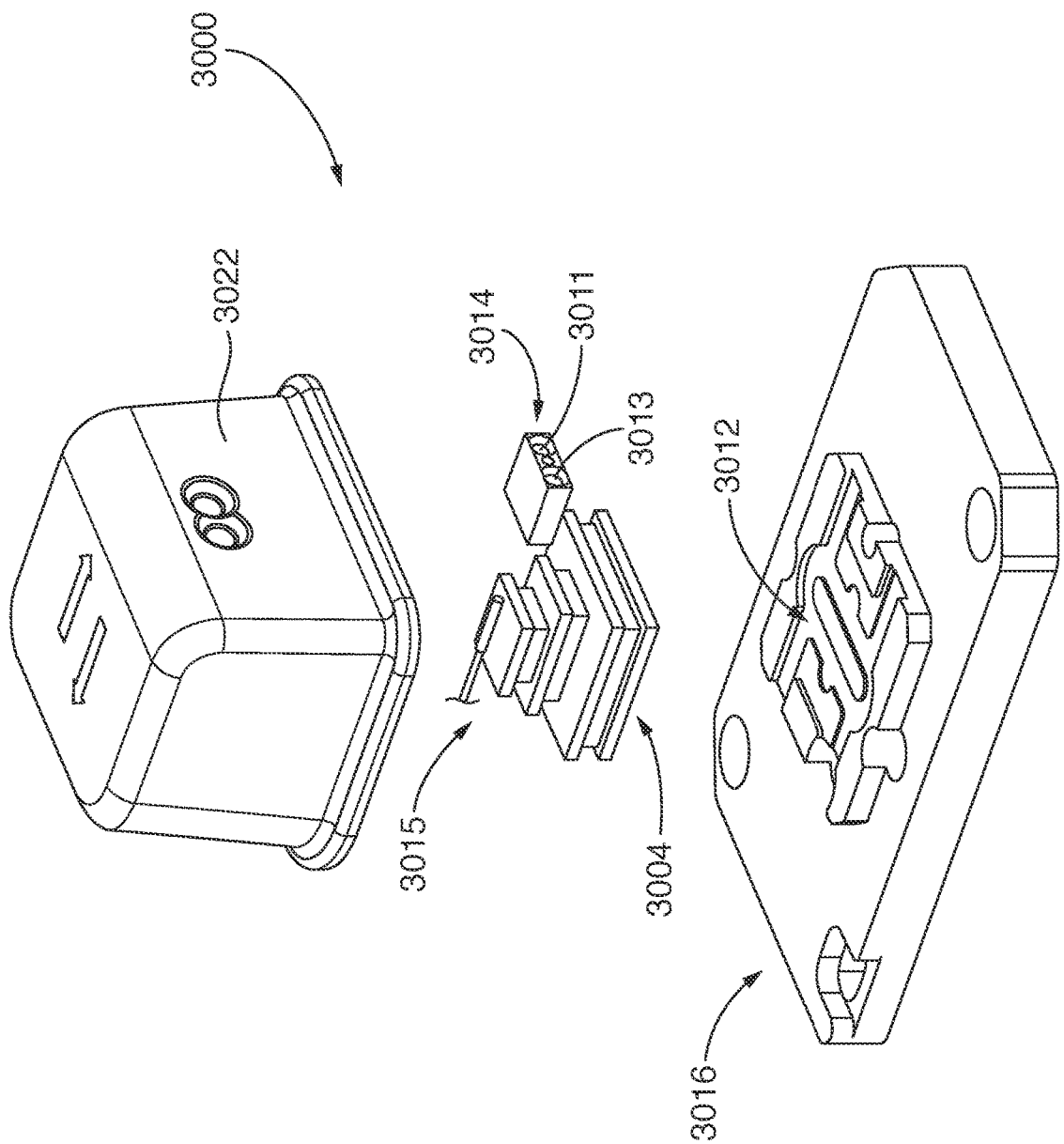
FIGS. 34 and 35 show perspective views of a freeze valve in yet other embodiments of the systems.
Figure 35:
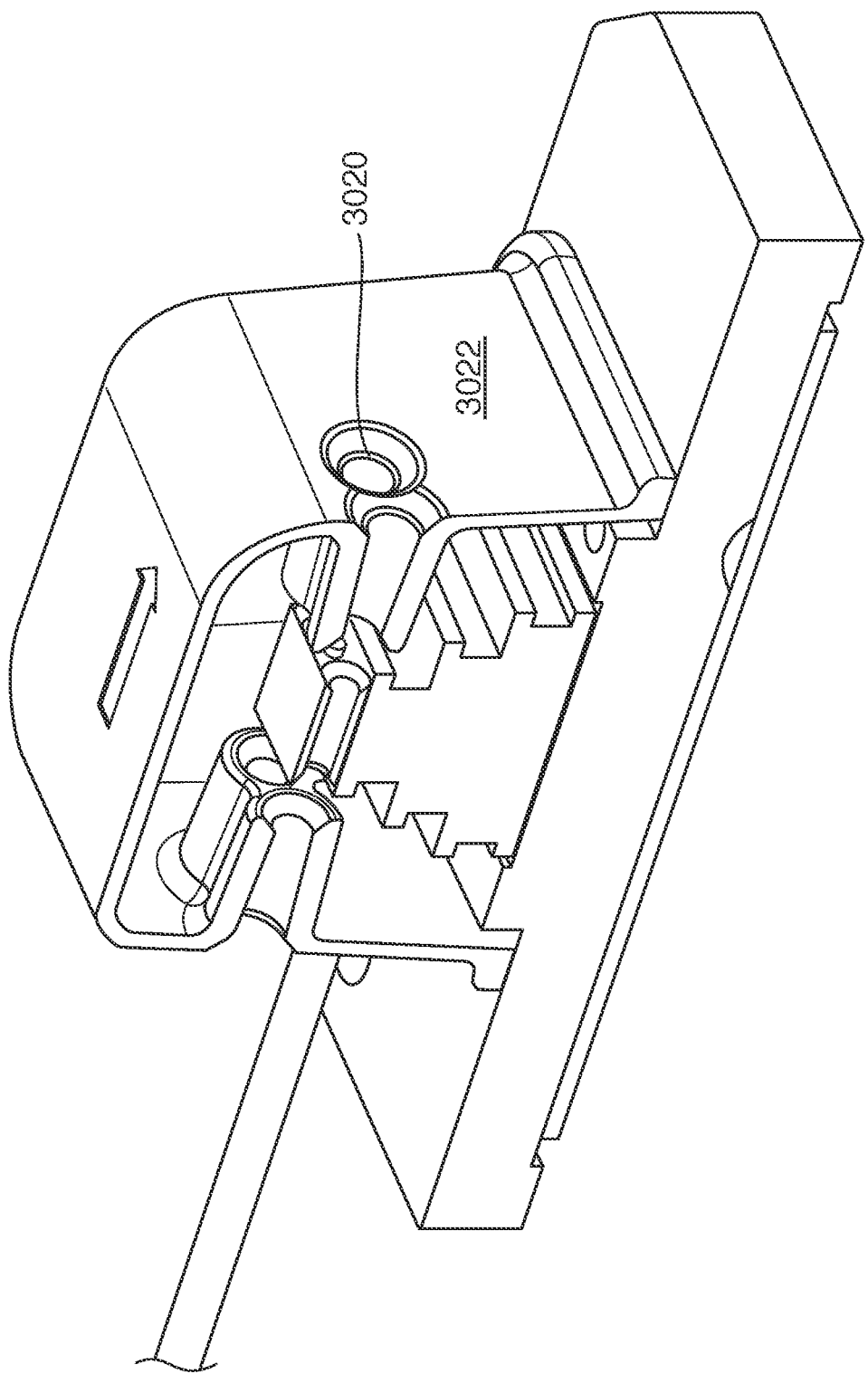

Other embodiments of thermally controlled flow controllers are depicted in FIGS. 34-35. In these embodiments, the thermally controlled flow controller 3000 contains a base 3016 (or substrate) which can be mounted to a heat sink (not shown), such as a secondary heat sink 1020 or a support 100. In some configurations, the base 3016 can be configured as a heat sink itself, negating the need to be mounted to a separate heat sink.

The base 3016 contains an upper surface with a portion that has been configured to mate with the other components of the controller 3000. This upper mating portion 3012 of the base 3016 can be configured to mate with and abut the bottom of a Peltier device 3004 and/or to mate with the bottom of a cover 3022. While there is a stack of three Peltiers in the Peltier device 3004 shown in FIG. 34, fewer (e.g., 2) or additional (e.g., 4 or more) Peltiers could be included. In some instances, just a single Peltier could be used in Peltier device 3004. Each tier of the Peltier stack increases the absolute temperature differential between the hot and cold surfaces of the Peltier device, thereby decreasing the total heat-flux the Peltier device stack needs to sustain. When operating the thermally controlled flow controller 3000, the liquid in the fluid lines is cooled (and sometimes super-cooled) to a temperature sufficient to nucleate ice formation. While this result can be achieved using a single tier Peltier device, it can be easier achieved using a multi-tiered structure.

The Peltier device 3004 is configured to have the thermally conductive interface 3014 (or cold head) resting on (e.g., a top surface of) the tiered structure. In some configurations, the thermally conductive interface 3014 can be configured to be a similar size to the top-most Peltier of the multi-tiered structure. The thermally conductive interface 3014 can contain one or more (e.g., two, three, four, six, eight) openings 3011 that can be used to enclose a respective one or more fluid lines (not shown) that are used to input and/or remove fluid from one or more microfluidic devices, as described herein. In preferred embodiments, the thermally conductive interface 3014 contains two openings 3011 configured to enclose a pair of inlet and outlet fluid lines going to a single microfluidic device 110. In other embodiments, the thermally conductive interface 3014 contains two openings 3011 configured to enclose each of two inlet (or outlet) fluid lines going to two separate microfluidic devices 110. Similarly, a thermally controlled flow controller 3000 having a thermally conductive interface 3014 with four openings 3011 can controllably freeze/thaw the flow segment of two pairs of inlet and outlet fluid lines going to each of two microfluidic devices 110, or it can controllably freeze/thaw each of four inlet (or outlet) fluid lines going to four separate microfluidic devices 110, etc.

In certain embodiments, the thermally conductive interface 3014 also contains a central portion which can be coupled with a thermal sensor 3015 (e.g., a thermistor). The central portion can include a hole, such as center hole 3013, and the thermal sensor 3015 can be located within the hole. The thermal sensor 3015 is used to measure the temperature of the fluid lines that are located in the opening(s) 3011.

The various components of the thermally controlled flow controller 3000 can be enclosed by a cover 3022, as shown in FIG. 35 (a perspective view of a vertical cross section). The cover 3022 can be made of a materially that has a low thermal conductivity, such as a plastic. The thermally controlled flow controller 3000 can also contain a barrier material located in any desired cavity (e.g., within the cover 3022) of the controller 3000. In the configurations shown in FIG. 35, the barrier material (not shown) can be inserted to surround the thermally conductive interface 3014 and any gap between the Peltier stack 3004 and the cover 3022, as well as any other gap(s) between components in the controller 3000. The barrier material prevents or reduces the ability of moisture to collect in any internal part of the controller 3000 and form ice. In some embodiments, the barrier material can comprise polymer, such as polyurethane or the like. In some embodiments, the barrier material can comprise a spray foam or foam slices made from any expanding foam (e.g., polyurethane foam).

As shown in FIG. 35, the thermally controlled flow controller 3000 can contain a guide 3020. The guide 3020 can be located on both sides of the thermally conductive interface 3014 and assists a user in feeding the fluid lines (not shown) through the thermally conductive interface 3014. The guide 3020 can be made of a material having a low thermal conductivity, such as a plastic. The guide 3020 can be part of a cover 3022 comprised by the thermally controlled flow controller 3000.

The thermally controlled flow controllers 2000 and 3000 can have a thermally conductive interface (or cold head) having a contact surface (e.g., a surface that contacts the Peltier device) of about 9 $mm^2$ to about 25 $mm^2$, or about 10 $mm^2$ to about 20 $mm^2$, or about 13 $mm^2$ to about 18 $mm^2$. In certain embodiments, the thermally conductive interface can have a volume of about 20 $mm^3$ to about 60 $mm^3$, or about 25 $mm^3$ to about 50 $mm^3$, or about 30 $mm^3$ to about 40 $mm^3$. This small thermal mass couples with a relatively large surface area for contacting the Peltier device can decrease the time required to cool (or supercool) the fluid lines and the fluid running through them. In certain embodiments, the thermally controlled flow controllers 2000 and 3000 can achieve freezing of the fluid within the flow segment of the fluid line(s) in about 35 seconds of less (e.g., about 30 seconds or less, about 27 seconds or less, about 25 seconds or less, about 23 seconds or less, or about 20 seconds, or ranging from about 20 seconds to about 35 seconds, about 20 seconds to about 30 seconds, or about 23 seconds to about 27 seconds). In certain related embodiments, the thermally controlled flow controllers 2000 and 3000 can achieve thawing of frozen fluid within the flow segment of the fluid line(s) in about 40 seconds of less (e.g., about 35 seconds or less, about 32 seconds or less, about 30 seconds or less, about 28 seconds or less, or about 25 seconds or less, or ranging from about 25 seconds to about 40 seconds, about 25 seconds to about 35 seconds, or about 28 seconds to about 32 seconds).

The thermally controlled flow controllers 2000 and 3000 also contain openings for the fluid lines to the microfluidic device. The associated guides in these device allow blind guidance of the tubes of the fluid lines through the cold head, making them easy to assemble.

The thermally controlled flow controllers 2000 and 3000 also contain a barrier material. This barrier material acts as a moisture barrier and keeps the Peltier devices (and therefore the controllers 2000 and 3000) running for a long time without accumulating ice that reduces performance.

In certain embodiments, the support 100 can also include or interface with $O_2$ and $CO_2$ sources configured to maintain culture conditions. In certain embodiments, the support 100 can also include or interface with a humidity monitor/regulator.

The support 100 can have dimensions of about 6 to 10 inches (or about 150 to 250 mm)× about 2.5 to 5 inches (or about 60 to 120 mm)× about 1 to 2.5 inches (or about 25 to 60 mm). Although it can be desirable to keep the dimensions of the support 100 substantially within these exemplary dimensions, depending upon the functionality incorporated into the support 100 the dimensions may be smaller or larger than the exemplary dimensions. Although the exemplary support 100 has been described as including specific components configured for particular functions, supports according to other embodiments may include different components that perform various combinations and sub-combinations of the described functions.

In certain embodiments, the light modulating subsystem 634 comprises one or more of a digital mirror device (DMD), a liquid crystal display or device (LCD), liquid crystal on silicon device (LCOS), and a ferroelectric liquid crystal on silicon device (FLCOS), and. The light modulating subsystem 634 can be, for example, a projector (e.g., a video projector or a digital projector). One example of a suitable light modulating subsystem is the MOSAIC™ system from ANDOR TECHNOLOGIES™. In other embodiments, the light modulating subsystem 634 may include microshutter array systems (MSA), which may provide improved contrast ratios. In still other embodiments, the light modulating subsystem 634 may include a scanning laser device. In certain embodiments, the light modulating subsystem 634 can be capable of emitting both structured and unstructured light.

In certain embodiments, the support 100 and the light modulating subsystem 634 are each individually configured to be mounted on a microscope, such as a standard research-grade light microscope or fluorescence microscope. For example, the support 100 can be configured to mount of the stage of a microscope. The light modulating subsystem 634 can be configured to mount on a port of a microscope.

Accordingly, in certain embodiments, the systems can be used in methods for converting a light microscope into a microscope configured for operating a microfluidic device 110. The methods can include the steps of mounting a system that includes a support 100 (e.g., as described herein) and a light modulating subsystem 634 (e.g., as described herein) on a suitable microscope. The support 100 can be mounted onto a stage of said light microscope, and the light modulating subsystem 634 can be mounted onto a port of said light microscope. In certain embodiments, the converted light microscope can be configured to operate an optically actuated microfluidic device 110 (e.g., an microfluidic device having an OET and/or OEW configuration).

In other embodiments, the supports 100 and the light modulating subsystems 634 described herein can be integral components of a light microscope. For example, a microscope having an integrated support 100 and an integrated light modulating subsystems 634 can be configured to operate an optically actuated microfluidic device 110 (e.g., a microfluidic device having an OET and/or OEW configuration).

In certain related embodiments, the systems provide a microscope configured for operating a microfluidic device 110. The microscope can include a support 100 configured to hold a microfluidic device 110, a light modulating subsystem 634 configured to receive light from a first light source and emit structured light, and an optical train. The optical train can be configured to (1) receive structured light from the light modulating subsystem 634 and focus the structured light on at least a first region in a microfluidic device 110, when the device 110 is being held by the support 100, and (2) receive reflected and/or emitted light from the microfluidic device 110 and focus at least a portion of such reflected and/or emitted light onto a detector 602. The optical train can be further configured to receive unstructured light from a second light source 622 and focus the unstructured light on at least a second region of the microfluidic device 110, when the device 110 is held by the support 100. In certain embodiments, the first and second regions of the microfluidic device 110 can be overlapping regions. For example, the first region can be a subset of the second region.

In certain embodiments, microscopes of the systems can further include one or more detectors 602. The detector 602 can include, but are not limited to, a charge-coupled device (CCD), complementary metal-oxide semiconductor (CMOS), scientific complementary metal-oxide semiconductor (SCMOS), a camera (e.g., a digital or film camera), or any combination thereof. If at least two detectors 602 are present, one detector 602 can be, for example, a fast-frame-rate camera while the other detector 602 can be a high sensitivity camera. The microscope can also include an eye piece configured for visualization by a user. Furthermore, the optical train can be configured to receive reflected and/or emitted light from the microfluidic device 110 and focus at least a portion of the reflected and/or emitted light on the additional detector 602. The optical train of the microscope can also include different tube lenses for the different detectors 602, such that the final magnification on each detector 602 can be different.

In certain embodiments, the light modulating subsystems 634 of the microscopes of the systems can include one or more of a digital mirror device (DMD), a liquid crystal display/device (LCD), a liquid crystal on silicon device (LCOS), a ferroelectric liquid crystal on silicon device (FLCOS), and scanning laser devices. Furthermore, the DMD, LCD, LCOS, FLCOS, and/or scanning laser devices can be part of a projector (e.g., a video projector or a digital projector). In other embodiments, the light modulating subsystem 634 may include microshutter array systems (MSA), which may provide improved contrast ratios. In certain embodiments, the microscopes of the systems can include an embedded or external controller (not shown) for controlling the light modulating subsystem 634. Such a controller can be, for example, an external computer or other computational device.

Figure 6:
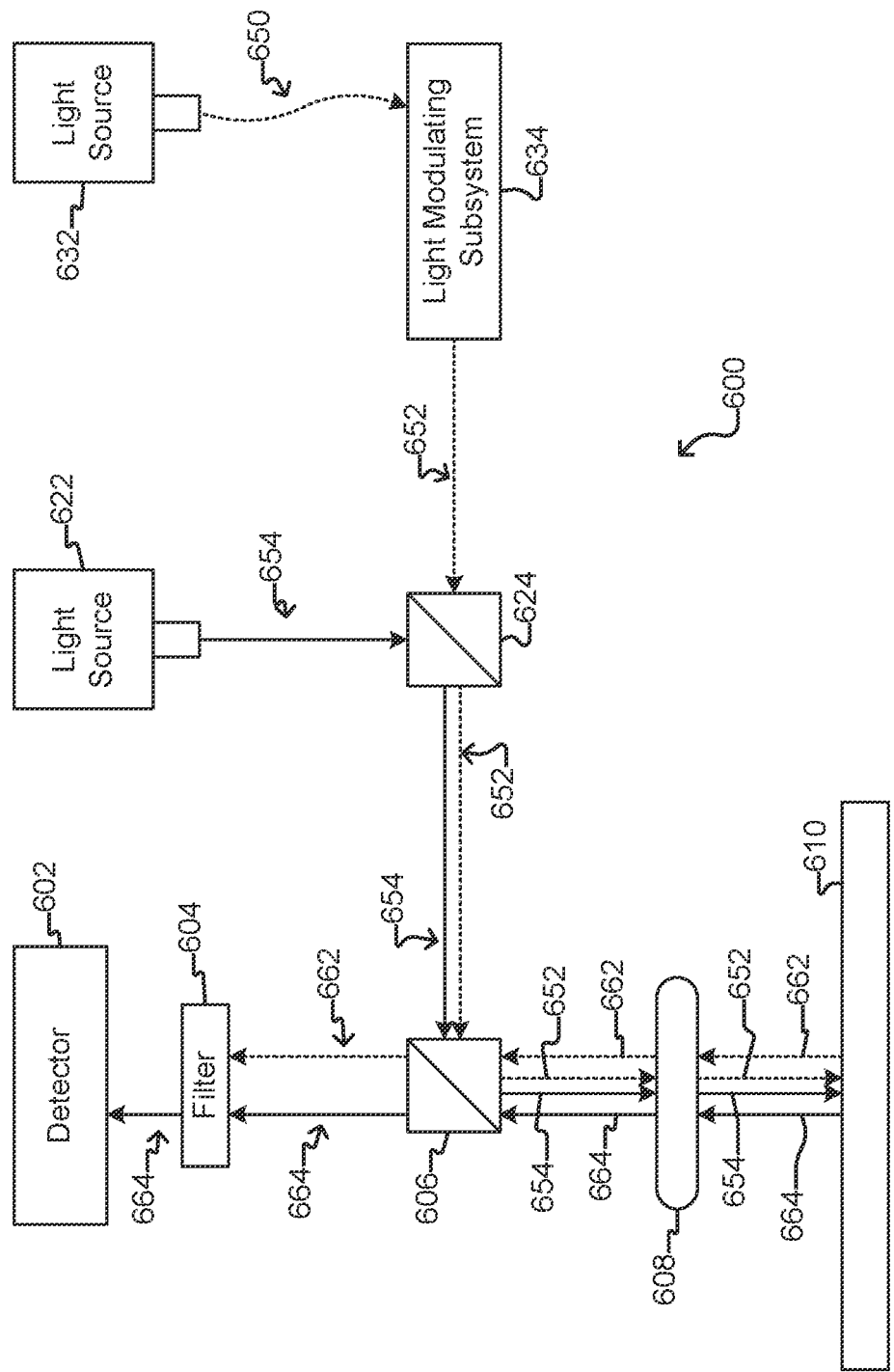
FIG. 6 is a schematic view of a system for operating a microfluidic device, according to some embodiments of the systems. The system depicted in FIG. 6 includes an optical train having various beam-splitters and/or dichroic filters, a first light source, a second light source, a light modulating subsystem, an objective, and a detector.

In certain embodiments, the systems 600/microscopes of the systems are configured to use at least two light sources 622, 632. For example, a first light source 632 can be used to produce structured light 650, which is then modulated by a light modulating subsystem 634 for form modulated structured light 652 for optically actuated electrokinesis and/or fluorescent excitation. A second light source 622 can be used to provide background illumination (e.g., using unstructured light 654) for bright-field or dark filed imaging. One example of such a configuration is shown in FIG. 6. The first light source 632 is shown supplying structured light 650 to a light modulating subsystem 634, which provides modified structured light 652 to the optical train of the microscope. The second light source 622 is shown providing unstructured light 654 to the optical train via the beam splitter 624. Modified structured light 652 from the light modulating subsystem 632 and unstructured light 654 from the second light source 622 travel through the optical train together to reach beam splitter 606, where the light 652, 654 is reflected down through the objective 608 (which may be a lens) to the sample plane 610. Reflected and/or emitted light 662, 664 from the sample plane 610 then travels back up through the objective 608, through the beam splitter 606, and to a dichroic filter 604. Light 662, 664 can be modulated, structured light 652 and unstructured light 654, respectively reflected from the sample plane 610. Alternatively, light 662, 664 can originate at or below the sample plane 610. Only a fraction of the light 662, 664 reaching the dichroic filter 604 passes through the filter 604 and reaches the detector 602. Depending on how the system is being used, beam splitter 606 can be replaced with a dichroic filter (e.g., for detecting fluorescent emissions originating at or below the sample plane 610).

As depicted in FIG. 6, the second light source 432 emits blue light. Blue light reflected from the sample plane 610 is able to pass through dichroic filter 604 and reach the detector 602. In contrast, structured light coming from the light modulating subsystem 634 gets reflected from the sample plane 610, but does not pass through the dichroic filter 604. In this example, the dichroic filter 604 is filtering out visible light having a wavelength longer than 495 nm. Such filtering out of the light from the light modulating subsystem 634 would only be complete (as shown) if the light emitted from the light modulating subsystem 634 did not include any wavelengths shorter than 495 nm. In practice, if the light coming from the light modulating subsystem 634 includes wavelengths shorter than 495 nm (e.g., blue wavelengths), then some of the light from the light modulating subsystem 634 would pass through filter 604 to reach the detector 602. In such a scenario, the filter 604 acts to change the balance between the amount of light that reaches the detector 602 from the first light source 632 and the second light source 622. This can be beneficial if the first light source 632 is significantly stronger than the second light source 622.

One alternative to the arrangement shown in FIG. 6, which accomplishes the same goal of changing the balance between the amount of light that reaches the detector 602 from the first light source 632 and the second light source 622, is to have the second light source 622 emit red light and the filter 604 filter out visible light having a wavelength shorter than 650 nm.

In certain embodiments, the microscopes (or systems) of the systems further comprise a first light source 632 and/or a second light source 622.

In certain embodiments, the first light source 632 can emit a broad spectrum of wavelengths (e.g., "white" light). The first light source 632 can emit, for example, at least one wavelength suitable for excitation of a fluorophore. The first light source 632 can be sufficiently powerful such that structure light emitted by the light modulating subsystem 634 is capable of activating light actuated electrophoresis in an optically actuated microfluidic device 110. In certain embodiments, the first light source 632 can include a high intensity discharge arc lamp, such as those including metal halides, ceramic discharge, sodium, mercury, and/or xenon. In other embodiments, the first light source 632 can include one or more LEDs (e.g., an array of LEDs, such as a 2×2 array of 4 LEDs or a 3×3 array of 9 LEDs). The LED(s) can include a broad-spectrum "white" light LED (e.g., the UHP-T-LED-White by PRIZMATIX), or various narrowband wavelength LEDs (e.g., emitting a wavelength of about 380 nm, 480 nm, or 560 nm). In still other embodiments, the first light source 632 can incorporate a laser configured to emit light at selectable wavelengths (e.g., for OET and/or fluorescence).

In certain embodiments, the second light source 622 is suitable for bright field illumination. Thus, the second light source 622 can include one or more LEDs (e.g., an array of LEDs, such as a 2×2 array of 4 LEDs or a 3×3 array of 9 LEDs). The LED(s) can be configured to emit white (i.e., wide spectrum) light, blue light, red light, etc. In some embodiments, the second light source 622 can emit light having a wavelength of 495 nm or shorter. For example, the second light source 622 can emit light having a wavelength of substantially 480 nm, substantially 450 nm, or substantially 380 nm. In other embodiments, the second light source 622 can emit light having a wavelength of 650 nm or longer. For example, the second light source 622 can emit light having a wavelength of substantially 750 nm. In still other embodiments, the second light source 622 can emit light having a wavelength of substantially 560 nm.

In certain embodiments, the optical trains of the microscopes of the systems include a dichroic filter 604 that filters out, at least partially, visible light having a wavelength longer than 495 nm. In other embodiments, the optical trains of the microscopes of the systems include a dichroic filter 604 that filters out, at least partially, visible light having a wavelength shorter than 650 nm (or shorter than 620 nm). More generally, the optical train can also include a dichroic filter 604 configured to reduce or substantially prevent structured light from a first light source 632 from reaching a detector 602. Such a filter 604 can be located proximal to the detector 602 (along the optical train). Alternatively, the optical train can include one or more dichroic filters 604 that is/are configured to balance the amount of structure light (e.g., visible structured light) from the light modulating subsystem 634 and the amount of unstructured light (e.g., visible unstructured light) from the second light source 622 that reaches said detector 602. Such balance can be used to ensure that the structured light does not overwhelm the unstructured light at the detector 602 (or in images obtained by the detector 602).

In certain embodiments, the optical trains of the microscopes of the systems can include an objective 608 configured to focus structured and unstructured light on a microfluidic device 110, with the objective being selected from a 100×, 60×, 50×, 20×, 10×, 5×, 4×, or 2× objective. These magnification powers are listed for illustration and not intended to be limiting. The objection can have any magnification.

The microscopes of the systems can include any of the supports 100 described herein. Thus, for example, the support 100 can include an integrated electrical signal generation subsystem 138 configured to establish, at least intermittently, a biasing voltage between a pair of electrodes in said microfluidic device 110 when said device 110 is held by said support 100. Alternatively, or in addition, the support 100 can include a thermal control subsystem 140 configured to regulate the temperature of said microfluidic device 110 when said device 110 is held by said support 100.

Any system or microscope described herein can further include a microfluidic device 110. The microfluidic device 110 can be a microfluidic device 110, such as a microfluidic device 110 configured to support dielectrophoresis or a microfluidic device 110 configured to support electrowetting. The microfluidic device 110 can be an optically actuated microfluidic device (e.g., a microfluidic device having an OET and/or OEW configuration).

Figure 7:
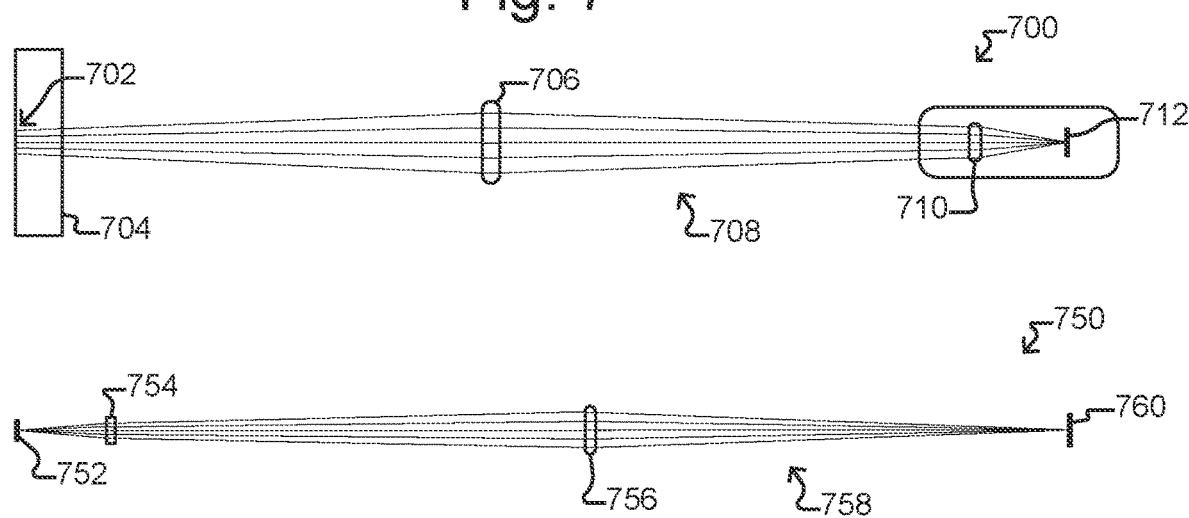
FIGS. 7 is a schematic view of a structured light path and an imaging path, in an optical train according to some embodiments of the systems.

FIG. 7A depicts a structured light path 700 in an optical train according to some embodiments of the systems. The structure light path 700 depicted in FIG. 7A begins at a DMD 702, which includes a glass cover 704 (e.g., a 20 mm glass plate). The DMD 702 may be part of a light modulating subsystem like the light modulating subsystem 634 depicted in FIG. 6. The DMD 702 modifies light from a light source (not shown) to form structured light 708. The structured light 708 is then focused by a tube lens 706 toward an objective 710 (which may be a lens). The objective 710 in turn focuses the structured light 708 onto a cover 712 (e.g., a cover glass). The cover 712 may be a cover of a microfluidic device 110, such as an optically actuated microfluidic device. In the latter embodiment, the structure light can actuate and/or operate the optically actuated microfluidic device 110 as described below.

FIG. 7B depicts an imaging light path 750 in an optical train according to some embodiments of the systems. The imaging light path 750 depicted in FIG. 7B begins at a sample plane 752, which may coincide with the cover 712 of a microfluidic device 110. The sample plane 752 may be similar to the sample plane 610 depicted in FIG. 6. Therefore, the light 758 in the imaging light path 750 may be reflected from the sample plane 752. Alternatively, the light 758 pay have passed through the sample plane 752. From the sample plane 752, the light 758 is focused by an objective lens 754 and an achromatic tube lens 756 toward a camera plane 760. The camera plane 760 can coincide with a detector (not shown), like the detector 602 shown in FIG. 6. In this manner, the imaging light path 750 can be used to visualize a sample or a portion thereof disposed at the sample plane 752 (e.g., contained within a microfluidic device 110).

Figure 22:
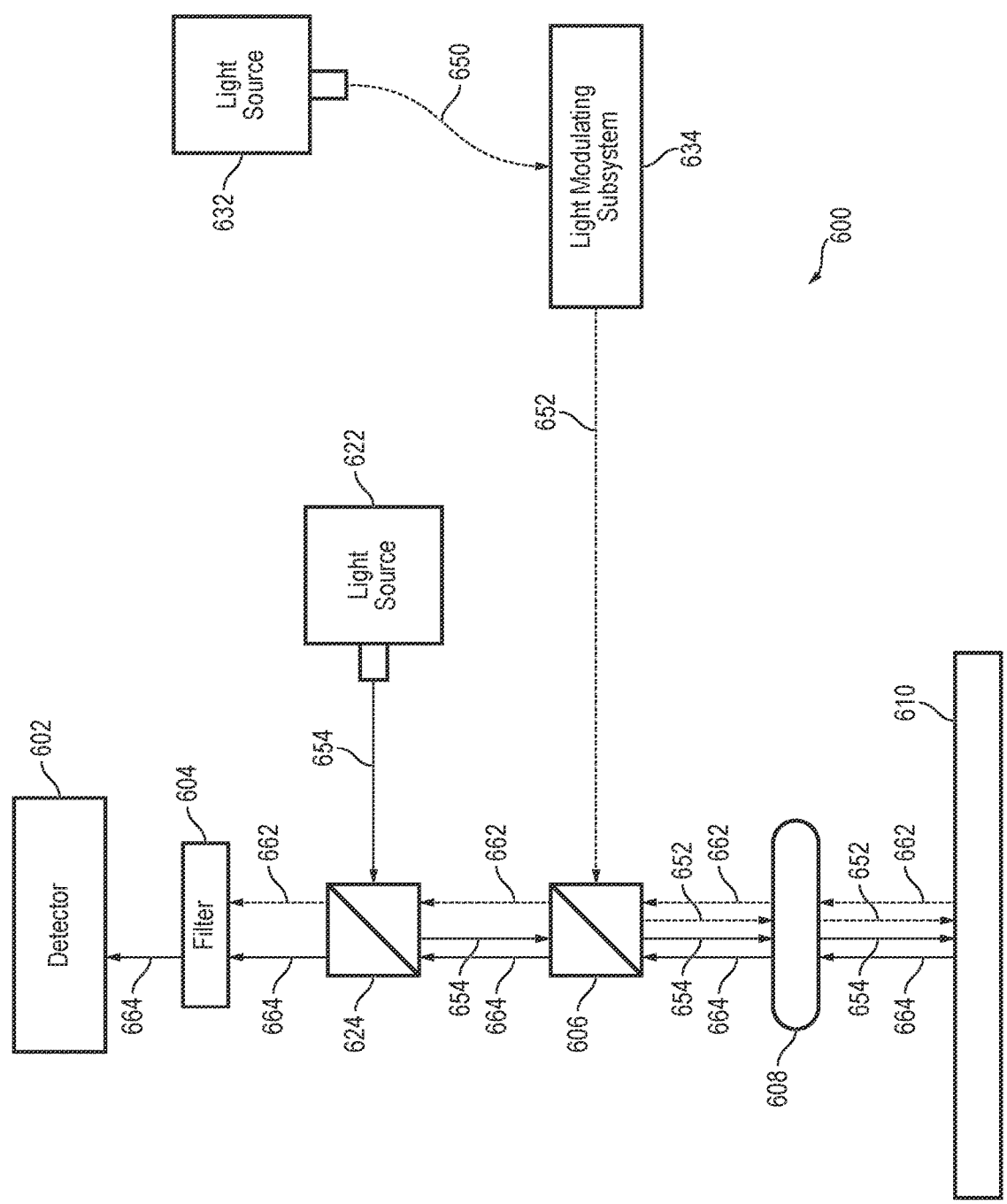
FIG. 22 is a schematic view of a system for operating a microfluidic device, according to some embodiments of the systems. The system depicted in FIG. 22 includes an optical train having various beam-splitters and/or dichroic filters, a first light source, a second light source, a light modulating subsystem, an objective, and a detector.

FIG. 22 depicts a system 600 having an optical train similar to the one depicted in FIG. 6. In the system 600 depicted in FIG. 22, the second light source 622 and the beam splitter 624 are disposed in the main light path between the sample plane 610 and the detector 602, instead of beside the main light path as in FIG. 6. In such embodiments, the second light source is sized, shaped and configured such that it does not interfere with the reflected and/or emitted light 662, 664 from the sample plane 610. Further, the beam splitter 624 may only act as a filter to modify the unstructured light 654 from the second light source 622 without changing the direction of the unstructured light 654. In other embodiments, system 600 may not include the beam splitter 624.

In certain embodiments, the second light source 622 comprises a light pipe and/or one or more LEDs (e.g., an LED array, such as a 2×2 of 3×3 array of LEDs).

Figure 23:
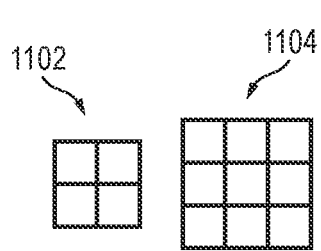
FIG. 23 is a schematic view of two LED arrays, according to some embodiments of the systems.

FIG. 23 depicts two LED arrays that may be used as light sources in the systems 600 described herein. A first LED array 1102 includes a 2×2 array of four LEDs. A second LED array 1104 includes a 3×3 array of nine LEDs. Square arrays produce higher light intensity per unit area compares to non-square arrays. The LEDs in the arrays can have the same color/wavelength (e.g., ultraviolet, 380 nm, 480 nm or 560 nm). Alternatively, various subsets of the LEDs in the arrays can have different colors/wavelengths. Further, LEDs can natively emit a narrowband wavelength (e.g., a 450 nm wavelength), but be coated with a phosphorescent material to emit white light upon excitation with the narrowband wavelength.

Figure 24:
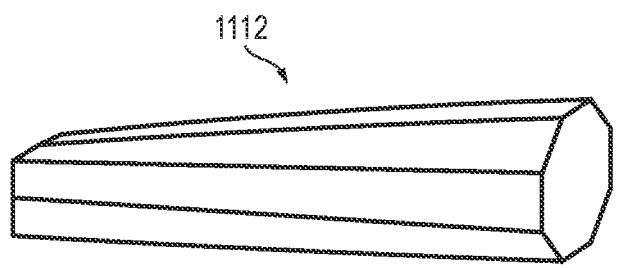
FIG. 24 is a schematic view of a light pipe/optical integrator, according to some embodiments of the systems.

FIG. 24 depicts a light pipe (or optical integrator) 1112, which may be configured to receive and propagate light from a light source, such as one of the LED arrays 1102, 1104 depicted in FIG. 23. Light pipes 1112, also known as "non-imaging collection optics," are configured to propagate light from one end thereof (i.e., an input aperture) to the other end thereof (i.e., an output aperture), with the light emitted from the output aperture being of substantially uniform intensity (i.e., the flux of light through a first area of defined size at the plane of the output aperture is substantially the same as the flux of light through any other area at the plane of the output aperture having the same defined size). The body walls of the light pipe 1112 can be constructed from transparent glass or a transparent plastic. Light pipes 1112 are available, e.g., from EDMOND OPTICS.

Figure 25:
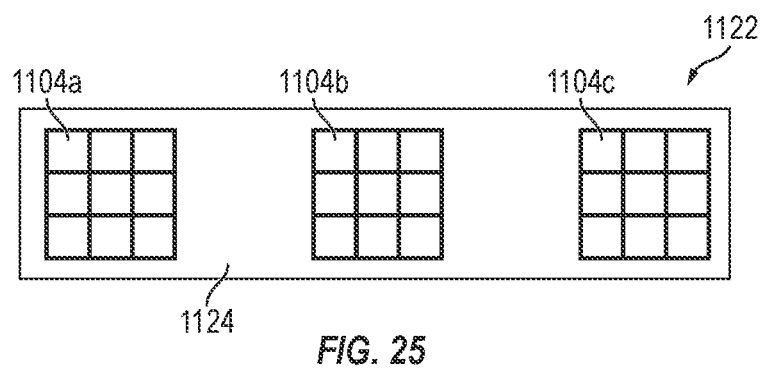
FIG. 25 is a schematic view of a light source, according to some embodiments of the systems.

FIG. 25 depicts a light source 1122 including a plurality of 3×3 LED arrays 1104 coupled to a surface 1124. The surface 1124 may be an LED board. The light source 1122 may be disposed within a system such that it is movable relative to an aperture configured to receive light emitted from the light source 1122. For example, the system can comprise a light pipe/optical integrator 1112, and an input aperture of the light pipe 1112 can be configured to receive light emitted from one of the plurality of LED arrays 1104 coupled to the surface 1124. Accordingly, different LED arrays 1104 may be available as a light source (e.g., through the light pipe/optical integrator 1112) depending on the relative positions of the surface 1124 of the light source 1122 and the light pipe/optical integrator 1112.

Figure 26:
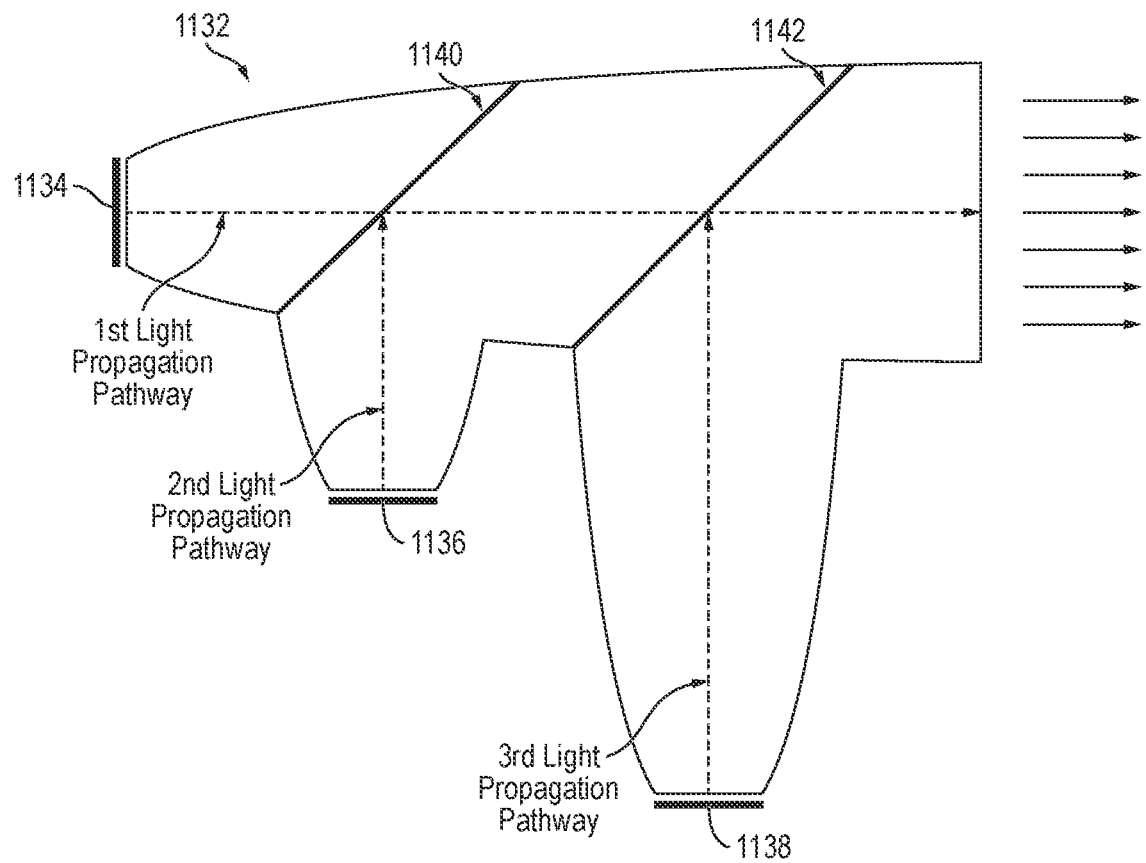
FIG. 26 is a schematic view of a multi-input light pipe/optical integrator, according to some embodiments of the systems.

FIG. 26 depicts a multi-input light pipe/optical integrator 1132. The multi-input light pipe 1132 has a plurality (e.g., 3) of input apertures, each associated with a light propagation pathway and respective light source 1134, 1136, 1138, and one fewer (e.g., 2) dichroic filters 1140, 1142. Each dichroic filter 1140, 1142 is configured to reflect light from a corresponding light source 1136, 1138. The multi-input light pipe 1132 depicted in FIG. 26 has first, second and third light sources 1134, 1136, 1138, any of which may be an array of LEDs (e.g., a 2×2 or 3×3 array of LEDs). The first light source 1134 may be an array of LEDs emitting light at around 380 nm. The second light source 1136 may be an array of LEDs emitting light at around 480 nm. The third light source 1138 may be an array of LEDs emitting light at around 560 nm. Therefore, the wavelength of light exiting from the multi-input light pipe 1132 can be controlled by selectively activating the first, second and third light sources 1134, 1136, 1138. The multi-input light pipe 1132 is configured such that light from any one of the light sources 1134, 1136, 1138, or any combination thereof, entering the corresponding input aperture(s) will be of substantially uniform intensity when it is emitted from the output aperture. The body walls of the multi-input light pipe 1132 can be constructed from transparent glass or a transparent plastic.

Figure 8A:
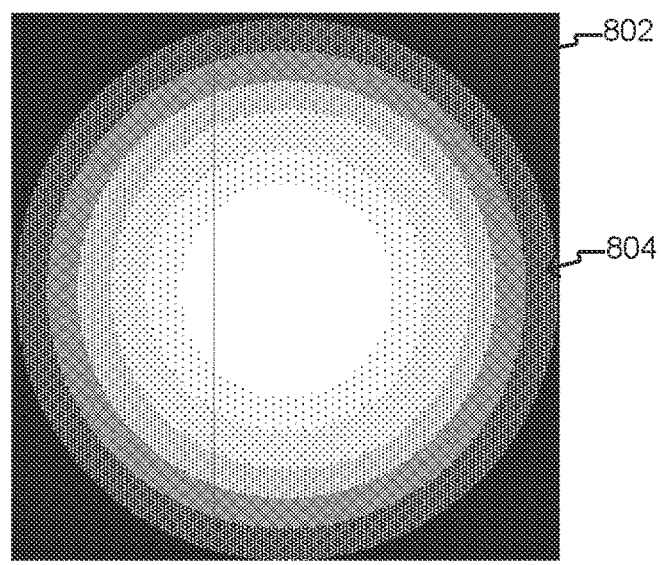
FIGS. 8A-8C are diagrams illustrating how structured light can be used to compensate for optical vignetting.
Figure 8B:
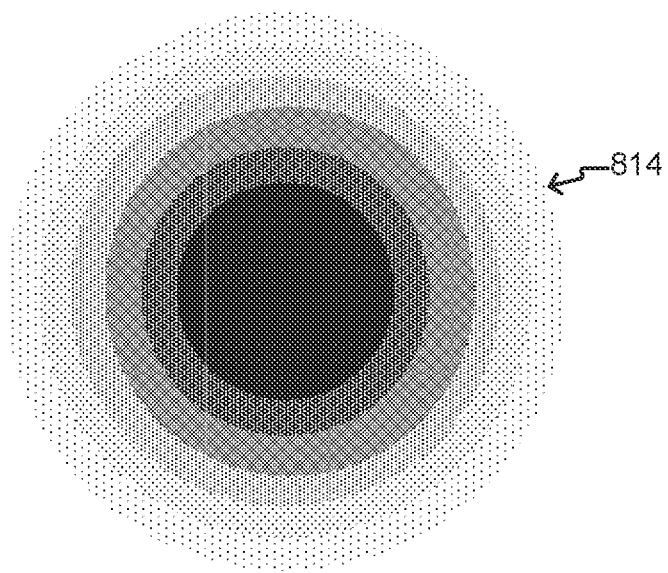
Figure 8C:
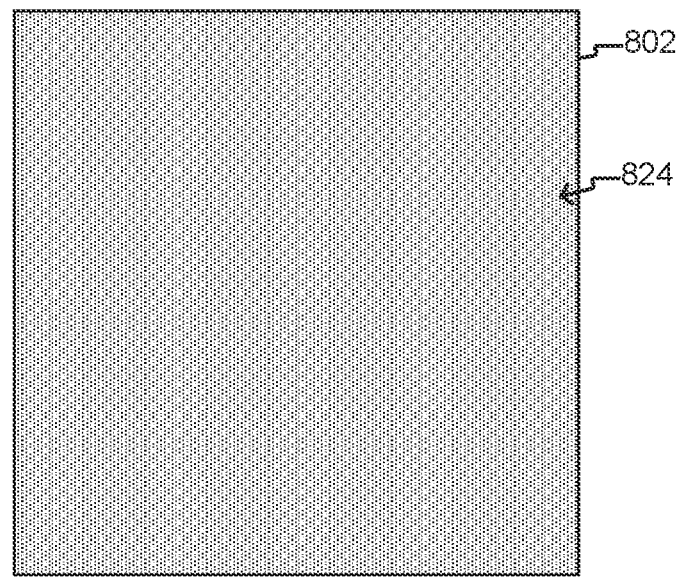

In certain embodiments, the microscopes of the systems are configured to use a single light source (e.g., a white-light LED; not shown) which is received by the light modulating subsystem 634 and transmitted to the optical train. The single light source can be used to provide structured light for light actuated electrokinesis, fluorophore excitation, and bright field illumination. In such an arrangement, structured illumination can be used to compensate for optical vignetting or any other arbitrary non-uniformity in illumination. Optical vignetting is the gradual falloff of illumination 804 toward the edge of a field of view 802 (e.g., FIG. 8A). The light intensity of the single light source can be measured pixel by pixel and the information used to generate an inverted optical vignetting function 814 (e.g., FIG. 8B). The inverted optical vignetting function 814 can then be used to adjust the output of light from the light modulating subsystem, thereby producing a uniformly illuminated field 824 in the field of view 802 (e.g., FIG. 8C).

The systems further provide methods of using light to manipulate a micro-object in an optically actuated microfluidic device 110. The methods include placing an optically actuated microfluidic device 110 onto the support 100 of any one of the systems or microscopes described herein, disposing a micro-object on or into the optically actuated microfluidic device 110, focusing structured light from a light modulating subsystem 634 onto a first region on a surface of the optically actuated microfluidic device 110, and moving the focused structured light to a second region on the surface of the optically actuated microfluidic device 110. Provided that the micro-object is located proximal to said first region, moving the focused light can induce the directed movement of the micro-object. The focused structured light can be used, for example, to create a light cage around the micro-object. Alternatively, the focused structured light can be used to contact, at least partially, a fluidic droplet that contains the micro-object.

In another embodiment of a method of using light to manipulate a micro-object in an optically actuated microfluidic device 110, a light pattern is spatially fixed, and the optically actuated microfluidic device 110 is moved relative to the light pattern. For instance, the optically actuated microfluidic device 110 can be moved using a motorized or mechanical microscope stage, which may be automatically controlled by a computer, manually controlled by a user, or semi-automatically controlled by a user with the aid of a computer. In another similar embodiment, the spatially fixed light pattern can form geometric patterns, such as a "cage" or a box, configured to move micro-objects (e.g., a biological cell or a droplet of solution optionally containing a micro-object of interest) on a steerable stage.

In other embodiments, the systems for operating the microfluidic devices can be configured with access to directly (e.g., manually or robotically) introduce a fluidic sample to the microfluidic device. In the embodiments described above, a fluidic sample is introduced (and removed) through the first fluidic input/output line 112 and the second fluidic input/output line 118. The internal volume of the microfluidic device can be limited, for example, to less than 50 microliters (e.g., less than 40 microliters, less than 30 microliters, less than 25 microliters, less than 20 microliters, less than 15 microliters, or less than 10 microliters, or about 10 to about 50 microliters, about 10 to about 40 microliters, about 10 to about 30 microliters, about 5 to about 25 microliters, about 5 to about 20 microliters, about 5 to about 15 microliters, about 2 to about 10 microliters, or about 2 to about 5 microliters). In some instances, only about half of that fluid amount (e.g., about 25 microliters or less, about 20 microliters or less, about 15 microliters or less, about 10 microliters or less, or about 2 to about 10 microliters, or about 1 to about 5 microliters) typically flows through the microfluidic device since the other half of the fluid is being held relatively stationary by the microfluidic device for analysis. The fluidic sample flowing into (and out of) the microfluidic device though the first or second fluidic input/output lines ideally forms a relatively discrete packet of fluid since only a limited amount of the fluid can be inserted into the microfluidic device at any given time. Yet the length of the fluid line between the pump for the first and second fluidic input/output lines and the microfluidic device can be long (e.g., about 50 cm, about 75 cm, about 100 cm, about 125 cm, about 150 cm or more) and have an internal volume much greater than about 5 microliters. As a result, the fluidic samples, which are small to begin with, can become thinned out, or dispersed, as they move through the fluid lines before they are introduced into the microfluidic device. Moreover, as the samples become dispersed, micro-objects (e.g., cells or beads) within the sample can become non-uniformly distributed within the fluidic sample, leading to non-uniform loading of micro-objects between channels within the microfluidic device.

The exemplary embodiments illustrated in FIGS. 27-31 reduce or prevent dispersal of the fluid sample, and related non-uniform distribution of micro-objects in the fluid sample, since the sample can be introduced directly into the microfluidic device. In these embodiments, the microfluidic device is held by a socket, which is part of a support. The socket includes a lid which can be separated into 2 (or more) portions. One of those portions can be separated from the other portion(s) so that it no longer covers (or contacts) the microfluidic device, allowing the fluid sample to be introduced directly into the microfluidic device without the need for the sample to flow through a fluid line. At the same time, the other portion(s) of the lid remains in place, retaining the microfluidic device in the socket.

Figure 27:
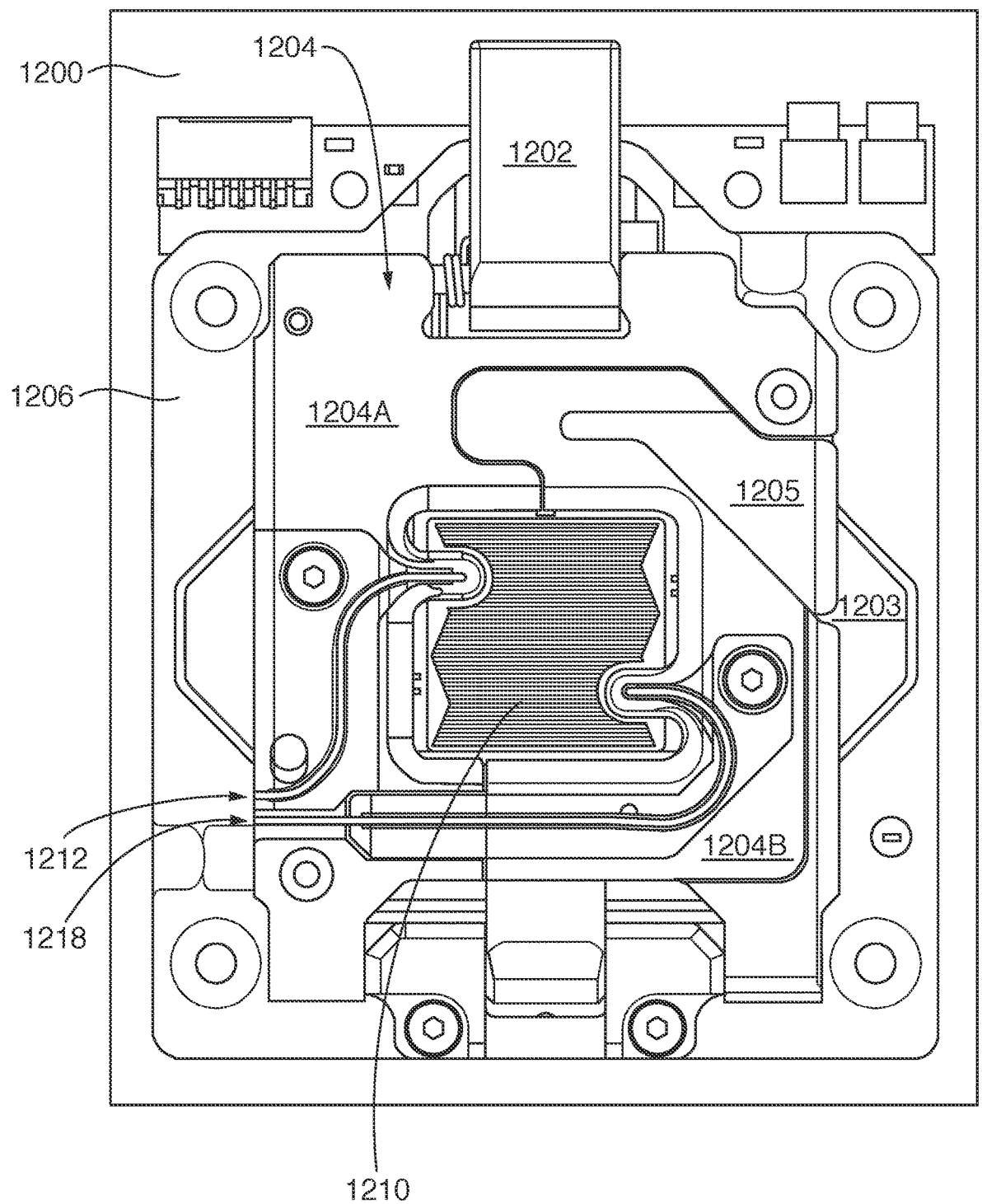
FIG. 27 illustrates some embodiments of a split lid for the systems used for operating the microfluidic device.

As shown in FIG. 27, the systems for operating a microfluidic device in these embodiments contain a support 1200 substantially similar to support 100, a socket 1206 substantially similar to socket 106, first fluidic input/output line 1212 substantially similar to first fluidic input/output line 112, and second fluidic input/output line 1218 substantially similar to second fluidic input/output line 118. In certain embodiments, the socket 1206 comprises a surface 1203 configured to support the microfluidic device 1210 and a lid 1204 configured to secure the microfluidic device 1210 within the socket 1206. The surface 1203 of the socket 1206 can include a region which is substantially flat that interfaces with a corresponding substantially flat bottom surface of the microfluidic device 1210. The resulting interface can operatively couple the microfluidic device 1210 with the socket 1206 and, for example, thereby establish functional interconnections, such as electrical connections. Alternatively, or in addition, the socket 1206 can include features (e.g., pins, recesses) that extend out from or into the surface 1203. These features can interface with the microfluidic device 1210 to control the position of the microfluidic device 1210 within the socket 1206 and/or to operatively couple the microfluidic device 1210 with the socket 1206 and, for example, thereby establish functional interconnections, such as electrical connections. The lid 1204 can interface with a top surface of the microfluidic device 1210. The resulting interface can operatively couple the microfluidic device 12 with one or both of the first and second fluidic input/output lines 1212, 1218. In certain embodiments, the lid 1204 can be connected to the surface 1203, for example, by a hinge or the like. In certain related embodiments, the lid 1204 can include a latch (or other securing mechanism, such as a screw, pin, clamp, or the like) configured to hold the lid 1204 in a closed position. Thus, the latch can facilitate the formation of an interface between the lid 1204 and the top surface of the microfluidic device 1210.

One or both of the first and second input/output lines 1212, 1218 can be connected at one end to a pump and at the other end to a fluid port (not shown) comprised by the lid 1204. The fluid port can interface with both the end of a fluid line and an inlet/outlet of the microfluidic device 1210, thereby forming a fluidic connection between the fluid line and the inlet/outlet. Alternatively, or in addition, one of the first or second fluidic input/output lines 1212, 1218 can be connected at one end to a fluid port and at the other end to a container, such as a waste container or a container for holding a sample (e.g., a sample to be imported into the microfluidic device 1210 or a sample that has been exported from the microfluidic device 1210). The fluid ports optionally contain a seal, compression fitting, or the like for ensuring a leak resistant connection between its respective fluid line and the microfluidic device.

Figure 28:
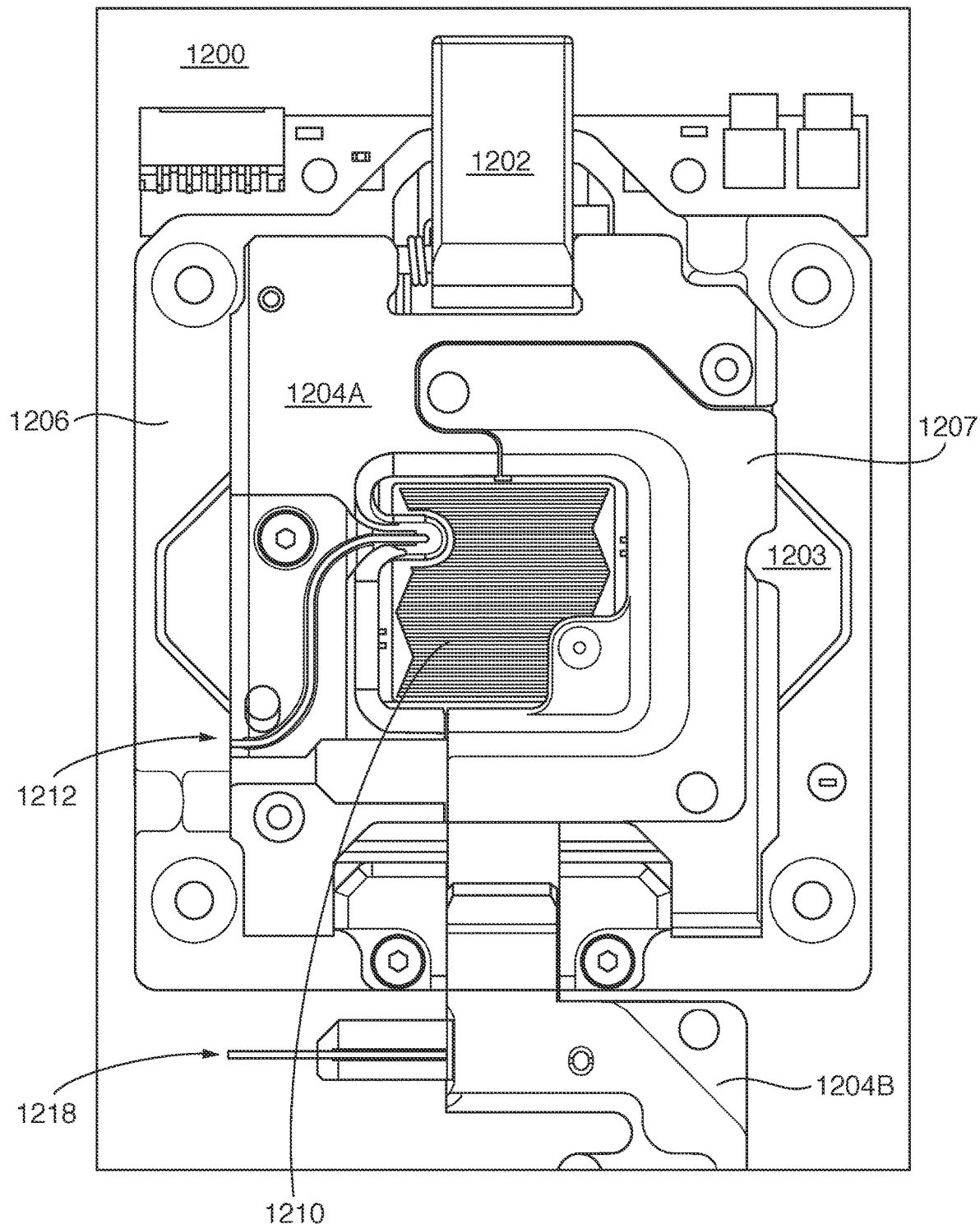
FIG. 28 illustrates other embodiments of a split lid for the systems used for operating the microfluidic device.
Figure 29:
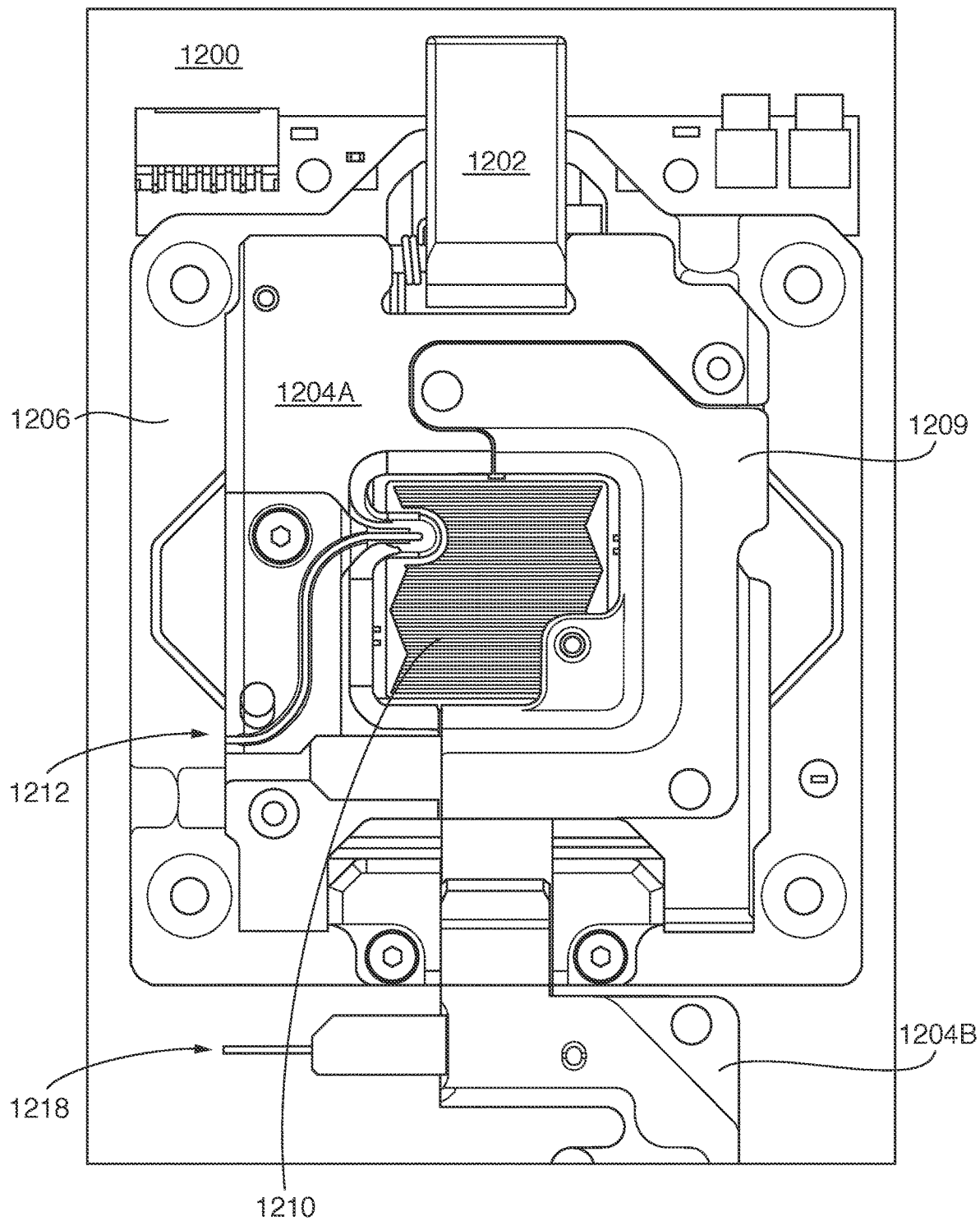
FIG. 29 illustrates yet other embodiments of a split lid for the systems used for operating the microfluidic device.

In some embodiments, the lid 1204 comprises two portions: a first portion 1204A and a second portion 1204B. As shown in FIG. 27, the second portion 1204B of the lid can be separated from the first portion 1204A. This allows the second portion 1204B to be moved from the position shown in FIG. 27 (a closed position) to an open position that allows access to an inlet/outlet on the microfluidic device (e.g., an inlet/outlet located on the upper surface of the microfluidic device 1210). One example of an open position for the second portion 1204B of the lid is shown in FIGS. 28 and 29. The second portion 1204B can be moved to any number of open positions away from the microfluidic device 1210, not just the position shown in FIGS. 28 and 29. When the second portion 1204B is in an open position, the first portion 1204A of the lid remains in place, retaining the microfluidic device 1210 on the surface of the support 1200 even though the second portion 1204B is moved. The first fluidic input/output line 1212 may be connected to a fluid port on the first portion of the lid 1204A, and therefore remain in place (e.g., maintain a fluidic connection between the first fluidic input/output line 1212 and a corresponding inlet/outlet of the microfluidic device 1210) while the second portion 1204B of the lid is in an open position. The second fluidic input/ output line 1218, which may be connected to a fluid port on the second portion 1204B of the lid, moves along with the second portion 1204B, thereby decoupling the fluidic connection between the second fluidic input/output line 1218 and a corresponding inlet/outlet of the microfluidic device 1210.

In certain embodiments, when the second portion 1204B of the lid is in an open position, an insert can be placed into the location previously occupied by the second portion 1204B of the lid in its closed position. In some configurations, the insert can be shaped substantially similar to the second portion 1204B of the lid. In other configurations, thought, the insert can be shaped differently. The insert can serve multiple functions. A first function is to prevent contamination that can potentially result from uncovering an inlet/outlet of the microfluidic device 1210 that is otherwise covered when the second portion 1204B of the lid is in a closed position. In certain embodiments, the insert contains a fluid inlet (such as a well) by which a fluid sample can be introduced directly into the microfluidic device 1210. This fluid inlet of the insert is positioned to interface with the inlet/outlet of the microfluidic device 1210 which interfaces with the fluid port 1222 for the second fluidic input/output line 1218 when the second portion 1204B of the lid is in the closed position. One example of an insert is insert 1207 shown in FIG. 28 which contains a custom fluid well for inserting a fluid sample. Another example of an insert is insert 1209 shown in FIG. 29 which contains a fluid well that has not been customized. As can be seen, the fluid well of insert 1207 is larger than the fluid well of insert 1209 and includes a funnel-shaped design. Regardless of its exact shape, the fluid well can be configured to hold a fluid sample of about 50 microliters or less (e.g., about 45 microliters, about 40 microliters, about 35 microliters, about 30 microliters, about 25 microliters, about 20 microliters, about 15 microliters, about 10 microliters, about 5 microliters, or any range formed by two of the foregoing endpoints, such as about 5 microliters to about 25 microliters).

Figure 30A:
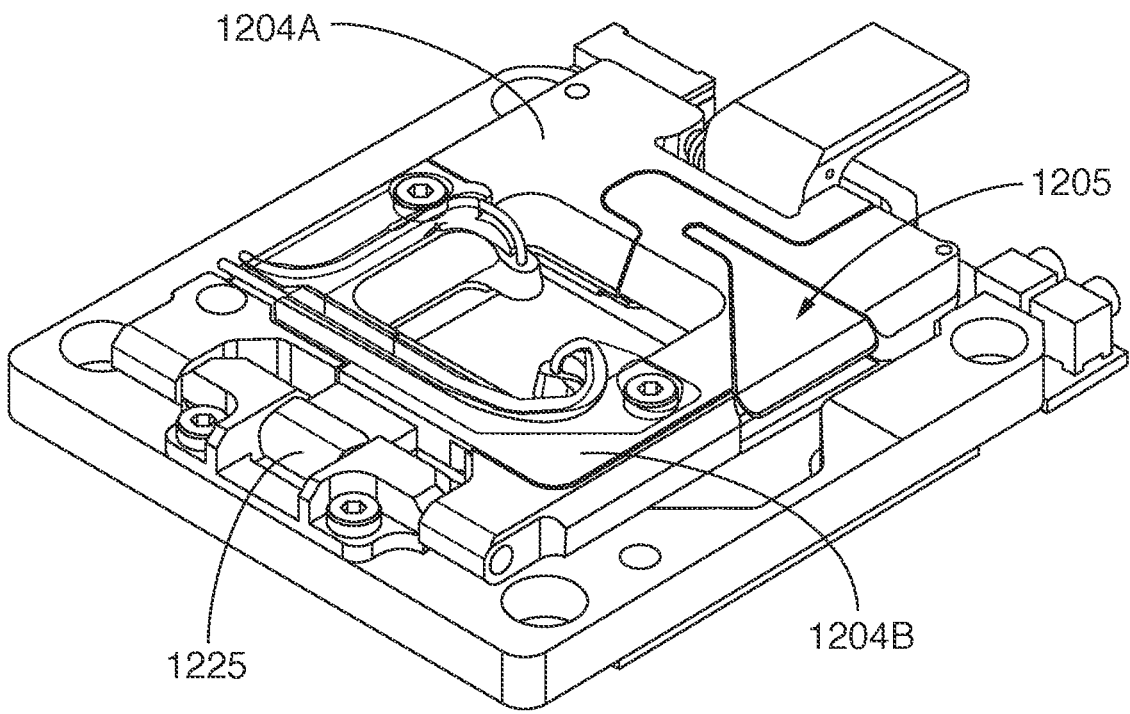
FIGS. 30A, 30B, and 30C illustrate some embodiments of removing part of a split lid in the systems used for operating the microfluidic device.
Figure 30B:
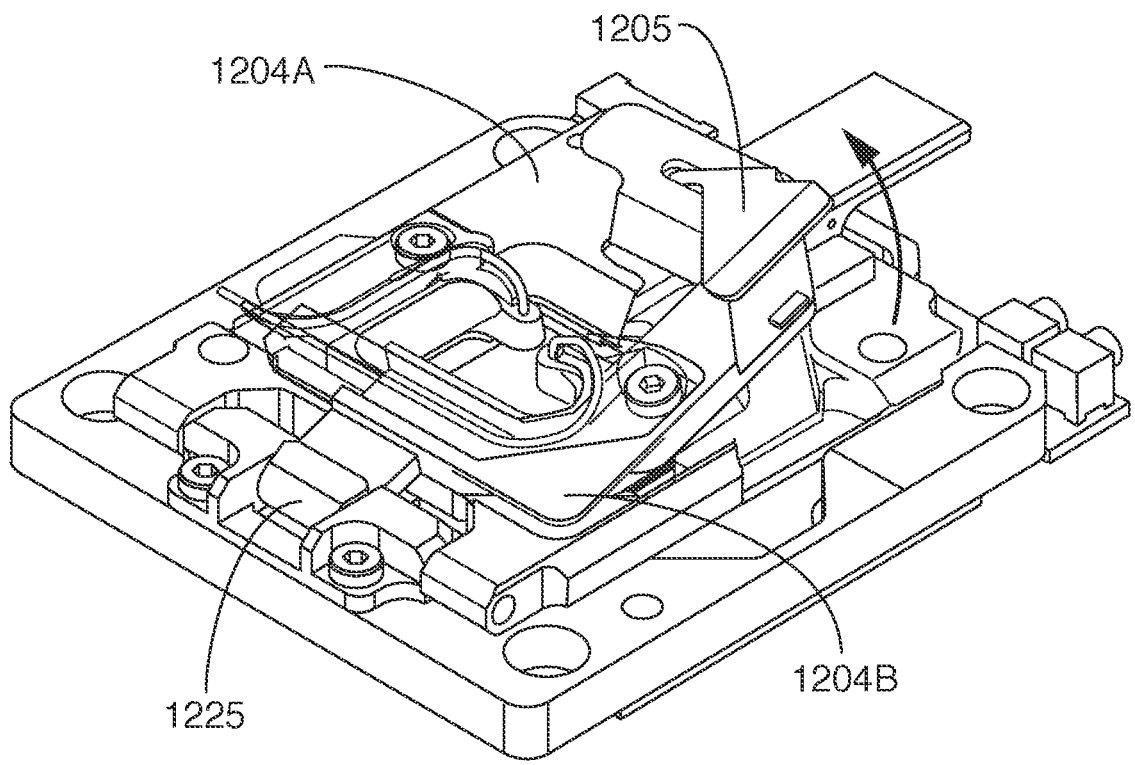
Figure 30C:
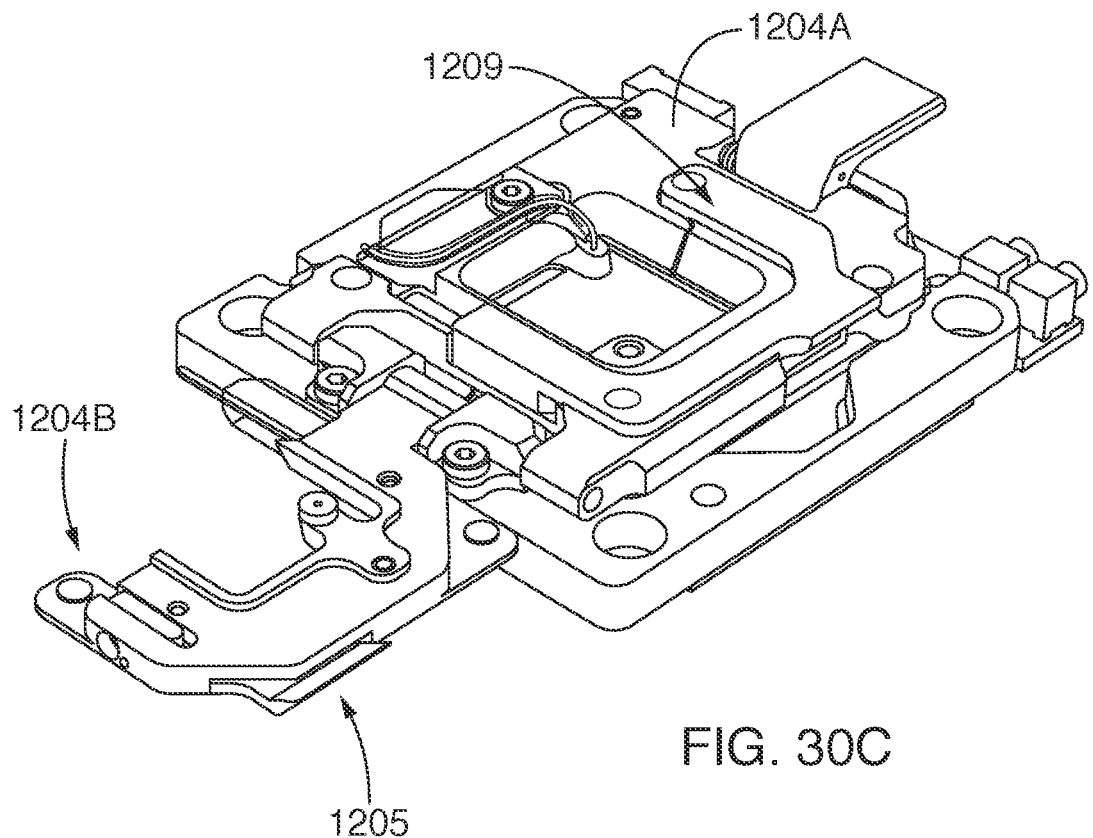

In some configurations, the second portion 1204B of the lid can be moved using the process shown in FIGS. 30A-30C. In these embodiments, the second portion 1204B of the lid contains a latch 1205 and a hinge 1225, which can be configured as shown in FIG. 30A. The latch 1205 is configured to releasably hold the second portion 1204B of the lid in the closed position. The latch 1205 can be pulled up as shown by the arrow in FIG. 30B. This action releases the second portion 1204B of the lid from its closed position covering the microfluidic device 1210. Of course, the latch 1205 and its actuation can have any other number of configurations, and securing mechanisms other than a latch, such as a clamp, friction lock, screw, magnet, or the like, can replace latch 1205. Once the second portion 1204B of the lid has been released from its position over the microfluidic device 1210, it can be moved to any desired position by rotating it around the hinge 1225, including the position shown in FIG. 30C. The position shown in FIG. 30C is rotated about 180° from the closed position, but any degree of rotation that uncovers a portion of the top surface of the microfluidic device 1210 and allow access to the second fluid inlet/outlet of the microfluidic device 1210 will suffice. For example, the second portion 1204B of the lid can be rotated at least about 60°, about 75°, about 90°, about 105°, about 120°, about 135°, about 150°, or more to achieve an open position for the section portion 1204B. An insert, such as insert 1209, can be placed in the location where the second portion 1204B of the lid was previously located, as shown in FIG. 30C.

The insert, including insert 1207 or 1209, can be configured to operatively couple with the socket 1206 and/or microfluidic device 1210 such that flow of fluidic medium into the second fluid inlet/outlet of the microfluidic device can be reliably achieved. The insert can be configured, for example, to interface with the first portion 1204B of the lid. The insert will typically contain features that are useful in (i) securing and/or removing the insert from the socket 1206 and/or the microfluidic device 1210, and/or (ii) aligning the insert with the microfluidic device 1210. One such feature is a retention mechanism 1215 (shown in FIG. 31B) which helps retain the second portion 1204B of the lid in place. In some configurations, the retention mechanism contains one or more magnets oriented to form an attractive interaction with one or more corresponding magnets in a matching location on the first portion 1204A of the lid and/or on a surface of the microfluidic device 1210. A single magnet which interfaces with a corresponding magnet (not shown) on the first portion 1204A of the lid is shown in FIG. 31B Another possible feature of the insert is an alignment feature that helps align the insert to the correct position over the microfluidic device so that the second fluid input/output line of the microfluidic device 1210 is operably connected with the fluid inlet of the insert. This alignment feature can include, for example, one or more pins 1217 that fit within matching holes 1213 in the underside, and optionally extending through, the insert. Instead of pins, though, registration features could be used for this alignment function. Similar retention and/or alignment features can facilitate proper positioning and/or alignment of the second portion 1204B of the lid with the first portion 1204A of the lid, as shown in 31B (including corresponding retention mechanisms 1216 (e.g., magnets) and alignment features 1214 (e.g., holes that fit pins 1217)) and elsewhere herein.

Figure 31A:
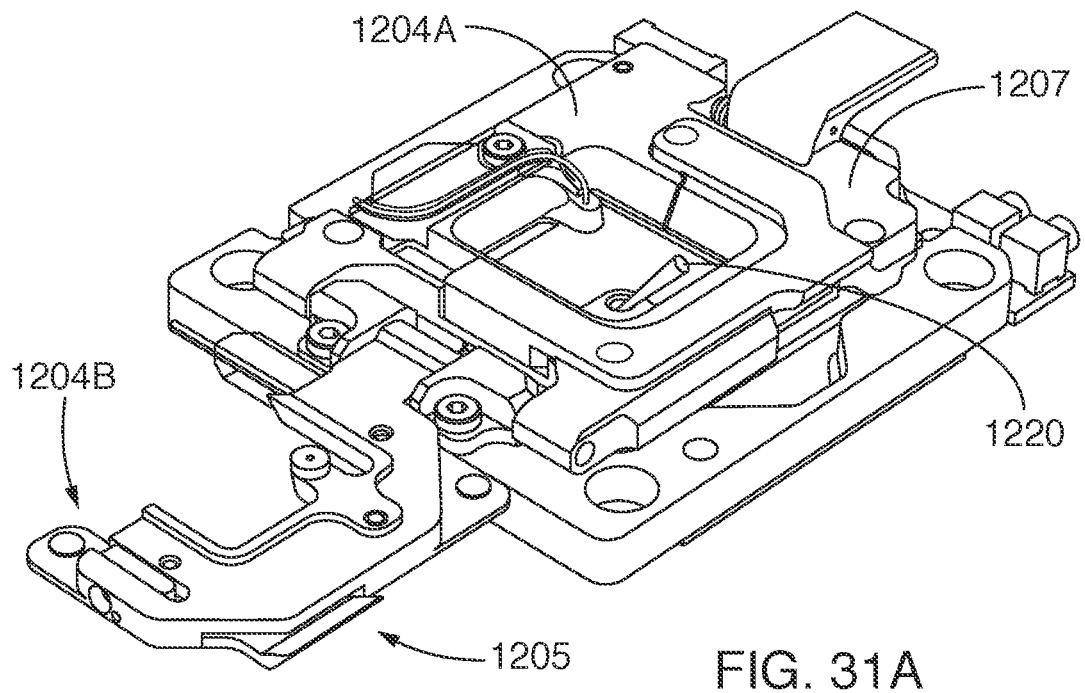
FIGS. 31A, 31B, and 31C illustrate some embodiments of methods for adding a fluid sample to the microfluidic device.
Figure 31B:
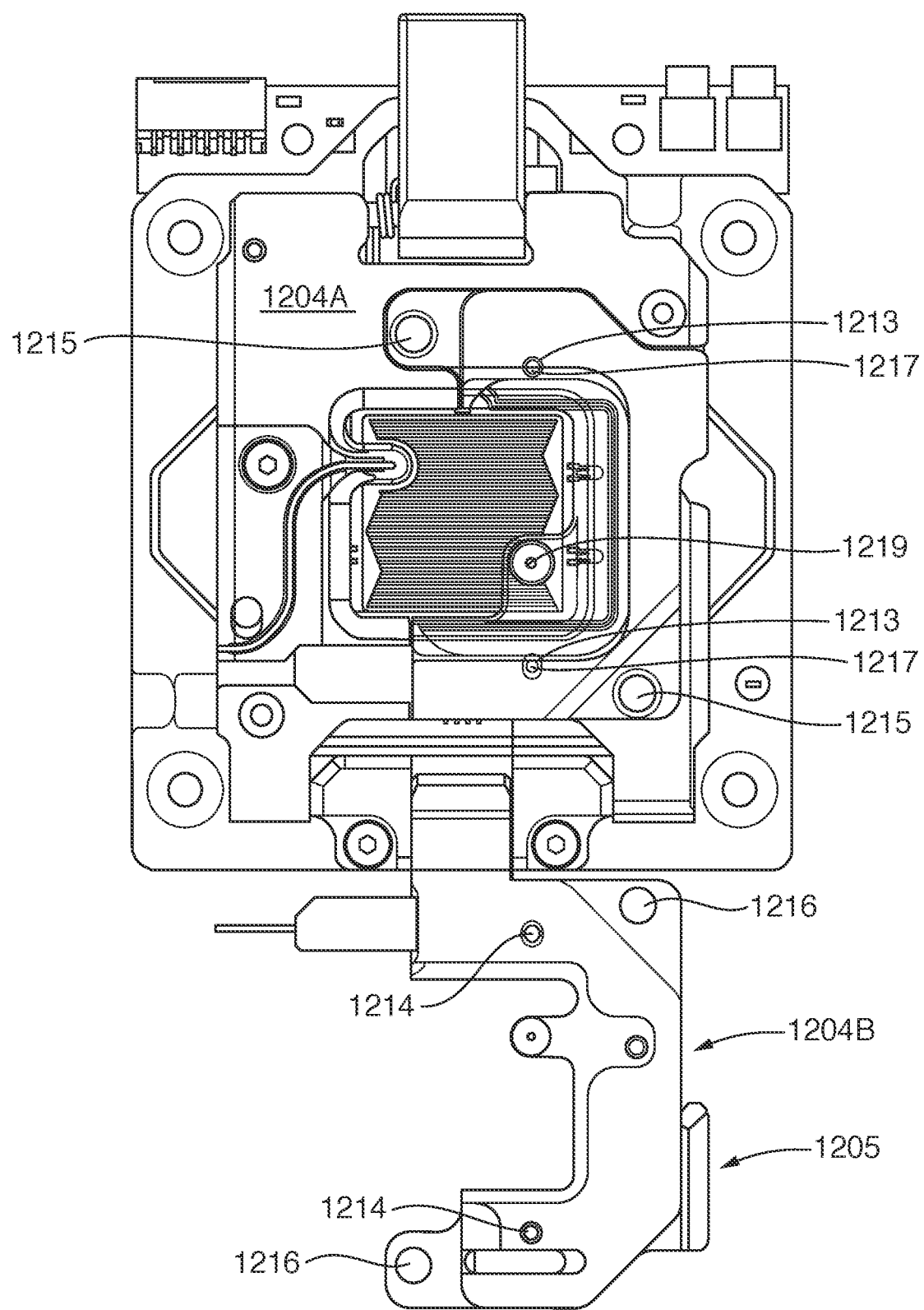
Figure 31C:
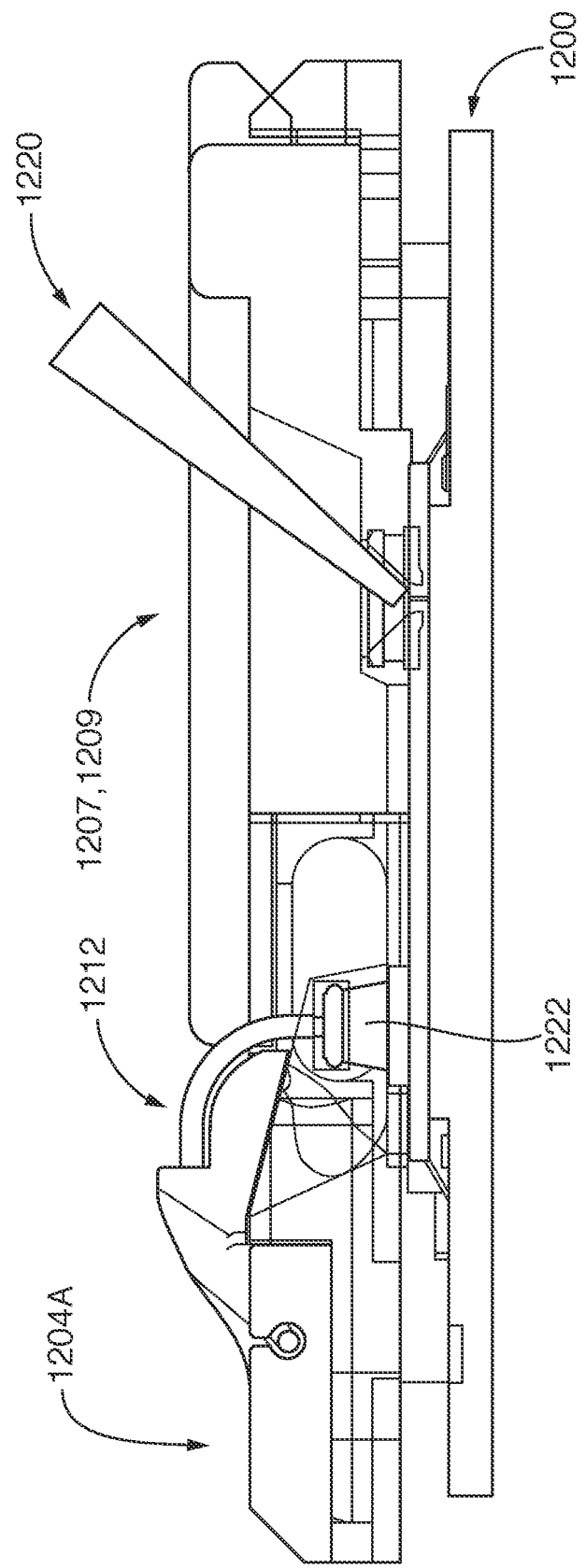

With the insert in place, such as insert 1207 shown in FIG. 31A, a small fluid sample can be introduced into the microfluidic device 1210 for analysis. In some configurations, this small fluid sample can be introduced manually, e.g., using a pipette/micropipette 1220, as shown in FIG. 31C. In alternative embodiments, the small fluid sample can be introduced robotically, e.g., using a pipette/micropipette 1220. The small fluid sample can be introduced into the microfluidic device 1210 using a fluid inlet, such as well 1219 shown in FIG. 31B. In these configurations, the first input/output fluid line 1212 remains interfaced with the fluid port of the first portion 1204A of the lid and fluidically connected to the inlet/outlet of the microfluidic device 1210. Since the first input/output fluid line 1212 also remains connected to a pump, the first input/output fluid line 1212 can ensure that the pump can pull (using suction or other force) at least a portion of the fluid sample from the fluid inlet (e.g., well 1219) of the insert into and through the microfluidic device 1210. This action maintains the desired rate of fluid flow in the microfluidic device and allows all or a portion of the fluid sample to be analyzed by the microfluidic device 1210. The suction (or other force) can be sufficient to pull a preselected volume of sample fluid into the microfluidic device 1210. The preselected volume can be, for example, equivalent to the flow volume within the microfluidic device+/− about 100%, where the flow volume is the volume of the microfluidic device that experiences flow when media is flowing through the microfluidic device (i.e., the swept regions, as described in U.S. Pat. No. 10,010,882). In certain embodiments, the preselected volume can be about 1 microliter to about 25 microliters (e.g., about 1.5 microliters to about 20 microliters, about 2 microliters to about 15 microliters, about 2.5 microliters to about 10 microliters, about 3 microliters to about 7 microliters, or any range defined by two of the foregoing endpoints) of fluid sample, after which the suction is stopped.

In some embodiments, it can be helpful to know whether the second portion of the split lid is in place, whether the insert 1207 is in place, or whether neither the second portion of the split lid nor the insert is in place over the microfluidic device. In these embodiments, the systems can be modified with a sensor to detect whether the second portion of the split lid or the insert is present above the microfluidic device. Some embodiments of this sensor are depicted in FIGS. 36-43.

Figure 36:
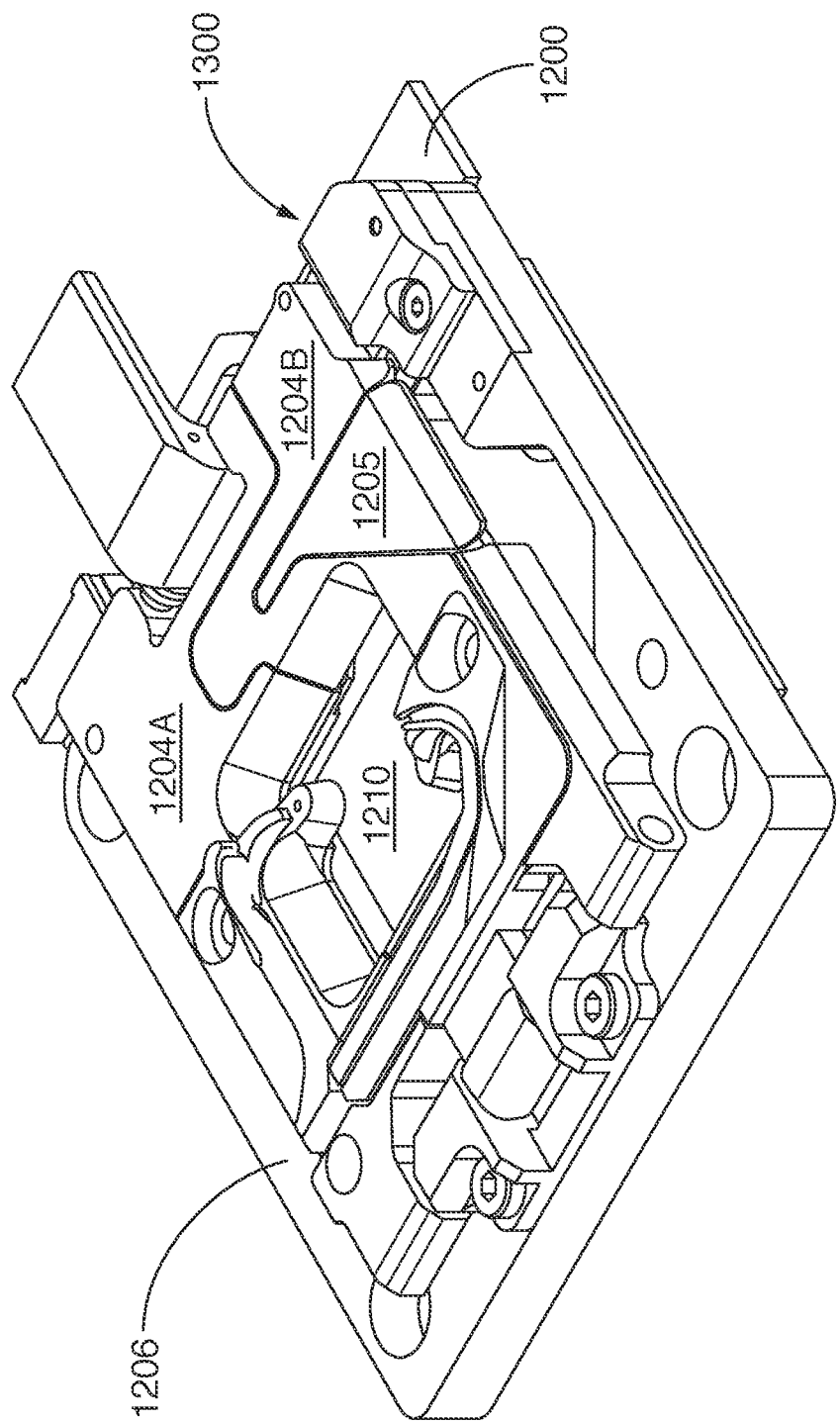
FIG. 36 shows a perspective view of some embodiments of a split lid containing a sensor, with the split lid in a closed position.
Figure 37:
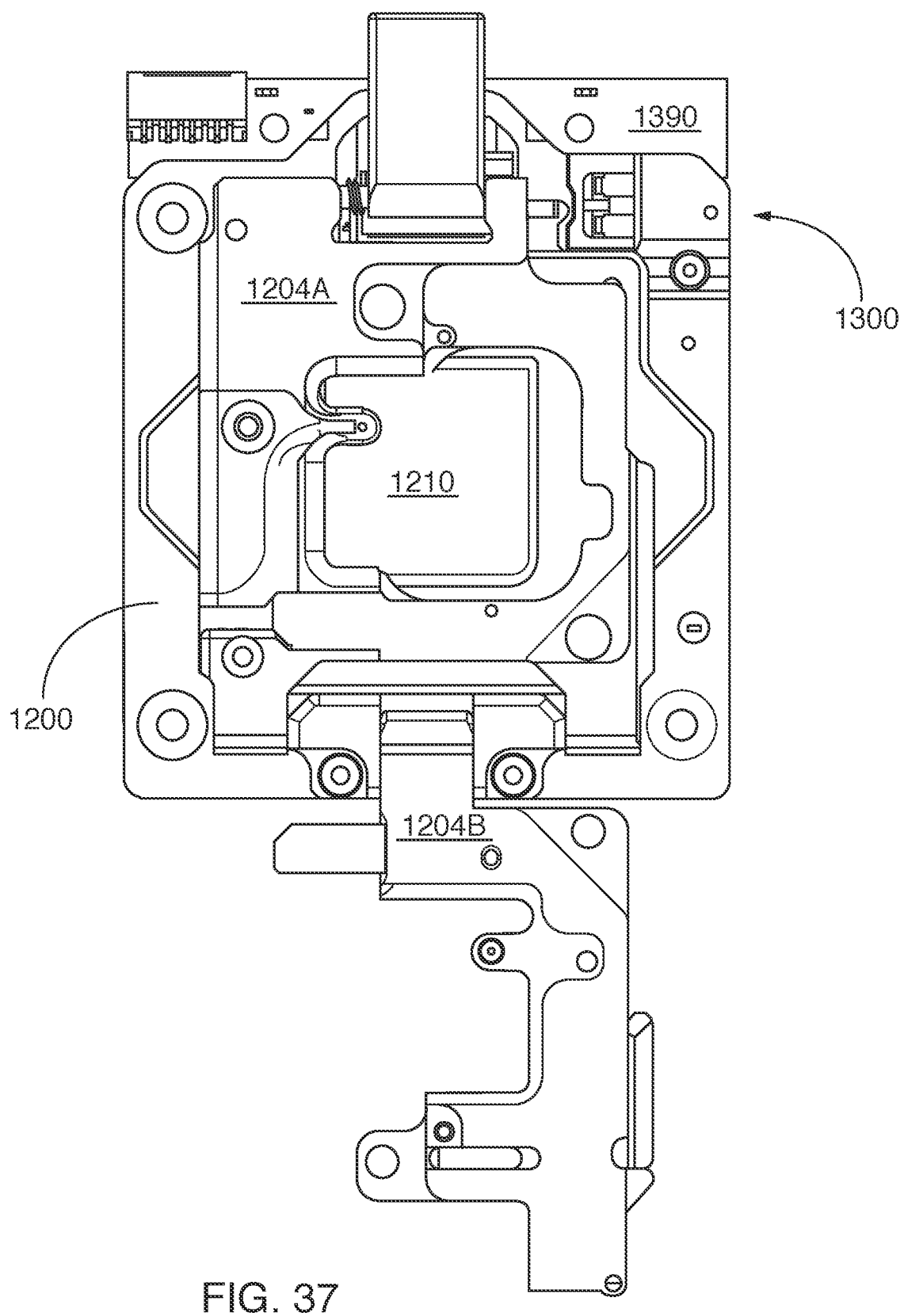
FIG. 37 shows a perspective view of some embodiments of a split lid containing a sensor, with the split lid in an open position.

As shown in FIG. 36, the systems for operating the microfluidic device 1210 can include a support 1200, a socket 1206 containing a base 1201 and a split lid 1204 with a first portion 1204A and a second portion 1204B, and a sensor 1300. The second portion 1204B of the split lid can include a latch 1205, as shown in FIG. 36, and can be moveable to an open position, as shown in FIG. 37. The lid 1204 can further include attachment features 2015 (e.g., magnets) and/or alignment features 2017 (e.g., pins) that facilitate attachment and alignment of the second portion 1204B of the lid with the first portion 1204A of the lid. The microfluidic device 1210 and the base 1201 of the socket 1206 can be located on a support 1200, which can include a substrate 1390, such as a printed circuit board (PCB).

Figure 38:
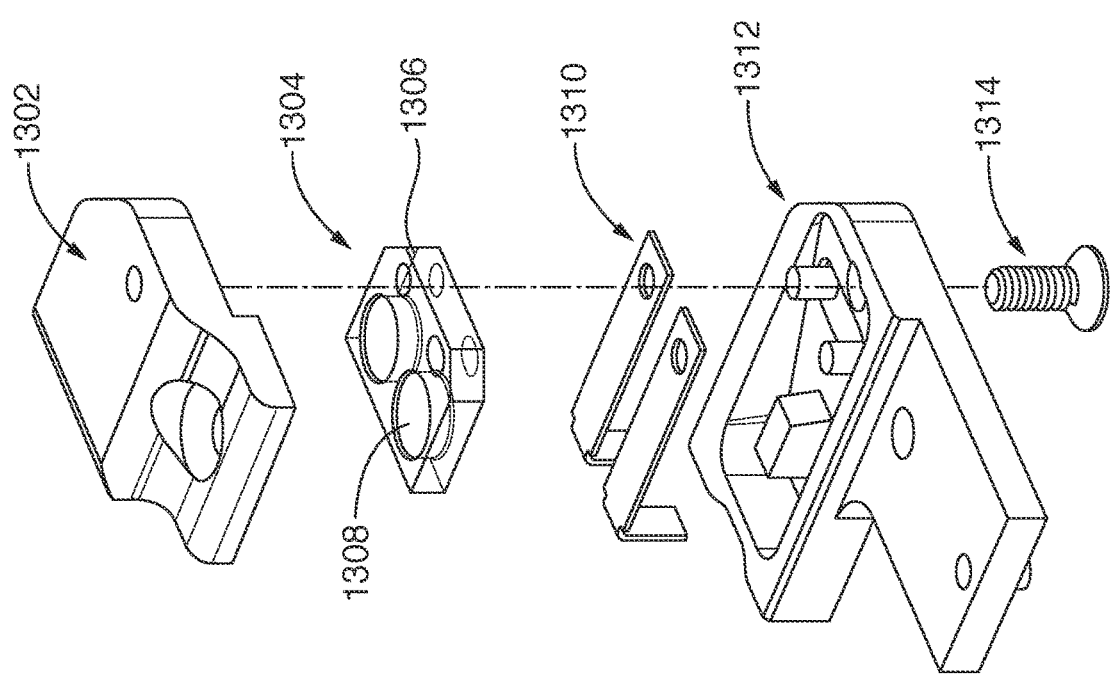
FIG. 38 shows some embodiments of the un-assembled components of the sensor that can used with the split lid.

An exemplary sensor 1300 is depicted in FIG. 38. The sensor 1300 can include a sensor cover 1302, a magnetic assembly 1304, extenders 1310, a housing 1312, and a connector 1314. The sensor cover 1302 operates to protect and insulate some of the components of the sensor 1300. The magnetic assembly 1304 can contain one, two, or more magnets 1308 that are located within a first housing 1306. The magnets 1308 can be used in the process of sensing the presence of the lid or insert. The first housing 1306 insulates and protects the magnets 1308. In certain embodiments, the first housing 1306 includes a bottom portion which includes one or more openings to allow each magnet 1308 to contact an upper surface of an extender 1310. In certain embodiments, the first housing can interface with a second housing 1312 via a fastening mechanism, such as openings in the first housing 1306 that made with posts in the second housing 1310, bolts, clamps, glue, or the like, and any combination thereof. A first end of each extender 1310 is configured to be attached to the second housing 1312, such as via openings that fit over posts in the second housing 1312 (as shown in FIG. 38), bolts, or the like. A second, opposing end of each extender is configured to controllably extend downward through an opening in the bottom of the housing 1312. The various components of the sensor 1300 can be attached together using the connector 1314 (e.g., a screw, as shown).

Figure 39:
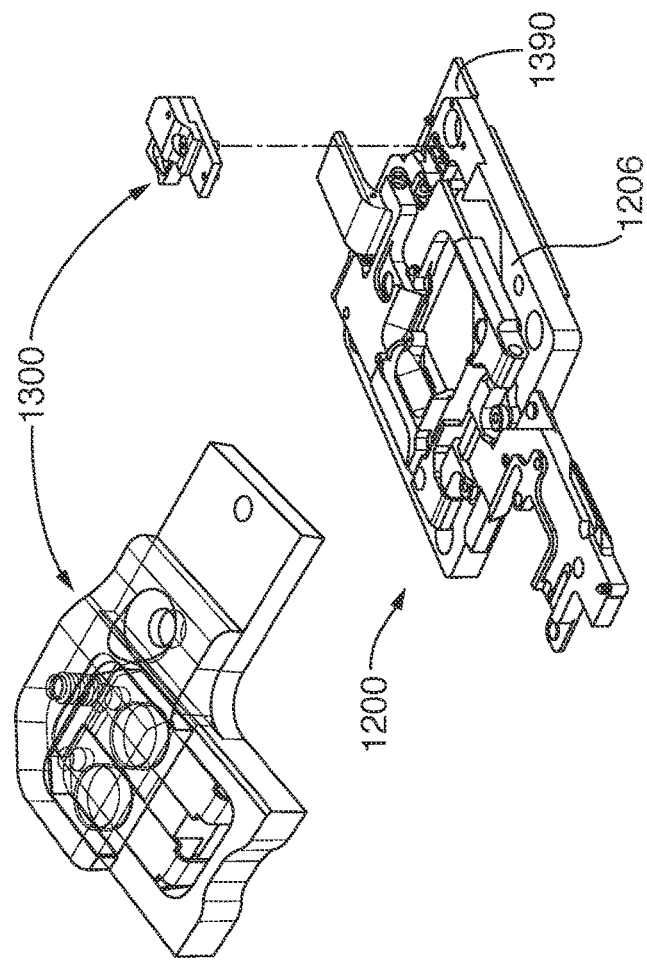
FIG. 39 shows some embodiments of the assembled components of the sensor that can used with the split lid.

The various components of the sensor are shown assembled in FIG. 39. The sensor cover 1302 is transparent so the rest of the components can be visualized. FIG. 39 also shows how the sensor 1300 can be attached to the socket 1206, e.g., at a peripheral or corner position.

Figure 40:
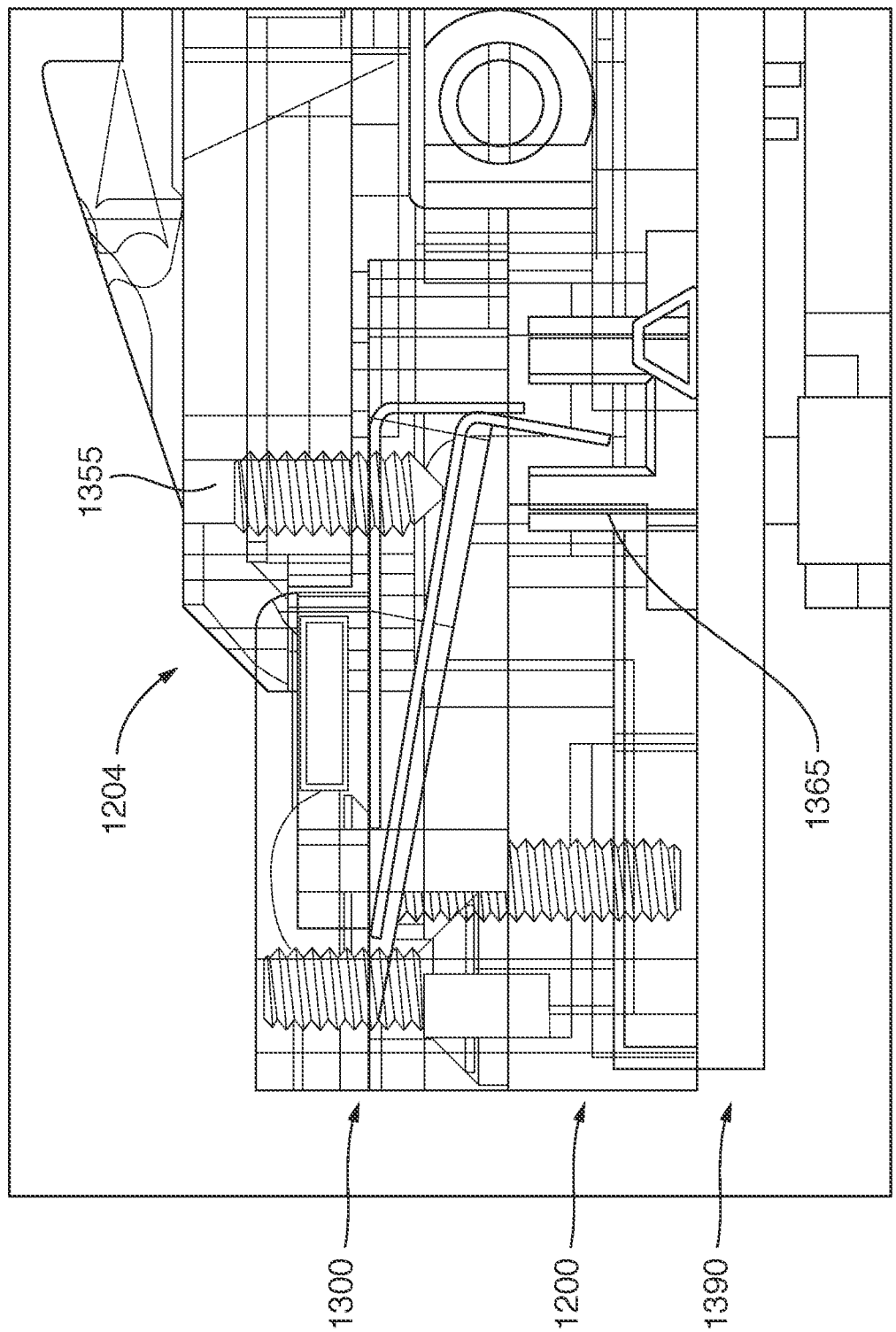
FIG. 40 shows a side view of some embodiments of a split lid containing a sensor, with the split lid in a closed position.

A side view of the sensor 1300 attached to the base 1201 of the socket 1206 and in operation can be seen in FIG. 40. This figure shows the split cover 1204 attached to the base 1201 of the socket 1206, which rests on the substrate 1390 comprised by the support 1200. As shown in FIG. 40, the sensor 1300 is located at the interface between an edge of the split lid 1204 and the base 1201. The second portion 1204B of the split lid 1204 has been equipped with an actuator 1355 (such as a screw, pin, or the like) that contacts one of the extenders 1310 and forces that extender 1310 downward when the second portion 1204B is in the closed position.

Figure 41:
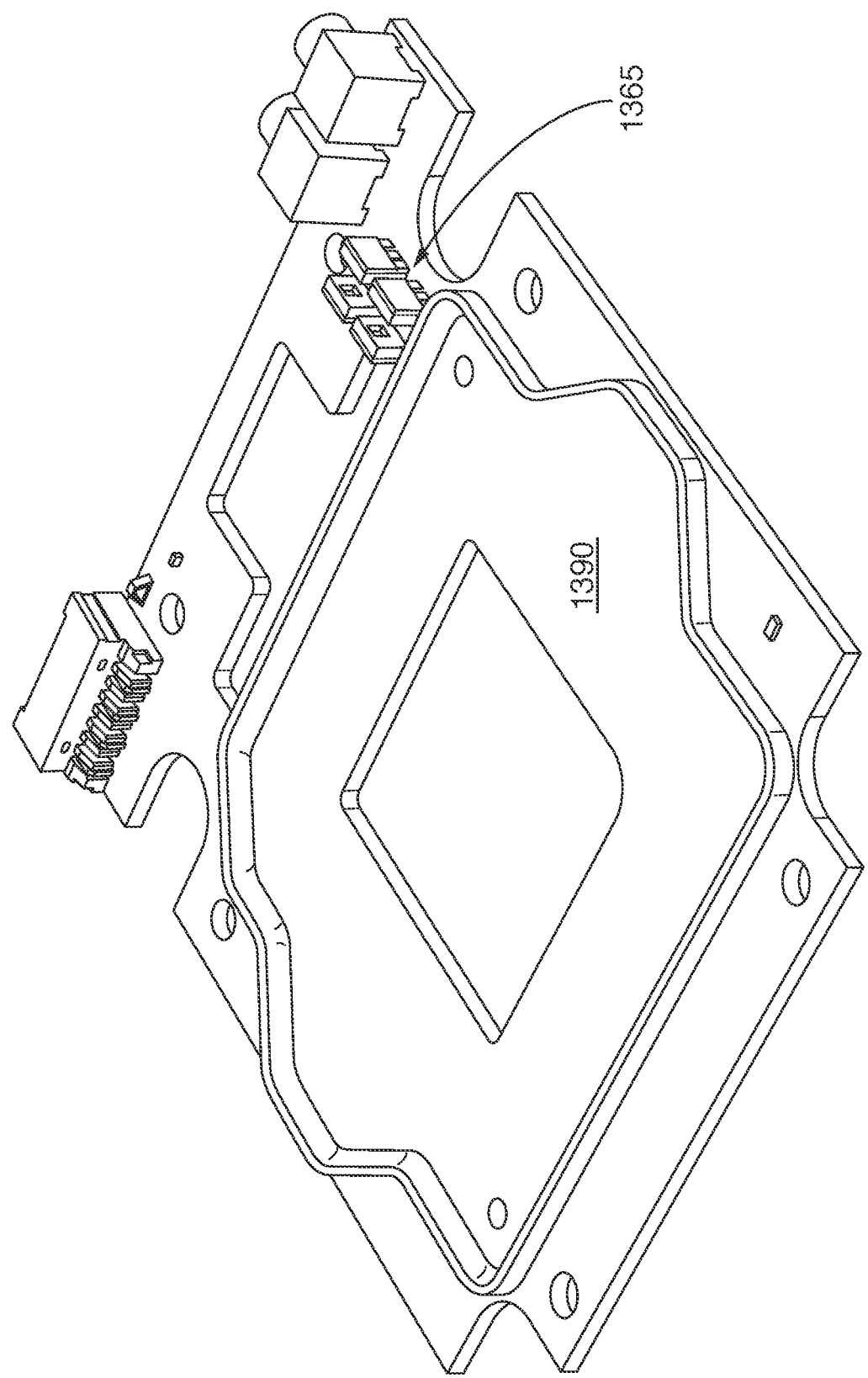
FIG. 41 shows a perspective view of some embodiments of an optical switch that can be used in the sensor.

As shown in the bottom of FIG. 40, the end of the extender 1310 is forced downward so that it interrupts an optical switch by preventing light from a first element of the optical switch (e.g., an LED) from reaching a second element of the optical switch (e.g., a phototransistor). The optical switches 1365 are depicted in FIG. 41 without the rest of the system except for the substrate 1390 on which the optical switches 1365 are located. There are two optical switches 1365 depicted in FIG. 41, corresponding to the two extenders 1310 shown in FIG. 38. Depending upon the desired functionality of the sensor, however, the sensor can include a single optical switch 1365 and a single extender 1310, or three or more optical switches 1365 and corresponding extenders 1310. The optical switches can be connected to an electrical circuit that is part of the electrical signal generation subsystem of the support 1200. Each optical switch 1365 is positioned underneath a single extender 1310. When the respective extender 1310 is forced downward, it interrupts the optical signal of the optical switch 1365 and signals the presence of an actuator 1355.

Figure 43:
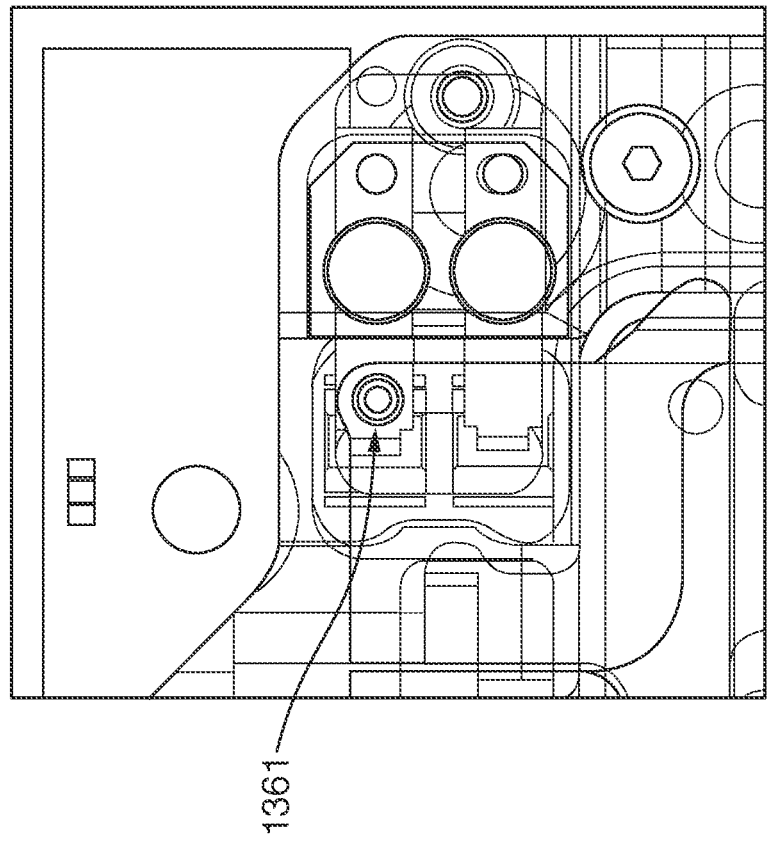
FIGS. 42 and 43 show top views of some embodiments of the sensor in actuated positions.
Figure 42:
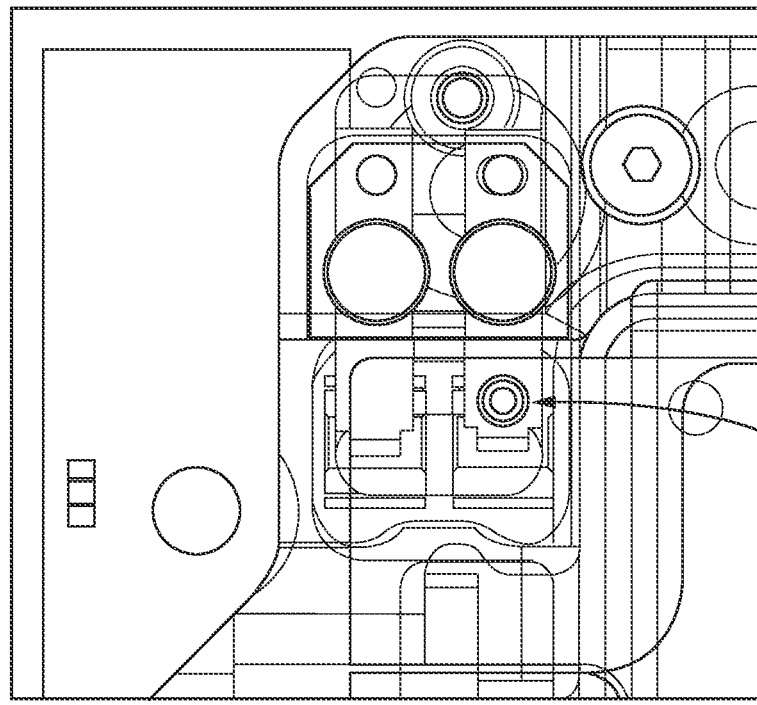

As shown in FIGS. 42 and 43, the split cover 1204 and the insert 1207, 1209 can each be configured to contain an actuator, but in a different position. The split cover 1204 can be configured with an actuator in a first position 1361 so that is located above a first of the extenders 1310. The insert 1207 can be configured with an actuator in a second position 1362 so that is located above a second of the extenders 1310. Of course, the actual position of the actuators can be changed as long as it is known which position is associates with the split cover 1204 and which position is associated with the insert 1207. Similar configurations of optical switches and extenders could be used to also determine whether insert 1207 or insert 1209 is located over the microfluidic device.

With the sensor 1300 present, the system can detect the presence of the movable portion of the split cover, the insert, or even when neither is present. When the second portion 1204B of the split cover 1204 is located over the microfluidic device 1210, the actuator in the movable portion 1204B can be located, for example, in first position 1361 and can force down the underlying extender 1310 in the optical sensor 1365 and interrupt the signal between the associated optical switch. When the insert 1207, 1209 is located over the microfluidic device 1210, the actuator in the insert can be located, for example, in second position 1362 and can force down the underlying extender 1310 in the optical sensor 1365 and interrupt the signal between the associated optical switch. When neither the second portion 1204B of the split cover or the insert is present, neither extender 1310 is forced down and the signal between neither optical switch is disturbed. The magnets 1308 hold the extenders 1310 in an up position (i.e., one that does not interrupt the associated optical switch. Without the magnets, the extenders would be in a down position, interrupting the optical switch. The magnetic force from the magnets is strong enough to hold the extenders in this up position when the split lid is open and no insert is present, but weak enough to be overcome by the actuators on the lid and insert. Thus, the extenders 1310 can be made from any magnetic material that will function with the magnets 1308 in this manner.

Other types of sensing and interrupt mechanisms can be used to indicate the presence of the second portion of the split cover or the insert. Example of these sensing and interrupt mechanisms include a magnetic proximity switch, a mechanical switch, a conductive contact switch, or the like.

These embodiments allow small fluid samples to be directly introduced into the microfluidic device 1210 without being diluted or becoming dispersed. Samples that contain a small number of precious cells (e.g., 200,000 or less) typically have a small volume (e.g., 200 microliters, 150 microliters, 100 microliters, 50 microliters, or less) can be introduced in these embodiments. Such fluid samples typically can't be analyzed and/or recovered using conventional techniques, such as a fluorescence-activated cell sorter or microfluidic chips that use only flow to sort cells, without significant loss of materials.

EXAMPLES

Example 1: Sample Import into a Microfluidic Chip Using a Split Lid

Plasma cells were isolated from mice and loaded into OptoSelect™ chips (Berkeley Lights, Inc.) using a Beacon® system (Berkeley Lights, Inc.). To test the impact of well import on cell density and distribution within the channels of the microfluidic chips, plasma cells were loaded into OptoSelect™ 11k and 14k chips using (i) a small volume import method on a Beacon® system having a standard nest lid, (ii) a small volume import method on a Beacon® system having a split lid nest, or (iii) the well import method on a Beacon® system having a split lid nest in the open configuration and an insert having a well fluidically connected to an inlet/outlet of the microfluidic chip. The small volume import method involved pulling a discrete, approximately 5 microliter cell sample into the microfluidic chip. The cell sample was followed by a 7.5 microliter air bubble within the fluid line leading to the inlet of the microfluidic device, to limit dilution and dispersion of the cells in the sample. In contrast, the well import method involved manually pipetting an approximately 3.5 microliter cell sample into the well of the insert in the split lit (open configuration) and pulling the cell sample into the microfluidic chip using negative pressure. Following loading, fluid flow was stopped, cells were counted in each channel of the microfluidic chips, and the import density and coefficient of variation (CV) was determined under each of the conditions.

Figure 44:
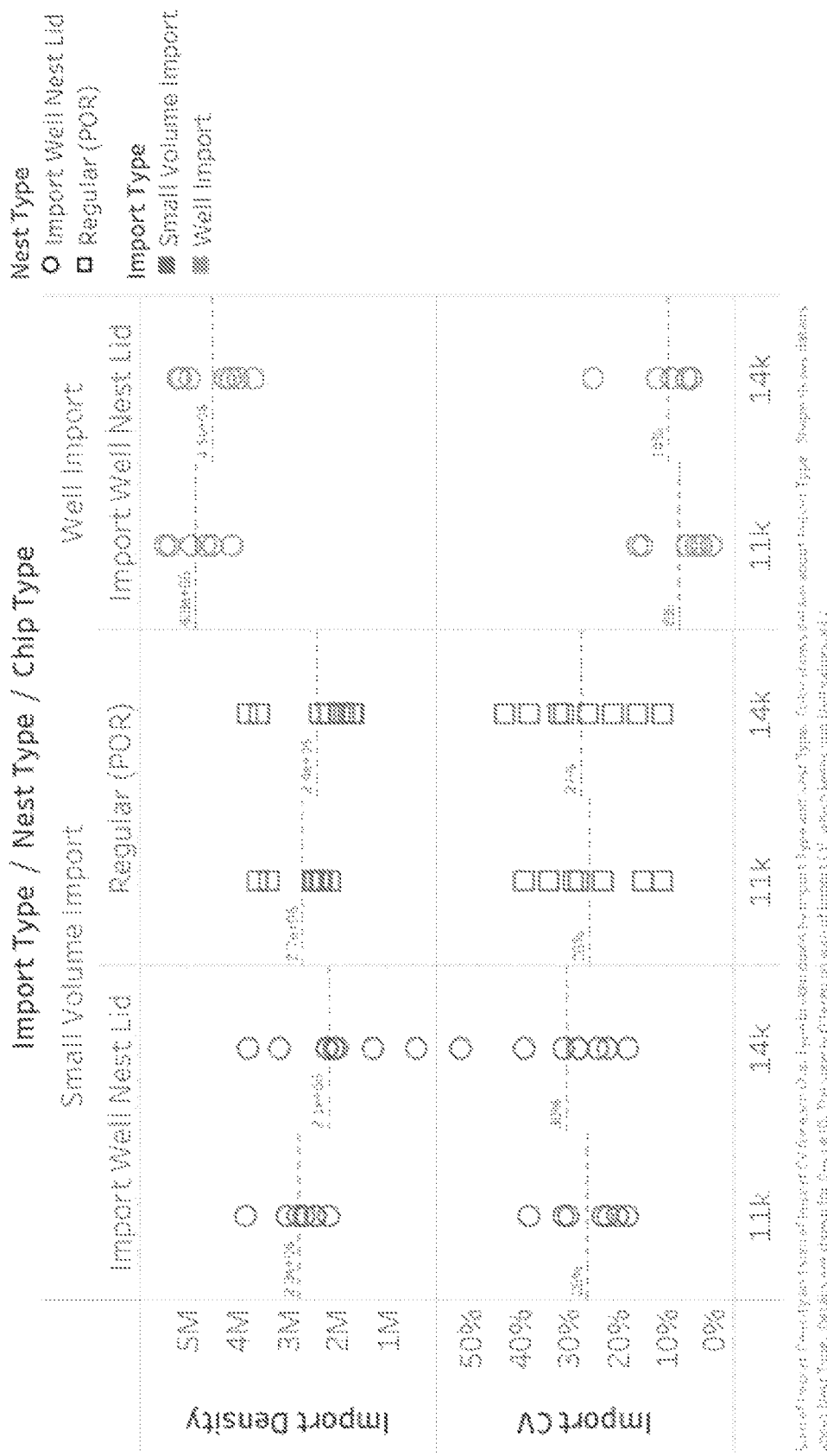
FIG. 44 shows cell/bead distributions in the microfluidic devices in some exemplary embodiments.

As shown in FIG. 44, the well import method resulted in higher average import density in both the OptoSelect™ 11k and 14 chips—$4.8 \times 10^6$ and $4.5 \times 10^6$, respectively—as compared to the small volume import method, which resulted in average import densities of $2.8 \times 10^6$ and $2.1 \times 10^6$, respectively, on the Beacon® system having a split lid nest in the closed position and $2.7 \times 10^6$ and $2.4 \times 10^6$, respectively, on the Beacon® system with the standard lid nest. In addition, the average CV for both the OptoSelect™ 11k and 14 chips was dramatically lower for well import—8% and 10%, respectively—as compared to the small volume import method, which resulted in average CVs of 26% and 30%, respectively, on the Beacon® system having a split lid nest in the closed position and 26% and 27%, respectively, on the Beacon® system with the standard lid nest.

The well import method with the split lid nest thus produced a surprising improvement in cell loading. Similar results as those shown in FIG. 44 would be expected for any of the system/microscope embodiments disclosed herein having a split lid nest.

Although particular embodiments of the disclosed systems have been shown and described herein, it will be understood by those skilled in the art that they are not intended to limit the present invention, and it will be obvious to those skilled in the art that various changes and modifications may be made (e.g., the dimensions of various parts) without departing from the scope of the disclosed invention, which is to be defined only by the following claims and their equivalents. The specification and drawings are, accordingly, to be regarded in an illustrative rather than restrictive sense.

What is claimed is:

1. A system for operating a microfluidic device, the system comprising:
    a first surface configured to operatively couple with a microfluidic device; and
    a lid configured to retain the microfluidic device on the first surface, the lid comprising:
        a first lid portion located over the microfluidic device and having a first fluid port configured to flow fluidic medium into and/or out of a first fluid inlet/outlet of the microfluidic device; and
        a second lid portion located over the microfluidic device and having a second fluid port configured to flow fluidic medium into and/or out of a second fluid inlet/outlet of the microfluidic device,
        wherein the second lid portion is separable from the first lid portion and movable between a closed position in which the second fluid port of the second lid portion is operatively coupled with the second fluid inlet/outlet of the microfluidic device and an open position in which a portion of the microfluidic device that contains the second fluid inlet/outlet is exposed.

2. The system of claim 1, wherein the first lid portion retains the microfluidic device on the first surface when the second lid portion is in the open position.

3. The system of claim 1, wherein the first fluid port of the first lid portion remains operatively coupled with the first fluid inlet/outlet of the microfluidic device when the second lid portion is in the open position.

4. The system of claim 3, wherein the first fluid port of the first lid portion is connected to a pump configured to remove fluid from the microfluidic device.

5. The system of claim 3, wherein the first lid portion further comprises a first fluid line connected to the first fluid port and wherein the second lid portion further comprises a second fluid line connected to the second fluid port.

6. The system of claim 5, further comprising at least one flow controller operatively coupled with one or both of the first and second fluid lines.

7. The system of claim 6, wherein the at least one flow controller comprises a first thermally-controlled flow controller operatively coupled with the first fluid line and/or the second fluid line, to selectively allow fluid to flow therethrough.

8. The system of claim 1, wherein the lid further comprises a hinge configured to move the second lid portion between the open position and the closed position.

9. The system of claim 1, wherein the lid further comprises a latch configured to releasably hold the second lid portion in the closed position.

10. The system of claim 1, further comprising an insert configured to flow fluidic medium into the second fluid inlet/outlet of the microfluidic device when the second lid portion is in the open position.

11. The system of claim 10, wherein the insert is configured to interface with the first lid portion.

12. The system of claim 10, wherein the insert contains a fluid well configured to fluidically communicate with the second fluid inlet/outlet of the microfluidic device.

13. The system of claim 12, wherein the fluid well is configured to hold a fluid sample of about 25 microliters or less.

14. The system of claim 1, wherein the first surface comprises a support containing a socket configured to receive and interface with the microfluidic device.

15. The system of claim 14, further comprising an electrical signal generation subsystem configured to apply a biasing voltage across a pair of electrodes in the microfluidic device when the microfluidic device is operatively coupled with the support.

16. The system of claim 14, further comprising a thermal control subsystem configured to regulate a temperature of the microfluidic device when the microfluidic device is operatively coupled with the support.

17. The system of claim 14, further comprising a light modulating subsystem configured to emit structured light onto the microfluidic device when the microfluidic device is operatively coupled with the support.

18. The system of claim 17, wherein the first surface, the support, and/or the light modulating subsystem is/are configured to be mounted on a light microscope.

19. The system of claim 17, wherein the first surface, the support, and/or said light modulating subsystem are integral components of a light microscope.

20. A microscope configured for operating a microfluidic device, said microscope comprising:
   the support according to claim 14;
   a light modulating subsystem configured to emit structured light; and
   an optical train,
   wherein when the microfluidic device is held by, and operatively coupled with, the support, the optical train is configured to:
      (1) focus structured light emitted by the light modulating subsystem onto at least a first region of the microfluidic device,
      (2) focus unstructured light emitted by an unstructured light source onto at least a second region of the microfluidic device, and
      (3) capture reflected and/or emitted light from the microfluidic device and direct the captured light to a detector.

21. A method for analyzing a fluid sample, the method comprising:
   connecting a microfluidic device to a system for operating the microfluidic device, wherein the system comprises:
      a first surface configured to operatively couple with a microfluidic device; and
      a lid configured to retain the microfluidic device on the first surface, the lid comprising:
         a first lid portion having a first fluid port configured to flow fluidic medium into and/or out of a first fluid inlet/outlet of the microfluidic device; and
         a second lid portion having a second fluid port configured to flow fluidic medium into and/or out of a second fluid inlet/outlet of the microfluidic device,
         wherein the second lid portion is separable from the first lid portion and movable between a closed position in which the second fluid port of the second portion of the cover is operatively coupled with the second fluid inlet/outlet of the microfluidic device and an open position in which a portion of the microfluidic device that contains the second fluid inlet/outlet is exposed;
   moving the second lid portion from the closed position to the open position, thereby exposing the second fluid inlet/outlet of the microfluidic device;
   providing a fluid sample containing biological micro-objects in fluidic communication with the second fluid inlet/outlet of the microfluidic device;
   applying suction to the first fluid line, thereby pulling at least a portion of the fluid sample into the microfluidic device; and
   processing biological micro-objects in the at least a portion of the fluid sample that is pulled into the microfluidic device.

22. The method of claim 21, further comprising:
   placing an insert in the location previously occupied by the second lid portion in the closed position, the insert containing a fluid well configured to fluidically communicate with the second fluid inlet/outlet of the microfluidic device;
   wherein providing the fluid sample comprises introducing the fluid sample into the fluid well of the insert.

23. The method of claim 21, wherein the system comprises the microscope of claim 20.

24. The method of claim 21, wherein the suction is applied sufficient to pull a volume of about 2 microliters to about 10 microliters of the fluid sample into the microfluidic device.

25. The method of claim 21, wherein the microfluidic device comprises a flow region having a plurality of microfluidic channels and wherein the method results in an imported biological micro-object density of at least about $4 \times 10^6$ in the plurality of microfluidic channels.

26. The method of claim 25, wherein the method results in a coefficient of variation, CV, of the imported biological micro-object density in the plurality of microfluidic channels of less than about 20%.

* * * * *